US008023726B2

(12) United States Patent
Sundaresan et al.

(10) Patent No.: US 8,023,726 B2
(45) Date of Patent: Sep. 20, 2011

(54) METHOD AND SYSTEM FOR MARKERLESS MOTION CAPTURE USING MULTIPLE CAMERAS

(75) Inventors: Aravind Sundaresan, Sunnyvale, CA (US); Ramalingam Chellappa, Potomac, MD (US)

(73) Assignee: University of Maryland, College Park, MD (US)

( * ) Notice: Subject to any disclaimer, the term of this patent is extended or adjusted under 35 U.S.C. 154(b) by 721 days.

(21) Appl. No.: 11/937,834

(22) Filed: Nov. 9, 2007

(65) Prior Publication Data

US 2009/0232353 A1    Sep. 17, 2009

Related U.S. Application Data

(60) Provisional application No. 60/865,207, filed on Nov. 10, 2006.

(51) Int. Cl.
*G06K 9/00* (2006.01)
(52) U.S. Cl. .................. 382/154; 382/103; 345/604
(58) Field of Classification Search .................. 382/103, 382/154; 345/604
See application file for complete search history.

(56) References Cited

U.S. PATENT DOCUMENTS

| | | | |
|---|---|---|---|
| 7,239,718 B2 * | 7/2007 | Park et al. | 382/103 |
| 7,257,237 B1 * | 8/2007 | Luck et al. | 382/103 |
| 7,308,332 B2 * | 12/2007 | Okada et al. | 700/130 |
| 7,804,995 B2 * | 9/2010 | Lipton et al. | 382/154 |
| 2003/0235341 A1 * | 12/2003 | Gokturk et al. | 382/243 |
| 2005/0265582 A1 * | 12/2005 | Buehler et al. | 382/103 |
| 2006/0187297 A1 * | 8/2006 | Onural | 348/40 |
| 2008/0031512 A1 * | 2/2008 | Mundermann et al. | 382/154 |

OTHER PUBLICATIONS

Anguelov, et al. "Recovering articulated object models from 3-D range data", Uncertainty in Artificial Intelligence Conference, 2004.
M. Belkin, et al. "Laplacian eigenmaps for dimensionality reduction and data representation," Neural Comput., vol. 15, No. 6, pp. 1373-1396, 2003.
M. Brand, "Charting a manifold," Presented at NIPS-15, Dec. 2002, Publ. in Proceedings, Neural Information Processing Systems, vol. 15, Mar. 2003.
Brostow, et al., "Novel skeletal representation for articulated creatures" European Conference on Computer Vision, 2004, pp. 66-78.
J. Carranza, et al., "Free-viewpoint video of human actors," ACM Transactions on Graphics, vol. 22, No. 2, pp. 569-577, 2003.
Cedras and Shah in "Motion-based recognition: A survey," Image and Vision Computing, vol. 13, No. 2, pp. 129-155, Mar. 1995.

(Continued)

*Primary Examiner* — Gregory M Desire
(74) *Attorney, Agent, or Firm* — Rosenberg, Klein & Lee

(57) ABSTRACT

Completely automated end-to-end method and system for markerless motion capture performs segmentation of articulating objects in Laplacian Eigenspace and is applicable to handling of the poses of some complexity. 3D voxel representation of acquired images are mapped to a higher dimensional space ($\mathbb{R}^k$), where k depends on the number of articulated chains of the subject body, so as to extract the 1-D representations of the articulating chains. A bottom-up approach is suggested in order to build a parametric (spline-based) representation of a general articulated body in the high dimensional space followed by a top-down probabilistic approach that registers the segments to an average human body model. The parameters of the model are further optimized using the segmented and registered voxels.

20 Claims, 44 Drawing Sheets

OTHER PUBLICATIONS

Cheung, et al, "Shape-from-silhouette of articulated objects and its use for human body kinematics estimation and motion capture", IEEE Conference on Computer Vision and Pattern Recognition, pp. 77-84, Jun. 2003.

C.W. Chu, et al., "Towards Model-free Markerless Motion Capture", in CVPR (2), 2003, pp. 475-482.

Q. Delamarre, et al. "3D articulated models and multi-view tracking with silhouettes", ICCV, pp. 716-721, 1999.

A. Elad, et al. "On bending invariant signatures for surface," IEEE Transactions on Pattern Analysis and Machine Intelligence, vol. 25, pp. 1285-1295, 2003.

D. Gavrila, et al. "3-D model-based tracking of humans in action: A multi-view approach," in Computer Vision and Pattern Recognition, 1996, pp. 73-80.

I.A. Kakadiaris et al., "3D human body model acquisition from multiple views," in Fifth International Conference on Computer Vision, 1995, p. 61.

Krahnstoever, et al. "Articulated models from video," in Computer vision and Pattern Recognition, 2004, pp. 894-901.

I. Mikic, et al., "Human body model acquisition and tracking using voxel data," International Journal of Computer Vision, vol. 53, No. 3, 2003.

G. Mori, et al., "Estimating human body configurations using shape context matching," in ECCV, 2002, pp. 666-680.

R. Plänkers, et al., "Articulated soft objects for video-based body modeling", ICCV, pp. 394-401, 2001.

D. Ramanan et al., "Finding and tracking people from the bottom up." in CVPR (2), 2003, pp. 467-474.

X. Ren, A.C. Berg, and J. Malik, "Recovering human body configurations using pairwise constraints between parts," in International Conference on Computer Vision, 2005.

S.T. Rowels, et al. "Nonlinear dimensionality reduction by locally linear embedding," Science, vol. 290, No. 5500, pp. 2323-2326, 2000.

B. Schölkopf, et al. "Nonlinear component analysis as a kernel eigenvalue problem,", Neural Computation, vol. 10, pp. 1299-1319, 1998.

J.B. Tenebaum, et al., "A global geometric framework for nonlinear dimensionality reduction," Science, vol. 290, No. 5500, pp. 2319-2323, 2000.

Christian Theobalt, et al. "Combining 3D flow fields with silhouette-based human motion capture for immersive video", Graph. Models, 66(6):333-351, 2004.

M. Yamamoto, et al. "Human motion analysis based on a robot arm model", CVPR, pp. 664-665, 1991.

M. Yamamoto, et al. Incremental tracking of human actions from multiple views), CVPR, pp. 2-7, 1998.

* cited by examiner

GRAPH MODEL

POSE 1

POSE 2

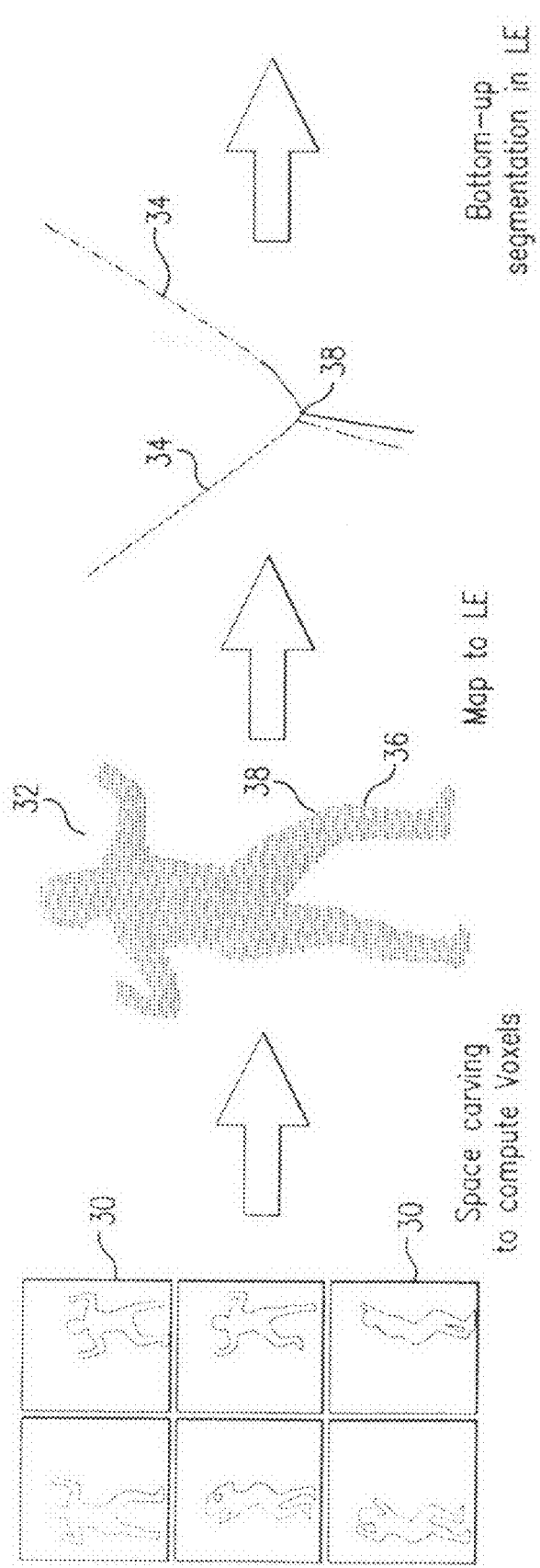

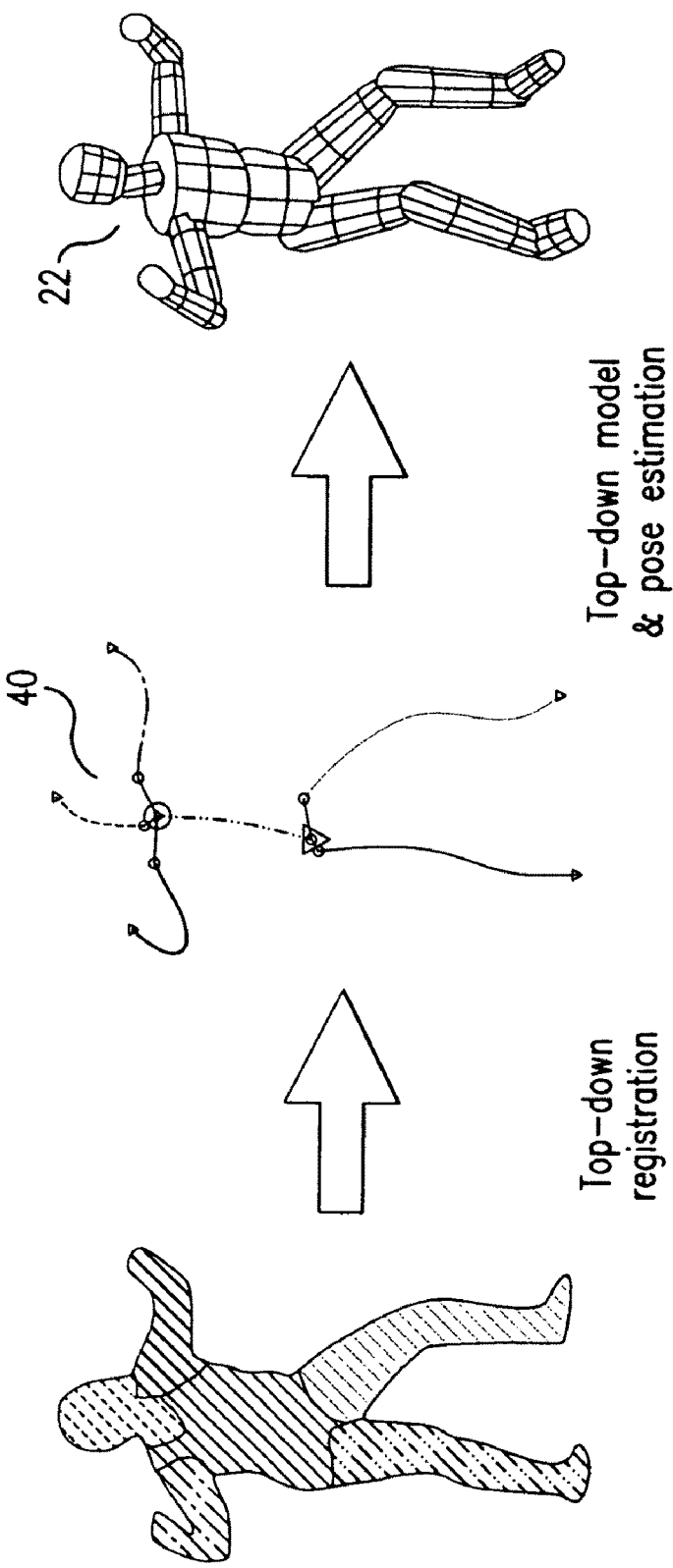

SUPER-QUADRIC xy PLANE CROSS-SECTION

PROFILE ALONG z-AXIS

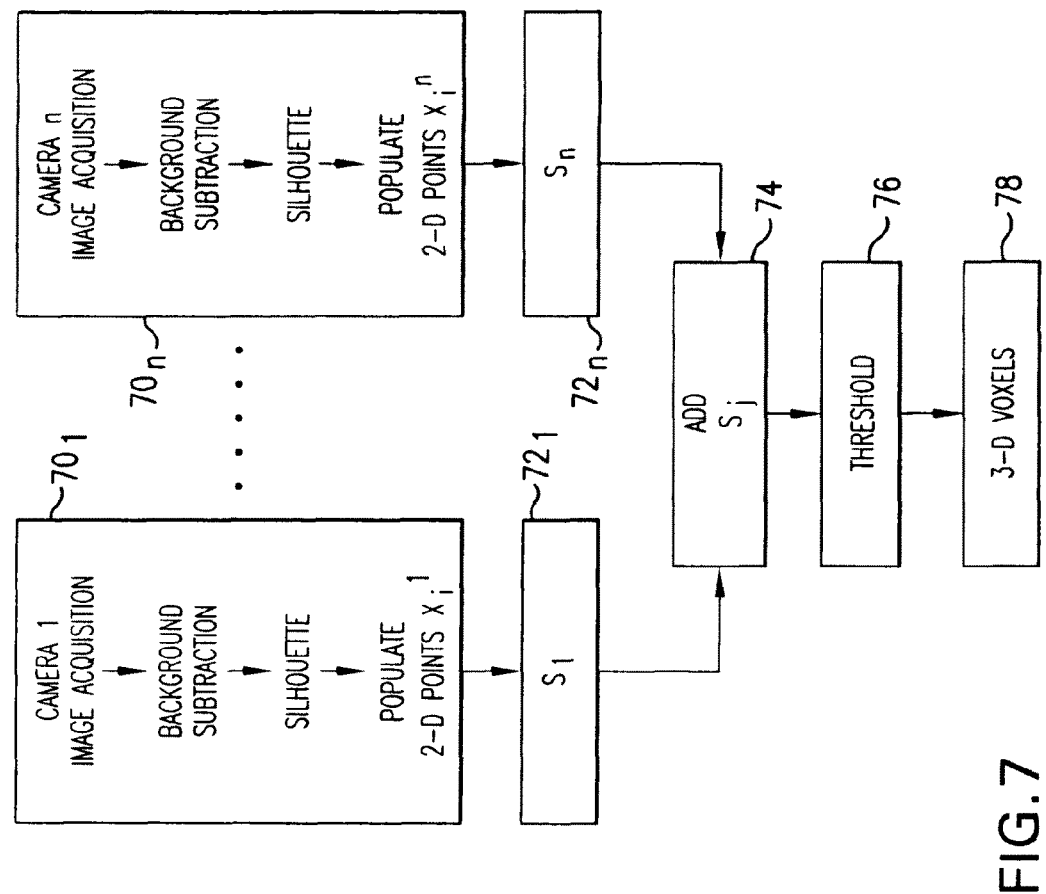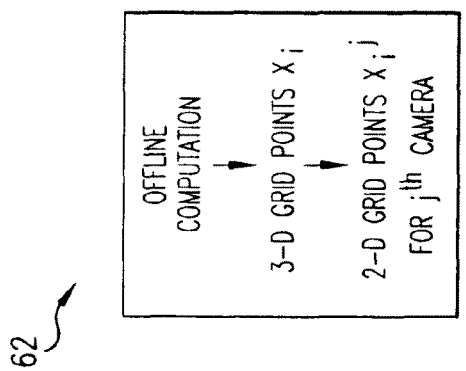
FIG.7

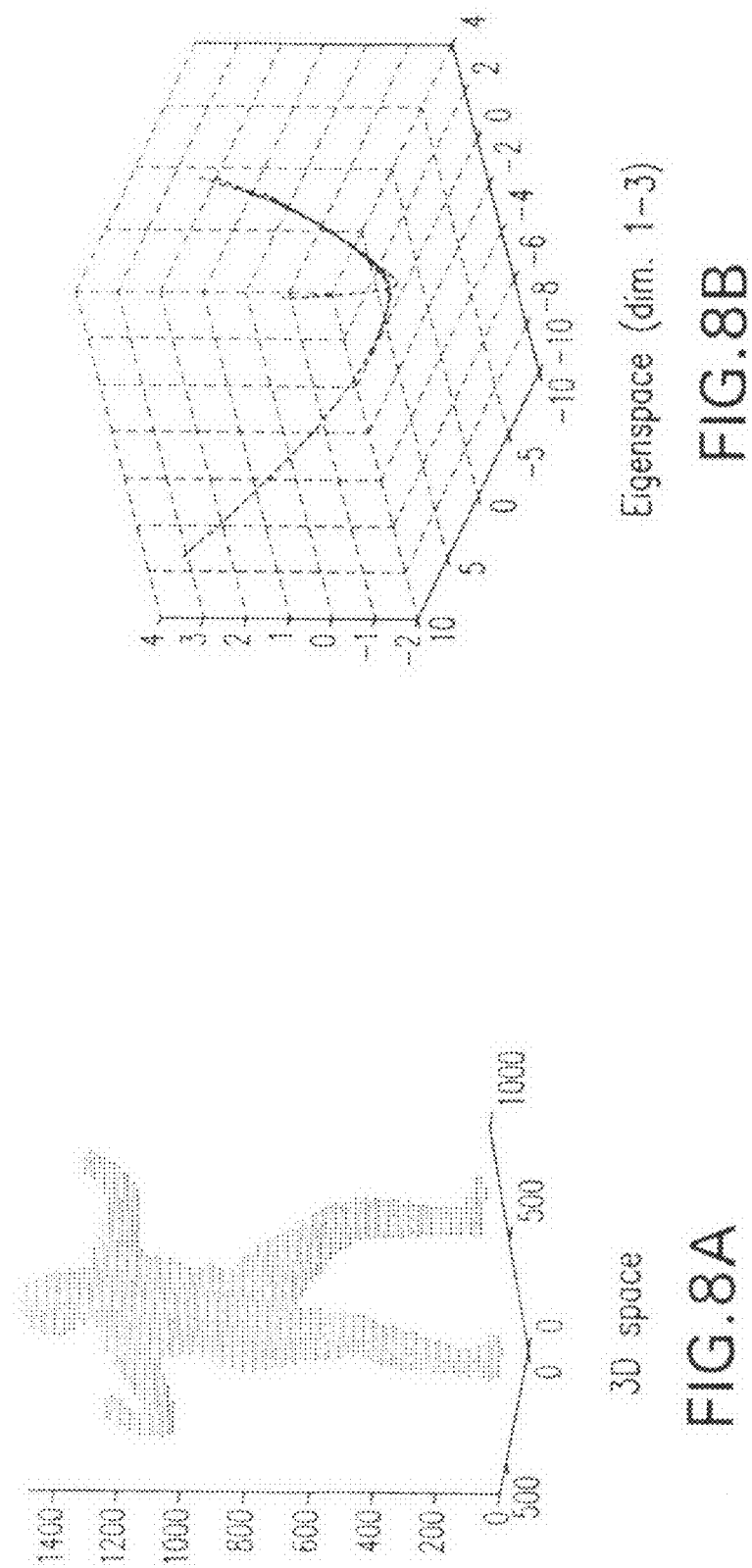

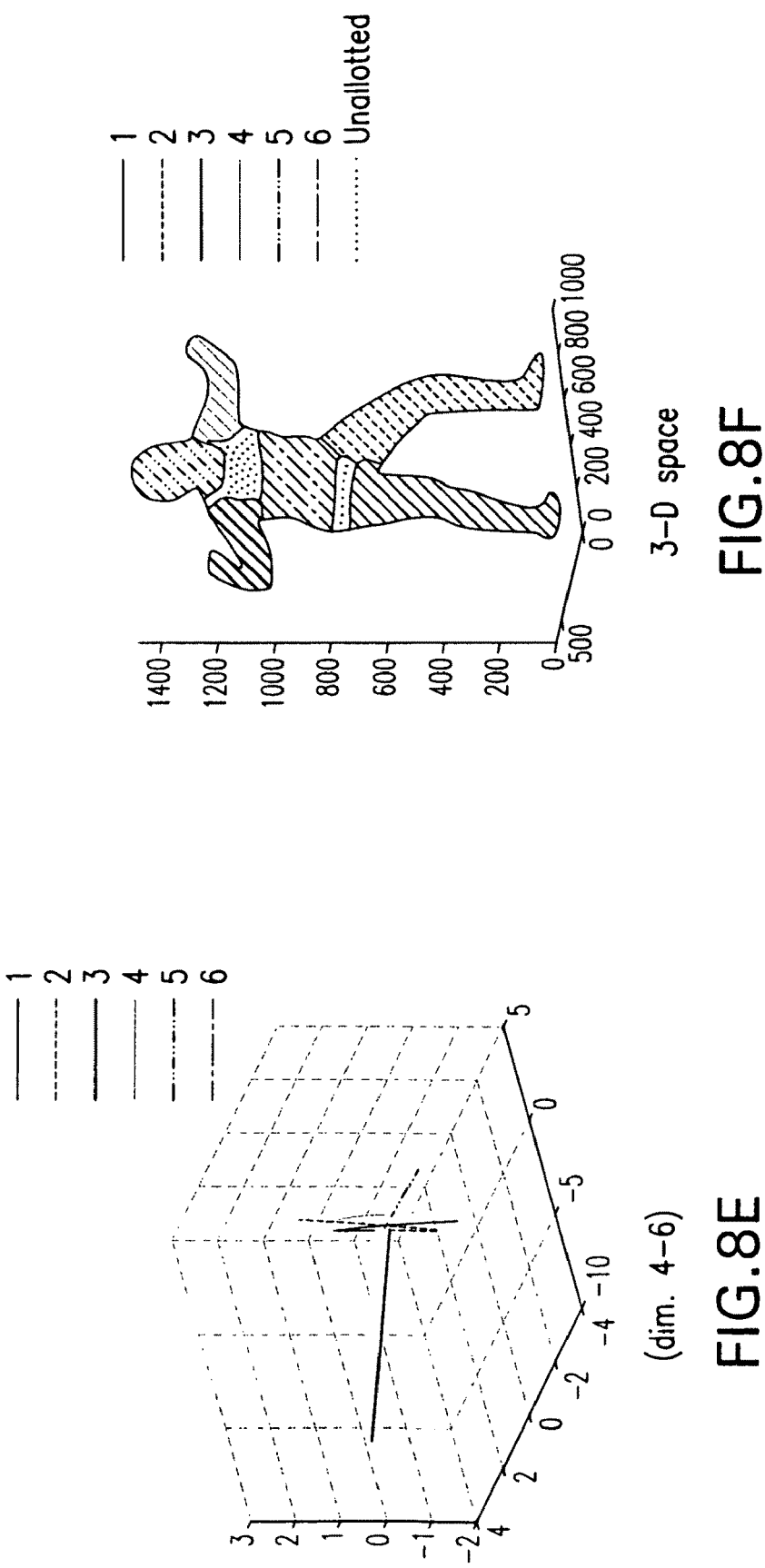

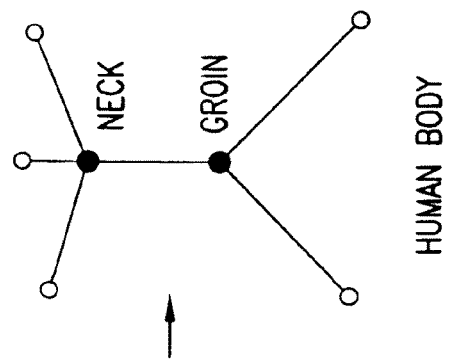
HUMAN BODY FIG.9D
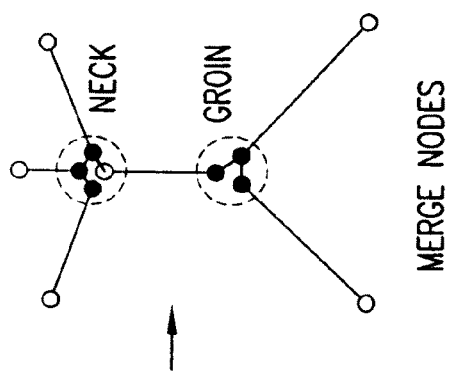
MERGE NODES FIG.9C
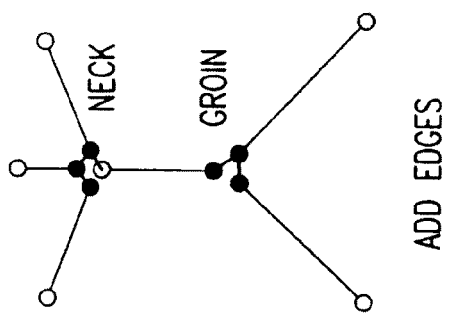
ADD EDGES FIG.9B
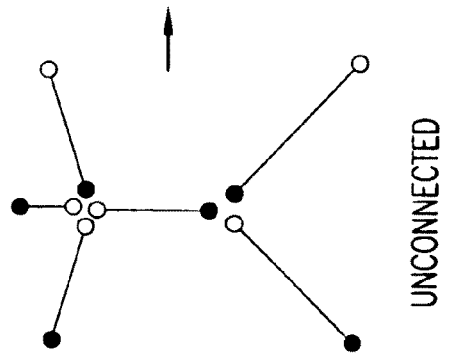
UNCONNECTED FIG.9A

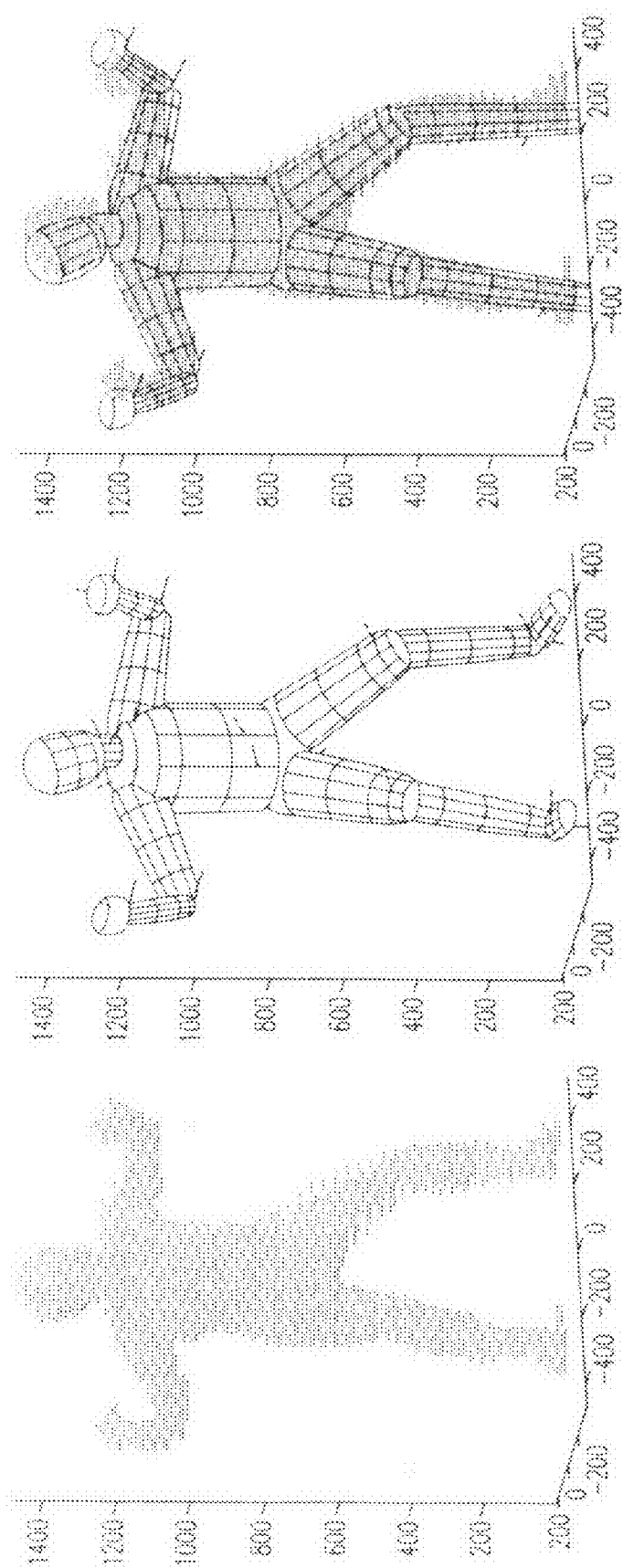

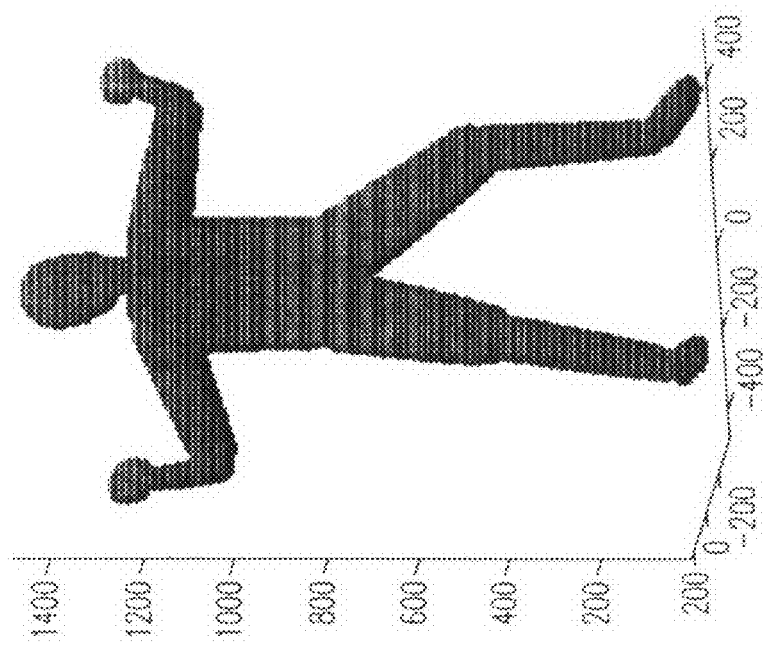
FIG. 12E Syn. Voxel
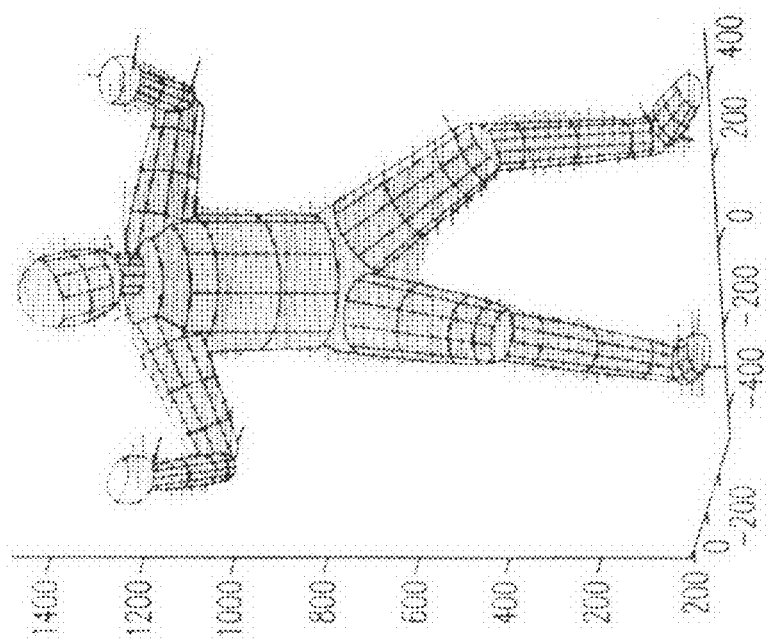
FIG. 12D Fin. pose

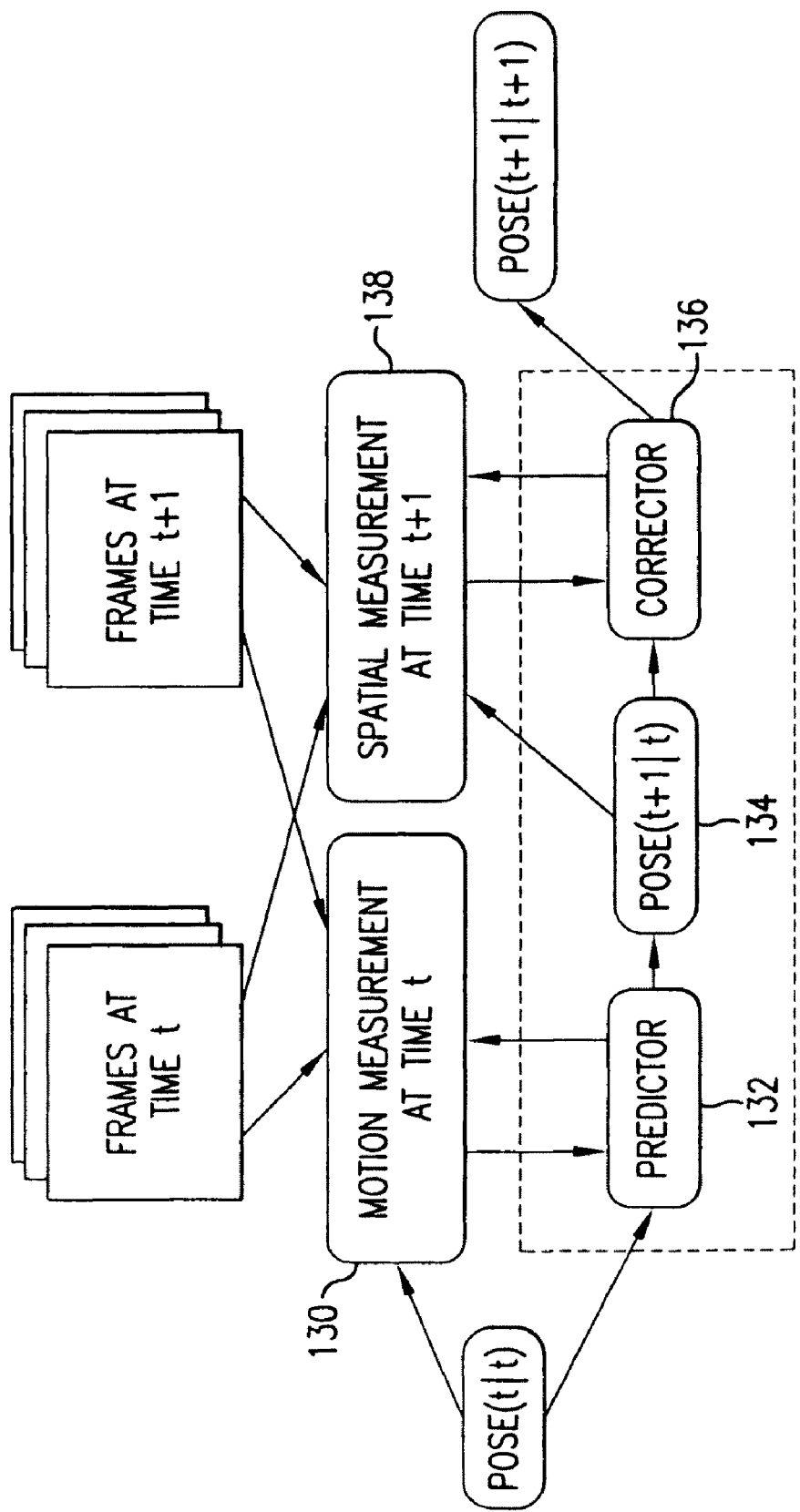

Nodes in image

Image

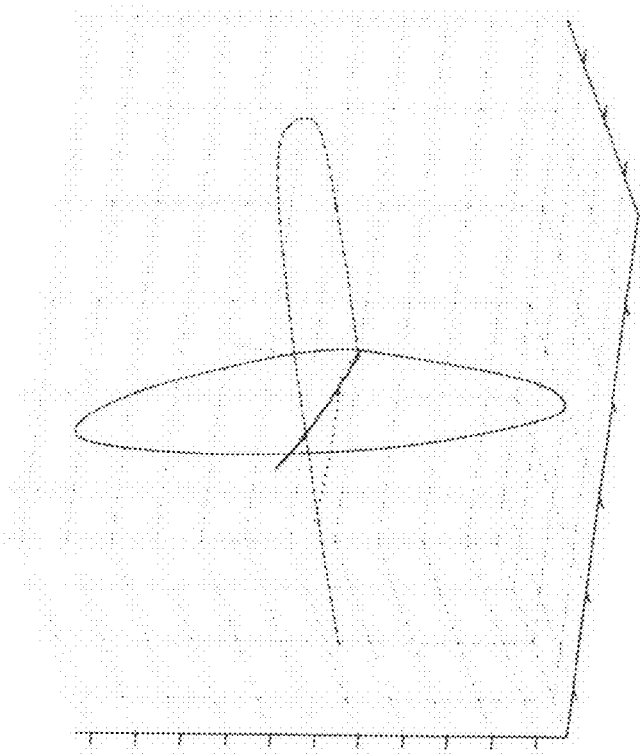
FIG. 15D Eigenvectors 4-6
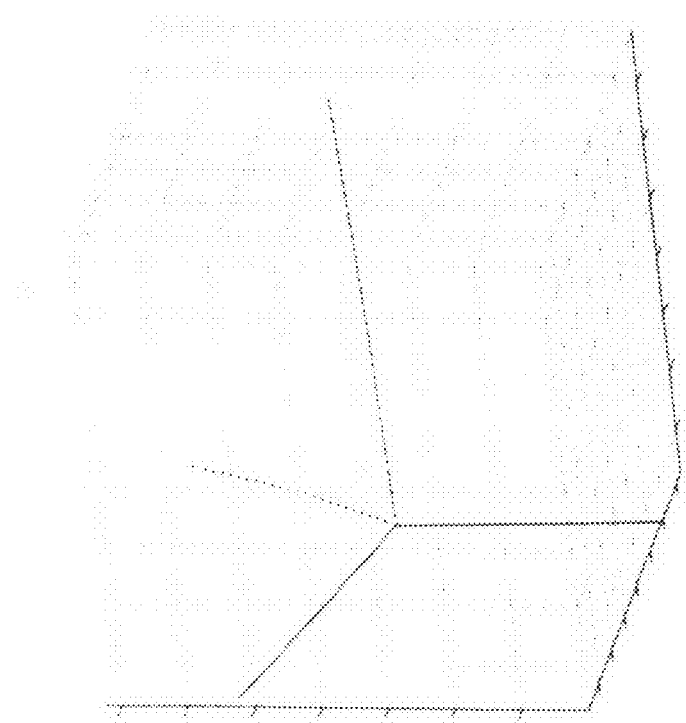
FIG. 15C Eigenvectors 1-3

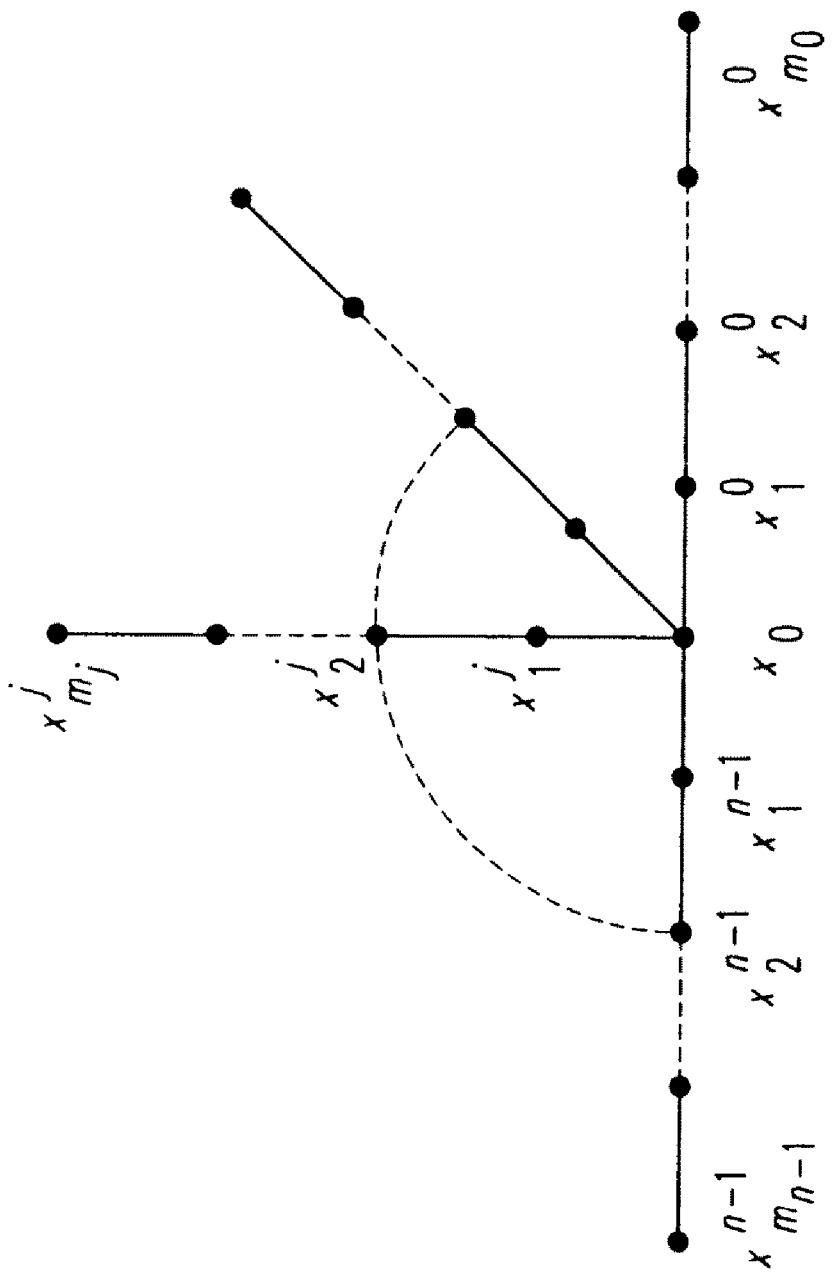
FIG.16A Extended star graph

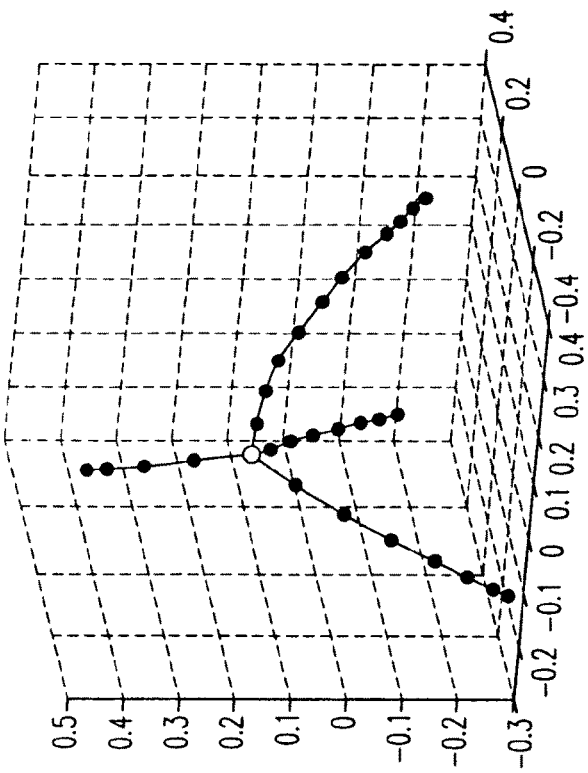
FIG. 16C Asymmetric case
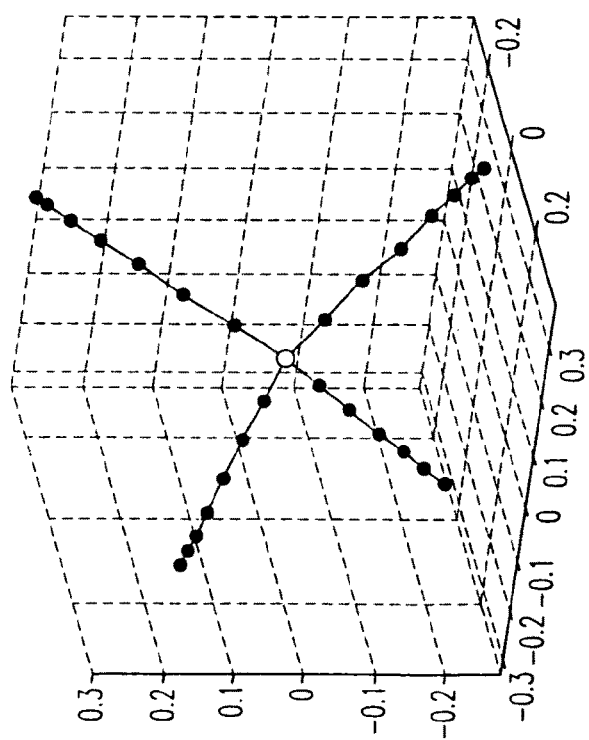
FIG. 16B Symmetric case

Eig.4-6

Eig. 4-6

Eig. 1-3

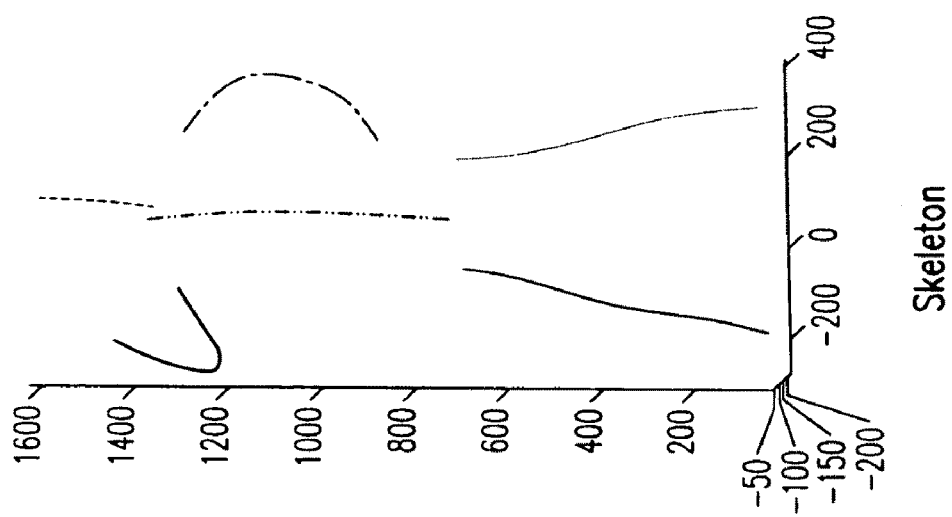
FIG.22E Skeleton
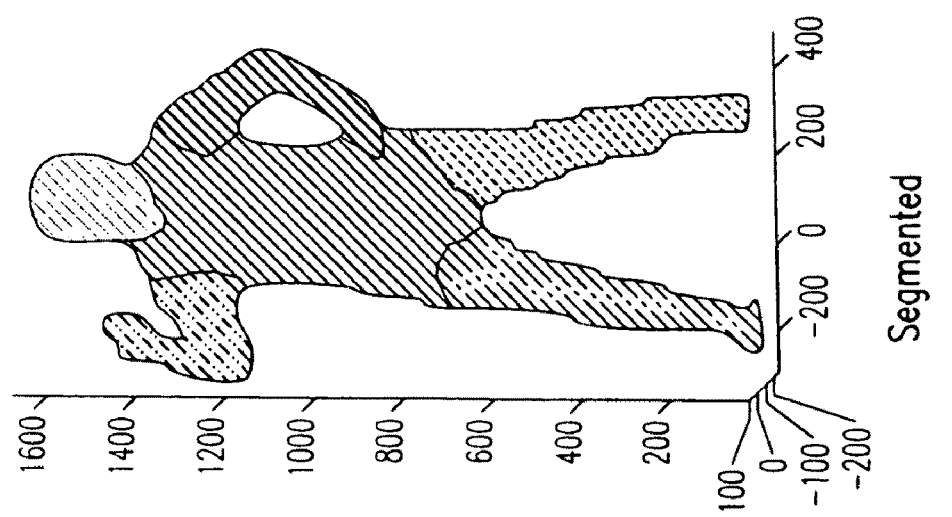
FIG.22D Segmented

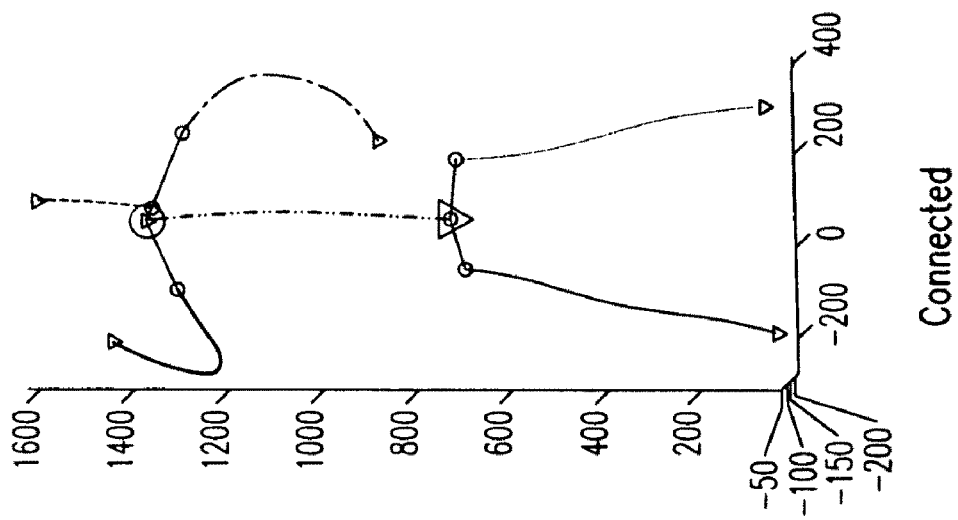
FIG.22G Connected
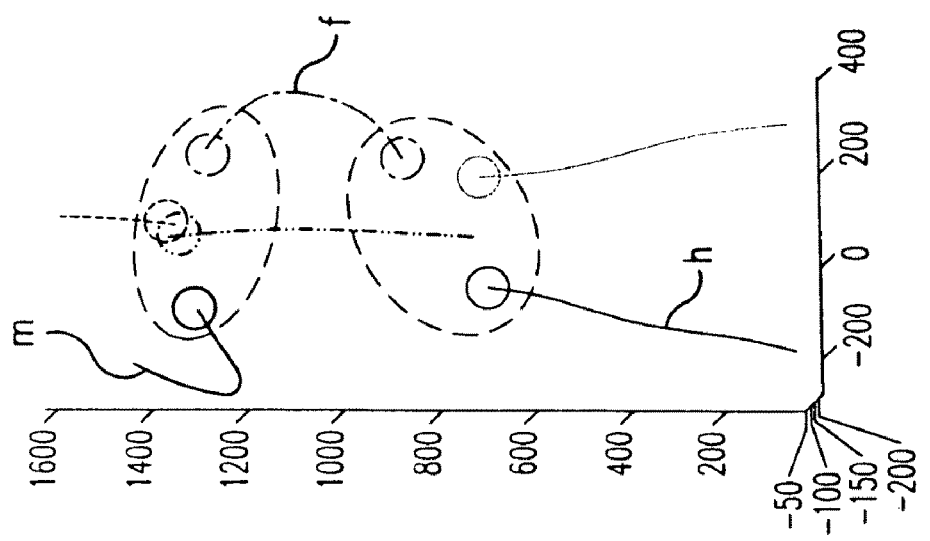
FIG.22F Graph

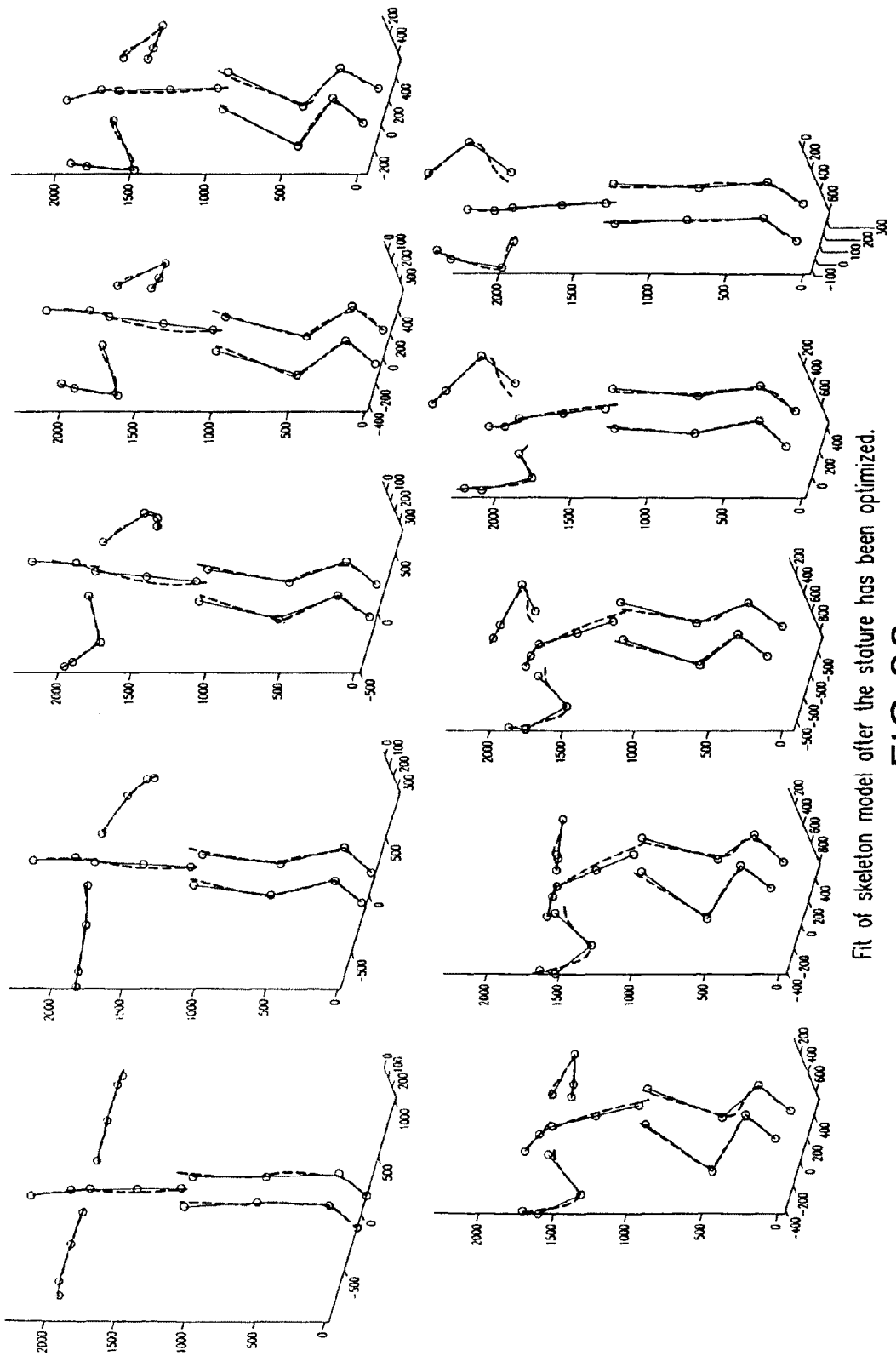
FIG. 26 Fit of skeleton model after the stature has been optimized.

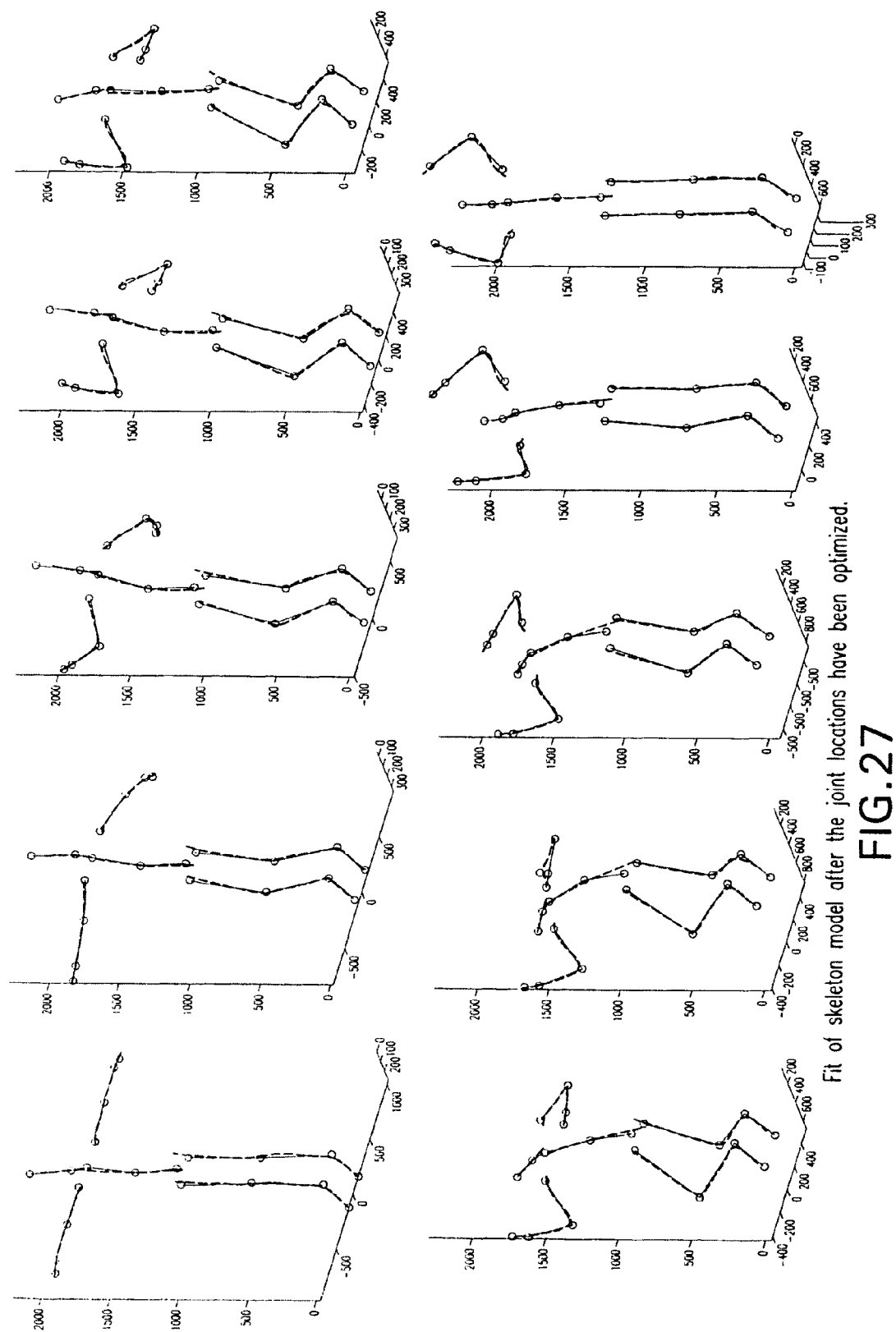
FIG. 27 Fit of skeleton model after the joint locations have been optimized.

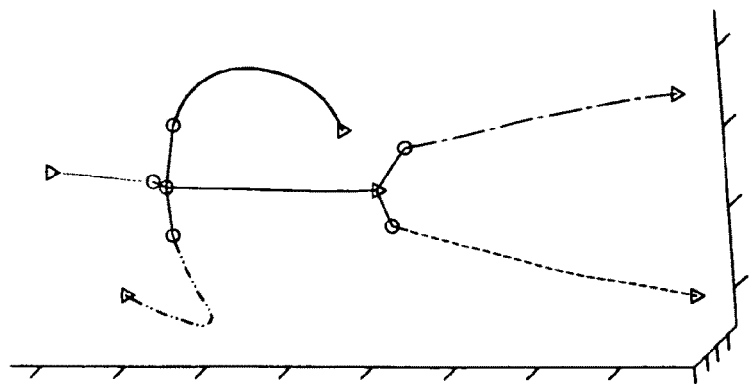
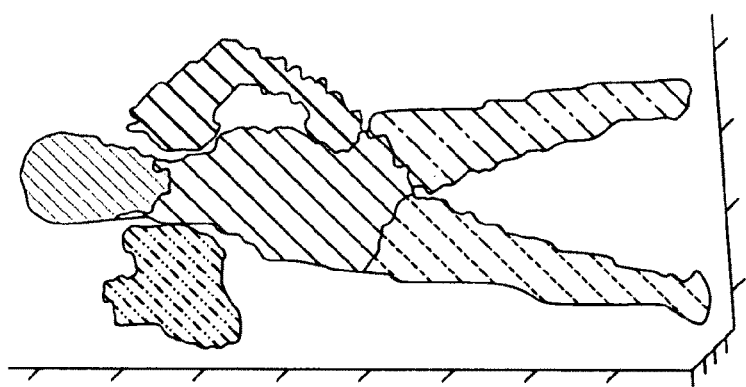
Subject A
Segmentation and registration
for different subjects and poses
FIG.29B
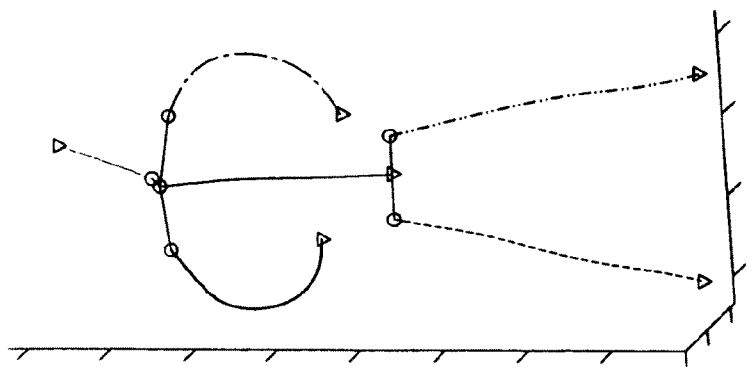
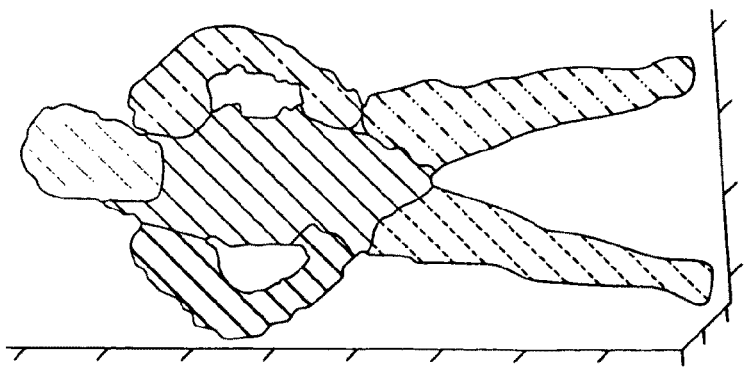
Subject A
Segmentation and registration
for different subjects and poses
FIG.29A Subject B Segmentation and registration
for different subjects and poses Subject C Segmentation and registration
for different subjects and poses Sample voxel and human body model estimation from synthetic sequence.

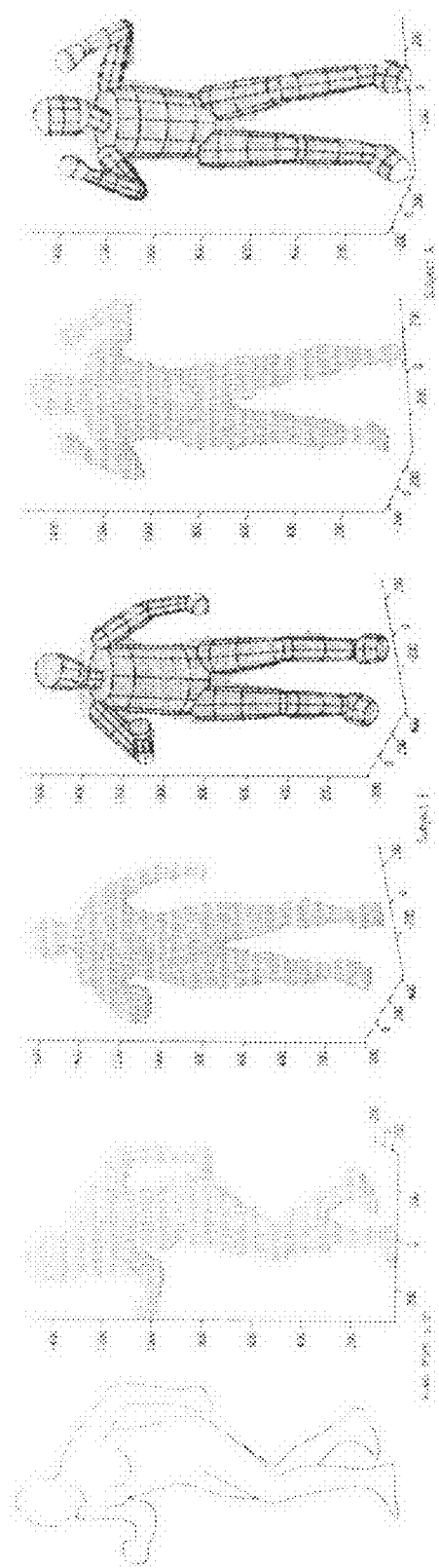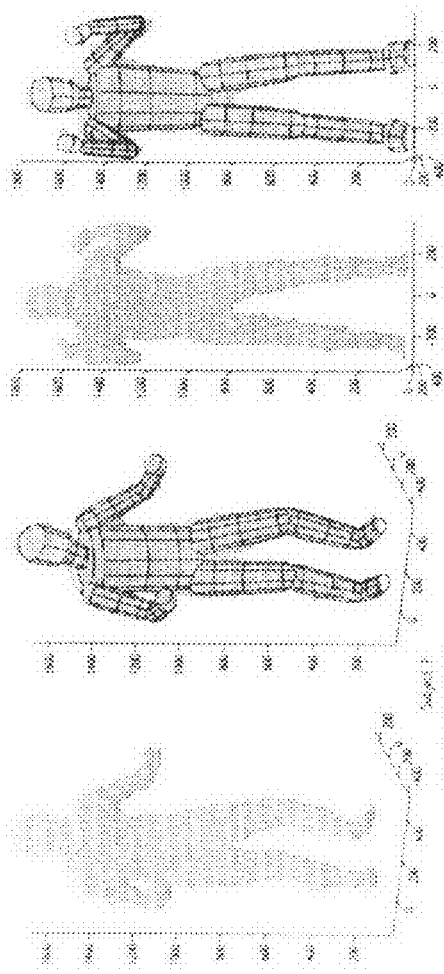
Human body model estimation from 3D scan obtained for different subjects.

METHOD AND SYSTEM FOR MARKERLESS MOTION CAPTURE USING MULTIPLE CAMERAS

RELATED APPLICATION DATA

This Utility patent application is based on Provisional Patent Application Ser. No. 60/865,207 filed on 10 Nov. 2006.

STATEMENT REGARDING FEDERALLY SPONSORED RESEARCH

The invention described herein was developed through research sponsored by the NSF, Contract No. IIS0325715. The United States Government has certain rights to the invention.

FIELD OF THE INVENTION

The invention described herein is related to motion capture, and particularly, to markerless motion capture based on images and video sequences obtained from multiple cameras placed around a subject, and to estimate the pose of the subject.

The present invention is specifically directed to markerless motion capture using a technique that builds a subject body model from video sequences obtained from multiple cameras, wherein the subject body model is represented by segments connected in an articulated kinematic chain. The parameters of the subject body model are used to determine the pose of the subject based on shapes and relative disposition of the body segments.

The present invention is further directed to markerless motion capture technique based on a subject body model visualized as a kinematic chain composed of 1-D segments connected at specific joints which are extracted from 3-D silhouettes of the subject image transformed to the Laplacian Eigenspace. The 1-D segments are further connected to construct a skeletal representation of the subject pose in 3-D space which further undergoes multi-scale optimization for subject model shape and disposition parameters.

The present invention further is related to a completely automated end-to-end markerless motion capture system and method which are based on:
  acquisition of the model of a human subject from images acquired by a plurality of cameras;
  estimation of the initial pose of the human subject; and
  tracking the pose in subsequent frames of video sequences using different cues.

BACKGROUND OF THE PRESENT INVENTION

Human motion capture and analysis has applications in different fields such as kinesiology, bio-mechanics, surveillance, human-computer interaction, animation and video games. Motion capture for humans describes the activity of analyzing and expressing human motion in mathematical terms. The task of motion capture may be divided into a number of systematically distinct groups, e.g. initialization, tracking, pose estimation, and gesture recognition.

There is a correspondingly large body of developments on human motion analysis and pose estimation from video data. However, the requirements in terms of the detail of pose parameters and accuracy in estimation vary from application to application as does the form of the available input data. Surveillance applications, for instance, usually require just the location of the subject or an approximate estimate of human pose from a single video stream, whereas bio-mechanical applications require detailed pose estimation, including different joint angles, from images obtained using multiple video cameras. Bio-mechanical and clinical applications require accurate capture of normal and pathological human movement without the artifacts associated with current state of the art marker-based motion capture techniques.

The most common methods to accurate capture of 3-D human movement, such as optical, magnetic, and elective mechanical, require attachment of markers, fixtures, or sensors to body segments. These methods are invasive, i.e., they encumber the subject, and require subject preparation time. They may also hinder or influence the movement of the subject due to their invasive nature. Marker-based motion capture systems, although widely used, are not very accurate due to the relative motion between muscle and skin tissue and the underlying skeletal structure. A passive or non-invasive motion capture system composed of video cameras, therefore, possesses several advantages over marker-based systems and is highly desirable.

There exist a number of techniques to estimate the pose of human subjects from both single and multiple cameras. Some of these methods are applied directly to images, while others are applied to 3-D volumetric data (or voxels), which can be computed from image silhouettes. Most methods, however, address applications such as surveillance, human computer interaction, or animation, where accurate joint angle estimation is not necessary or important.

Most approaches use a human body model to guide the pose estimation process, as the use of a model greatly increases the accuracy and robustness of the algorithm. It is therefore necessary to estimate the parameters of the human body model as well. Estimating 3-D pose of an articulated object using images from a single camera is an inherently difficult task due to ill-posed nature of estimating 3-D structure and motion from 2-D images as well as self-occlusion. In order to accurately estimate the 3-D joint angle parameters required in bio-mechanical and clinical applications, it is necessary to use 3-D input data such as voxels in the estimation algorithm. Voxels can be computed from 3-D mesh data obtained from laser scanners as well as images obtained from multiple calibrated cameras.

A large number of pose estimation algorithms use a single image or single image stream to estimate the pose of the subject or use simplified models. Several pose tracking algorithms also assume that the initial pose is known, and use either motion or silhouettes, or alternatively voxels. But few tracking algorithms combine both motion and static cues. The accuracy and the robustness of these algorithms vary as does the suitability of the techniques for different applications. Cedras and Shah in "Motion-based recognition: A survey," *Image and Vision* Computing, vol. 13, no. 2, pp. 129-155, March 1995, provide a survey of motion-based recognition methods which require the use of motion data that the markerless motion capture methods can provide. There are several methods (K. Rohr, *Human Movement Analysis Based on Explicit Motion Models*, Kluwer Academic, 1997; D. Ramanan and D. A. Forsyth "Finding and tracking people from the bottom up." in *CVPR* (2), 2003, pp. 467-474; X. Ren, A. C. Berg, and J. Malik, "Recovering human body configurations using pairwise constraints between parts," in *International Conference on Computer Vision,* 2005; and G. Mori and J. Malik, "Estimating human body configurations using shape context matching," in *ECCV,* 2002, pp. 666-680) to estimate pose from a single view, while I. A. Kakadiaris and D. Metaxas, "3D human body model acquisition from multiple views," in *Fifth International Conference on Computer Vision,* 1995, p. 61; I. Mikic, M. Trivedi, E. Hunter, and P. Cosman, "Human body model acquisition and tracking using voxel data," *International Journal of Computer Vision,* vol.

53, no. 3, 2003; C. W. Chu, O. C. Jenkins, and M. J. Mataric, "Markerless kinematic model and motion capture from volume sequences: in *CVPR* (2), 2003, pp. 475-482; K. Cheung, S. Baker, and T. Kanade, "Shape-from-silhouette of articulated objects and its use for human body kinematics estimation and motion capture," in *IEEE CVPR*, June 2003; and J. Carranza, C. Theobalt, M. Magnor, and H. Seidel, "Freeviewpoint video of human actors," *ACM Transactions on Graphics*, vol. 22, no. 2, pp. 569-577, 2003) estimate the pose from multiple views. Specifically the algorithms presented in I. Mikic, et al., C. W. Chu, et al., K. Cheung, et al., J. Carranza, et al., estimate the pose from voxel representations. Carranza, et al. describe a system that uses multi-view synchronized video footage of an actor's performance to estimate the motion parameters and to interactively re-render the actor's appearance from any viewpoint.

Chu, et al. describes a method for pose estimation using Isomaps (J. B. Tenebaum, V. de Silva, and J. C. Langford, "A global geometric framework for nonlinear dimensionality reduction," *Science*, vol. 290, no. 5500, pp. 2319-2323, 2000) to transform the voxels to its pose-invariant intrinsic space representation and obtain a skeleton representation. Cheung, et al. extend shapes-from-silhouette methods to articulated objects. Given silhouettes of a moving articulated object, they propose an iterative algorithm to solve the simultaneous assignment of silhouette points to a body part and alignment of the body part. These methods work well with simple poses, but they are usually unable to handle complex poses where there is self-contact, i.e., one or more of the limbs touches the others.

Anguelov, et al. ("Recovering articulated object models from 3-D range data", *Uncertainty in Artificial Intelligence Conference*, 2004) describe an algorithm that automatically decomposes an object into approximately rigid parts, their location, and the underlying articulated structure given a set of meshes describing the object in different poses. They use an unsupervised non-rigid technique to register the meshes and perform segmentation using the EM algorithm. Krahnstoever, et al. ("Articulated models from video," in *Computer vision and Pattern Recognition*, 2004, pp. 894-901) address the issue of acquiring articulated models directly from a monocular video. Structure, shape and appearance of articulated models are estimated, but this method is limited in its application as well as in accuracy in extracting complete 3-D human body models as it uses a single camera.

Algorithms that estimate the complete human body model from multiple views are presented in Mikic, et al. and Kakadiaris, et al. For example, the Mikic, et al. propose a model acquisition algorithm using voxels, which starts with a simple body part localization procedure based on fitting and growing template and uses prior knowledge of shapes and dimensions of average body parts. Kakadiaris, et al. present a Human Body Part Identification Strategy (HBPIS) that recovers all the body parts of a moving human based on the spatio-temporal analysis of its deforming silhouette using input from three mutually orthogonal views. However, they specify a protocol of movements that the subject is required to go through.

Brostow, et al., ("Novel skeletal representation for articulated creatures" *European Conference on Computer Vision*, 2004) present a skeletonization method that uses voxel data to estimate a skeleton representation.

Many methods assume some kind of human body model. For example, N. I. Badler, et al. (*Simulating Humans*. Oxford University Press, Oxford, UK, 1993) suggest several methods to represent human subjects in terms of the shape as well as the articulated structure. Modified super-quadrics to represent shapes for the human body model is suggested in D. Gavrila, et al. ("3-D model-based tracking of humans in action: A multi-view approach," in *Computer Vision and Pattern Recognition*, 1996, pp. 73-80).

M. Belkin, et al. ("Laplacian eigenmaps for dimensionality reduction and data representation," *Neural Comput.*, vol. 15, no. 6, pp. 1373-1396, 2003) describe the construction of a representation for data lying in a low dimensional manifold embedded in a high dimensional space and use Laplacian Eigenmaps for dimensionality reduction. While Laplacian eigenmaps and other manifold methods have been applied to dimensionality reduction problems such as classification and Face retrieval using Laplacian faces, none of them, however, map the voxels to a higher dimensional space in order to extract the 1-D structure.

There also exist other methods for dimensionality reduction such as Isomaps, charting a manifold (M. Brand, "Charting a manifold," in *Neural Information Processing Systems*, 2002), Kernal Eigenvalue analysis (B. Schölkopf, et al. ("Nonlinear component analysis as a kernel eigenvalue problem,", *Neural Computation*, vol. 10, pp. 1299-1319, 1998), the Locally Linear Embedding algorithm (S. T. Rowels, et al. "Nonlinear dimensionality reduction by locally linear embedding," *Science*, vol. 290, no. 5500, pp. 2323-2326, 2000) and for reducing articulated objects to pose-invariant structure A. Elad, et al. ("On bending invariant signatures for surface," *IEEE Transactions on Pattern Analysis and Machine Intelligence*, vol. 25, pp. 1285-1295, 2003). M. Belkin, et al. analyze the connection of Locally Linear Embedding algorithm proposed by S. T. Rowels, et al. ("Nonlinear dimensionality reduction by locally linear embedding," *Science*, vol. 290, no. 5500, pp. 2323-2326, 2000) to the Laplacian.

M. Yamamoto, et al. ("Human motion analysis based on a robot arm model", *CVPR*, pages 664-665, 1991) analyze human motion based on a robot model and M. Yamamoto, et al. ("Incremental tracking of human actions from multiple views), *CVPR*, pages 2-7, 1998) track human motion using multiple cameras. D. M. Gavrila, et al. ("3-D Model-based tracking of human in action," Computer Vision and Pattern Recognition, pp. 73-80, 1996) present a multi-view approach for 3D model-based tracking of humans in action. They use a generate-and-test algorithm in which they search for poses in a parameter space and match them using a variant of Chamfer matching. R. Plankers, et al. ("Articulated soft objects for video-based body modeling", *ICCV*, pages 394-401, 2001) use articulated soft objects with an articulated underlying skeleton as a model, and silhouette data for shape and motion recovery from stereo and trinocular image sequences. Christian Theobalt, et al. ("Combining 3D flow fields with silhouette-based human motion capture for immersive video", *Graph. Models*, 66(6):333-351, 2004) project the texture of the model obtained from silhouette-based methods and refine the pose using the flow field. Q. Delamarre, et al. ("3D articulated models and multi-view tracking with silhouettes", *ICCV*, pages 716-721, 1999) use 3D articulated models for tracking with silhouettes. They use silhouette contours and apply forces to the contours obtained from the projection of the 3D model so that they move towards the silhouette contours obtained from multiple images. Cheung, et al. ("Shape-from-silhouette of articulated objects and its use for human body kinematics estimation and motion capture", *IEEE Conference on Computer Vision and Pattern Recognition*, pages 77-84, June 2003) extend shapes-from-silhouette methods to articulated objects. Given silhouettes of a moving articulated object, they propose an iterative algorithm to solve the simultaneous assignment of silhouette points to a body part and alignment of the body part.

There are also methods that attempt to estimate the pose from a monocular video sequence. They propose different techniques to resolve kinematic ambiguities faced in the monocular pose estimation problem.

Despite extensive research and development in the area of motion capture, further improvements are still needed.

It is highly desirable to have a markerless motion capture technique providing accurate capture of the motion in an effective automated fashion capable of handling poses of any complexity.

SUMMARY OF THE INVENTION

It is an object of the present invention to provide a markerless motion capture system using multiple cameras to acquire video sequences of a subject and automatically processing the acquired video data in an efficient fashion to result in an accurate estimate and presentation of the subject model and poses of some complexity.

It is another object of the invention to provide a markerless motion capture system which visualizes a body, for example, human body, as a graphical model consisting of a plurality of rigid 1-D segments connected at respective joints thus forming kinematic chains articulated at the trunk of the human body, constructs a 3-D voxel representation of a subject body from images acquired from multiple cameras, maps the 3-D voxel representation to a higher dimensional space (preferably, by Laplacian eigenmap transformation), extracts each 1-D segments for further estimation of the pose of the subject and the resulting subject model.

It is also an object of the present invention to provide a markerless motion capture system which constructs a skeleton curve of a subject from 1-D structures to which the voxels are mapped in the Laplacian Eigenspace, estimates parameters (shape, dimension, and mutual disposition) of the segments of the skeleton, and results in an initial pose of the subject, which is further tracked in a predetermined fashion.

The present method for markerless motion capture comprises the steps of:
acquiring video sequences of a subject by a plurality of cameras positioned in a surrounding relationship with the subject;
coupling the acquired video sequences to a data processing unit to be processed therein;
in said data processing unit, for each frame of a set of frames of said acquired video sequences,
(a) constructing a 3-D voxel representation of the subject image to form a kinematic structure including a plurality of articulated chains connected at joints and composed of said 3-D voxels,
(b) transforming said 3-D voxels of said kinematic structure to the Laplacian Eigenspace, each of said 3-D voxels being mapped to a respective one of a plurality of smooth 1-D curves in the Laplacian Eigenspace according to a position of said each 3-D voxel in said 3-D voxel representation,
(c) segmenting said 1-D smooth curves by 1-D spline fitting,
(d) registering said segmented 1-D smooth curves to a graphical subject model,
(e) computing a skeleton curve of the subject from said segmented 1-D smooth curves,
(f) estimating stature of the subject from said skeleton curves computed from said set of frames of said acquired video sequences,
(g) constructing an initial skeleton model having skeleton parameters corresponding to the stature of the subject, (h) computing pose parameters of said initial average skeleton model,
(i) constructing and displaying at a display unit an initial subject model based on said initial average skeleton model parameters and said pose parameters thereof, and
(j) tracking said initial subject model performed after said step (i) to compute the pose of the subject at time (t+1) based on the pose parameters at time t.

The subject initial model is preferably a super-quadric subject model which is iteratively refined and optimized.

The mapping of each 3-D voxel of the kinematic chain to the Laplacian Eigenspace is performed in accordance analysis of the neighborhood graph of the voxels in 3-D space.

The segmenting of the 3-D voxels into their respective articulated chains is by associating each 3-D voxel with a respective one of the 1-D smooth curves in the Laplacian Eigenspace (LE) by analyzing the 1-D structure of the voxels in Laplacian Eigenspace.

The present method is applicable to a subject of any nature which may be presented as an articulated chain, including human body, animals, etc.

The present system for markerless motion capture comprises
a plurality of cameras disposed in surrounding relationship with a subject,
a data processing unit coupled to said plurality of cameras to receive video sequences therefrom, said data processor unit processing said video sequences and building a subject model to be output at a display unit.

The data processor unit preferably includes:
(a) a voxel constructing unit constructing a 3-D voxel representation of the subject image from the video sequences acquired by the cameras. The 3-D voxel representation is a kinematic structure composed of a plurality of articulated chains connected at respective joints,
(b) a Laplacian Eigenspace (LE) transformation unit mapping the 3-D voxel representation to the LE to form a plurality of smooth 1-D curves in the LE,
(c) segmenting unit for segmenting the 1-D curves in the LE,
(d) model constructing unit to output a graphical model and a skeleton model, as well as a subject model (super-quadric model) corresponding to nature of the subject,
(e) registration unit registering said segmented 1-D curves to the graphical model,
(f) skeleton curve computing unit computing skeleton curve of the subject from said segmented 1-D curves, and
(g) estimation unit estimating said subject model and the subject pose.

A pose tracking unit is coupled to the estimation unit to compute the pose of the subject at a time (t+1) based on the pose parameters at a time t.

The voxel constructing unit, for each camera (j), subtracts background data from the subject image to obtain the subject silhouette, determines a set of 2-dimensional (2-D) points $x_i^{(j)}$ for the camera (j) falling within said silhouette, populates an array $s^j$ with said points $x_i^{(j)}$, adds said arrays $s^j$ for said plurality of cameras (j) to obtain a combined array of said subject image, and thresholds said combined array to obtain said 3-D voxel representations.

The segmenting unit classifies the articulated chains into two distinct types depending on the number of connected ends thereof, initiates a spline by identifying an initial node $y_0$ on a respective articulated chain, forms a set of nodes $N_0$ closest to said initial node $y_0$, determines a respective number of principal axis for said articulated chains (said number being subject to the type of said articulated chains), grows the 1-D spline in the direction of the respective principal axis, spline fits by projecting node $y_i$ on the respective principal axis, computes a 1-D spline by calculating a spline fit error at node $y_i$ of said 1-D smooth curve in the LE to said $y_0$, minimizes said spline fit error, propagates the computed 1-D spline by adding nodes closest to a growing end of said computed 1-D spline, defines outlier nodes for which the spline fit error exceeds a predetermined threshold, and terminates the spline growing when the number of the outlier nodes exceeds a predetermined value.

The estimation unit estimates a stature of the subject from the skeleton curves computed from a set of frames of the acquired video sequences, uses an initial average skeleton model having skeleton parameters corresponding to the stature of the subject, computes pose parameters of the initial average skeleton model, constructs an initial subject model based on the initial average skeleton model parameters and said pose parameters thereof, and reiteratively refines the subject model and pose.

These and other features and advantages of the present invention will become apparent after reading a further description of the preferred embodiment in conjunction with the accompanying patent Drawings.

BRIEF DESCRIPTION OF THE DRAWINGS

FIGS. 3A-3F represent a block-diagram of the markerless motion capture system and method of the present invention;

FIG. 7 is a block diagram representing a process of construction of 3-D voxel representation of the subject body;

FIG. 8A represents a human body as six articulated chains embedded in 3-D space;

FIGS. 8B-8C represent transformation of human body voxels from 3-D space (FIG. 8A) into the Laplacian Eigenspace of 6 dimensions;

FIGS. 8D-8F represent the results of segmentation of the human body voxels and registration of the fitting spline segments to the articulated chains of the subject body in voxel representation;

FIGS. 9A-9D represent a sequence of performing registration of body segments;

FIGS. 12A-12E are a graphical representation of the process for estimation of the pose at each key frame that minimizes the voxel-model fitting error, wherein FIG. 12A is a voxel representation of the subject body; FIG. 12B is the representation of the model constructed from initial estimate of the super-quadric parameters; FIGS. 12C and 12D are representations of the model superimposed with the voxels before and after the pose refinement, respectively; and FIG. 12E is the diagram of the model in the voxel representation;

FIG. 13 is a block-diagram of a tracking unit of the present system;

FIG. 15A-15D represent the properties of transformation to the Laplacian eigenspace;

FIG. 16A is a representation of the structure of the extended star graph;

FIGS. 16B-16C are representations of symmetric and asymmetric extended star graph with n=4, respectively;

FIGS. 22A-22G illustrate the process of segmentation and registration in LE, wherein FIG. 22A is a voxel representation in a normal space, FIGS. 22B-22C illustrate the segmented nodes in LE, FIG. 22D represent labeled segmented body in the original 3-D space, FIG. 22E illustrates the computed skeleton, FIG. 22F illustrate two joints, and the correct registration of the segments is shown in FIG. 22G;

FIGS. 24A-24C represent the subroutine for computing distance between the skeleton curve and skeleton model wherein FIG. 24A is a graph of sample points on skeleton curve; FIG. 24B is a graph of a distance to the closest point or skeleton model before optimization, and FIG. 24C denotes the same distance after optimization;

FIG. 26 presents the fit of skeleton after the stature has been optimized;

FIG. 27 presents the fit of skeleton after the joints locations have been optimized;

FIGS. 29A-29D represent segmentation and registration results for different subjects and poses;

FIGS. 31A-31E represent results of human body estimation from 3-D scan obtained for different subjects.

PREFERRED EMBODIMENTS OF THE PRESENT INVENTION

Figure 1:
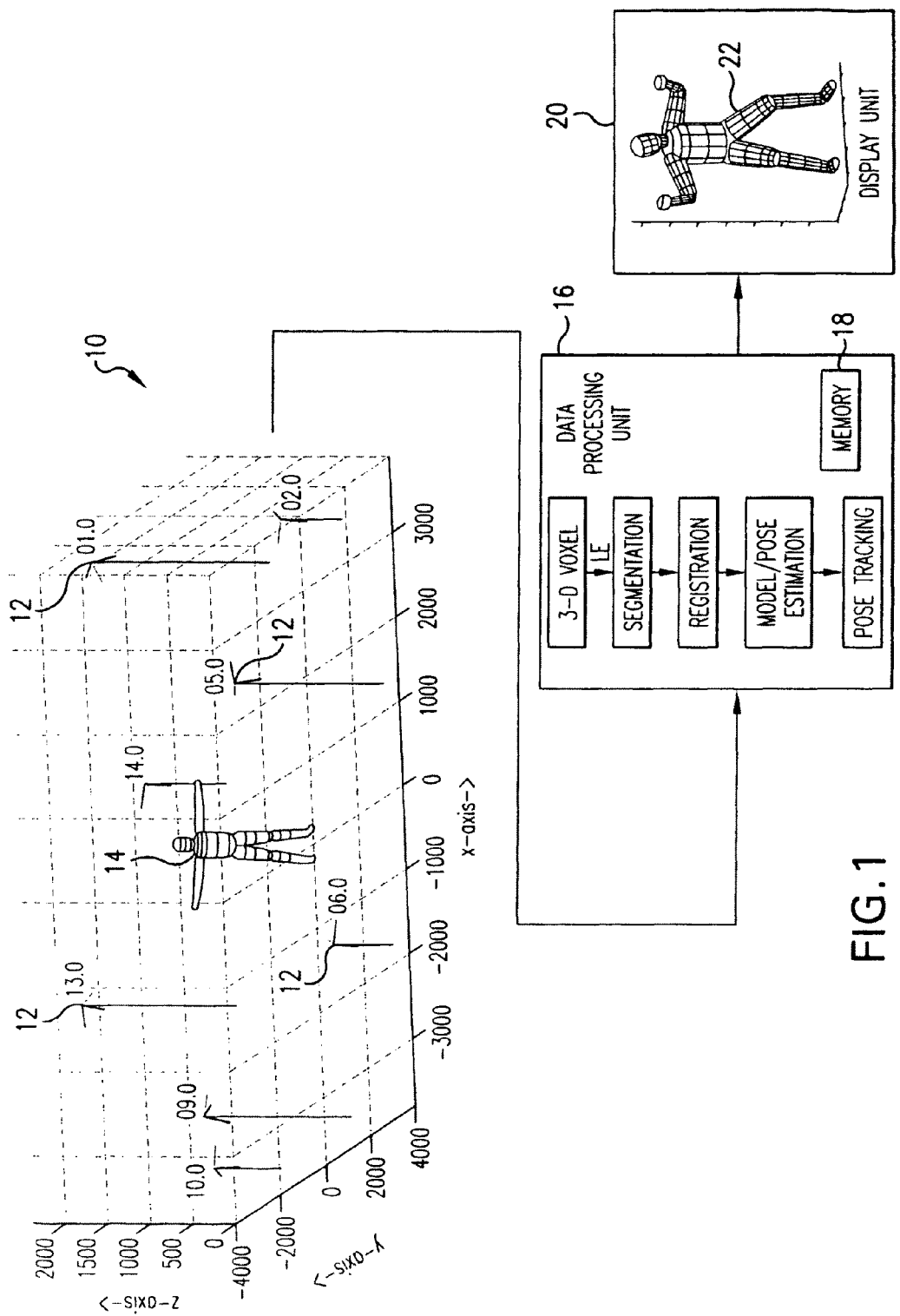
FIG. 1 is a schematic representation of the present system specifically associated with the motion capture environment.

Referring to FIG. 1, the system 10 of the present invention uses a plurality of cameras 12 positioned in surrounding relationship with a subject 14 to acquire video sequences (images) of the subject motion. The video sequences are processed in a data processor unit 16 in accordance with a novel technique underlying the operation of the entire markerless motion capture system 10 of the present invention and presented further in detail. The results of data processing are recorded in a memory 18 of the computer (processor unit) 16, as well they are displayed at a display unit 20 for observation by a user. The data processor unit operates in accordance with an algorithm 180 which includes subroutines for processing images to build 3-D voxel reconstruction, mapping the 3-D voxel structure to the Laplacian Eigenspace, segmentation and registration of 1-D representations of body parts, model/pose estimation, and pose tracking.

The system 10 is a completely automated end-to-end system which exploits a previously unused property of Laplacian Eigenmaps in a novel manner to segment 3D volumes into different non-rigid 1-D segments.

The present system and method are efficient and flexible enough to deal with different complex configurations of the non-rigid 3D object being segmented and naturally lends itself to skeletonization. The present novel technique may be used to acquire models and estimate pose using multiple video cameras for markerless motion capture. It is to be understood, that the present technique is applicable to different subjects as long as it can be presented as an articulated chain. As one of the examples, the further description will be given relative to a human subject.

Figure 2A:
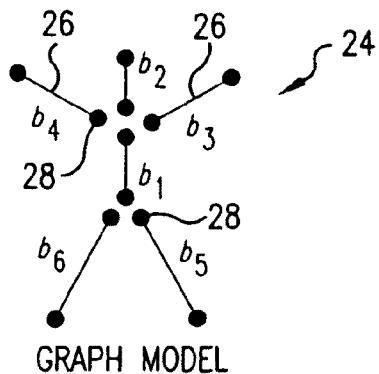
FIG. 2A is a graph representation of a human body model including six articulated rigid segments (chains)
Figure 2B:
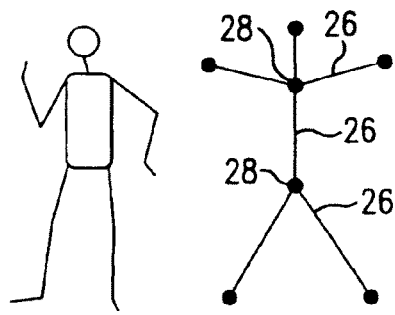
FIGS. 2B-2C is a graph representation of human body model in various poses.
Figure 2C:
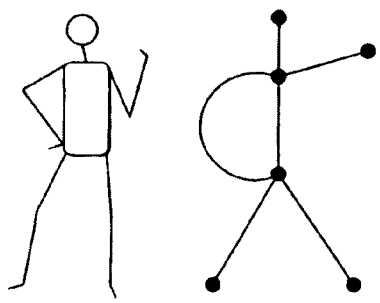

The human body may be presented by a graph model 24 composed of six articulated chains 26 connected at joints 28 as illustrated in FIGS. 2A-2C. The segments 24 presented by a graph model composed of labeled $b_1$, $b_2$, $b_3$, $b_4$, $b_5$, and $b_6$ in FIG. 2A correspond to the trunk, head, left arm, right arm, left leg and right leg respectively. The graph model of the human body, shown in FIGS. 2A-2C, is used in the present system for estimation and building of the resulting human body model 22 shown in FIG. 4 displayed on the display unit 20 as will be described in detail in further paragraphs.

The block diagram presented in FIGS. 3A-3C illustrates the steps of the markerless motion capture process underlying the operation of the system 10. In FIG. 3A, the video sequence of the subject motion is acquired by a plurality of cameras. The video sequence includes a set of frames 30, each acquired at specific time instance. For each frame 30, the system performs space carving to compute 3-dimensional (3-D) volumetric data (voxel) representation 32 of the subject image, as will be described in detail in further paragraphs. The computed 3-D voxel representation 32 is presented in FIG. 3B.

Further, the 3-D voxels are mapped to the Laplacian Eigenspace where the 3-D voxel representation 32 is transformed into a structure composed of a plurality 1-D curves 34 connected in a specific manner at nodes 38, as shown in FIG. 3C. Laplacian eigenmap transformation is used that maps voxels belonging to each articulated chain 36 of the 3-D voxel representation 32 to the smooth 1-D curve 34 in eigenspace.

A bottom-up technique underlies the operation of the system 10 for segmenting 3-D voxels into component articulated chains 36, e.g. different body parts. The segmentation (FIG. 3D) is performed in eigenspace by fitting 1-D splines to nodes. The voxels are first transformed into a high dimensional space which is the eigenspace of the Laplacian of the neighborhood graph. The properties of this transformation are exploited and 1-D splines are fitted to voxels belonging to different body segments in eigenspace. The properties of Laplacian eigenmaps are particularly suitable for the purpose of fitting 1-D splines and segmentation. The boundary between two splines is determined by examination of the error in spline fitting. Fitting splines enables the system to compute the position of each voxel along the 1-D chain and may be used to estimate a skeleton of the body segment in 3-D space.

A top-down registration is further preformed which uses the graphical model 24 of the human body presented in FIG. 2A in a probabilistic framework to identify the segmented body parts and resolve possible ambiguities in the registration and to result in the connected skeleton curve 40 shown in FIG. 3E. The probabilistic approach is used to register the segmented body parts by utilizing their connectivity and prior knowledge of the general structure of the subjects. The probabilistic approach combined with the properties of the transformation enables the present technique to successfully deal with simple poses (FIG. 2B) as well as complex poses (FIG. 2C). The results of the computations are presented using real and as synthetic data. The output of the segmentation and registration steps, e.g. the skeleton curve 40, is further used for a set of key frames to automatically estimate the parameters of the human body model 22, shown in FIG. 3F, which is referred to herein as an initial body model. A tracking algorithm, presented in further paragraphs, is further used to track the changes in the estimated initial body model. The resulting body model is presented at the display unit.

The present system 10 is capable of automatically estimation of the human body models using the output of the segmentation algorithm. While human subjects are used in the experiment, the method and system are fairly general and may be applied to voxel-based registration of any articulated or non-articulated object which is composed of primarily 1-D parts.

Figure 4:
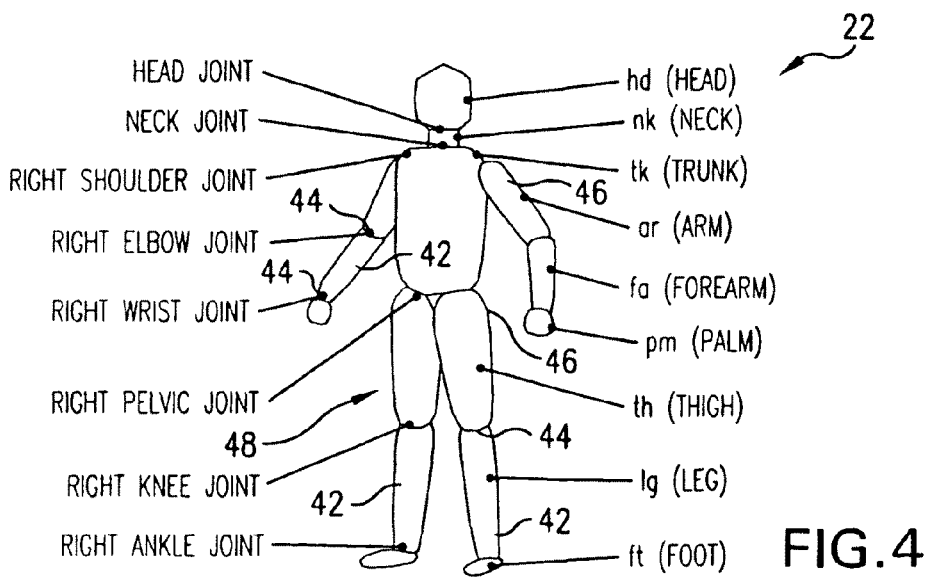
FIG. 4 represents a super-quadric based human body model with the body segments and some joint locations labeled.

The present system 10 uses a human body model 22 presented in FIG. 4 as a human body composed of rigid body segments 42 connected at joints 44 and free to rotate about the joint connecting two segments. Various types of models are available that may be used in the present system depending on applications and the issues addressed with respect to the appearance and motion of human beings and their relation to the body structure and various joints. The human body model 22 illustrated in FIG. 4 shows the different body segments as well as some joints labeled. In the processing unit, each of these body segments 42 have a coordinate frame (not shown) attached to them. The segment 42 may be described by an arbitrary shape in terms of the coordinates of this frame, and as an example may be modeled using a tapered super-quadric 46, shown in FIGS. 5A-5C. The trunk thus serves as the base and the neck and head segments as well as the four limbs form kinematic chains 48 originating from the trunk.

It has been noted that the human body model introduced in FIG. 4 permits to represent the human body in a large set of postures and is yet simple enough to describe in terms of relatively few parameters. The tapered super-quadrics 46 are used in order to represent the different body segments for their simplicity and flexibility. They capture the shape of different body segments using just five intuitive parameters in this case. The compact representation used makes it easy to estimate the parameters of the super-quadrics. It is also contemplated, alternatively, to use a human body model with rigid triangular mesh structures for each body segment. Estimation of such mesh objects may generally be difficult unless accurate 3-D scans are available.

The tapered super-quadric is given by $$\left(\frac{x}{x_0}\right)^2 + \left(\frac{y}{y_0}\right)^2 = \left(1 + s\frac{z}{z_0}\right)\left(1 - \left(1 - 2\frac{z}{z_0}\right)^d\right) \quad \text{(Eq. 1)}$$

where z takes values in $[0, z_0]$, and is characterized by the parameters $x_0$, $y_0$, $z_0$, d, and s.

Figure 5A:
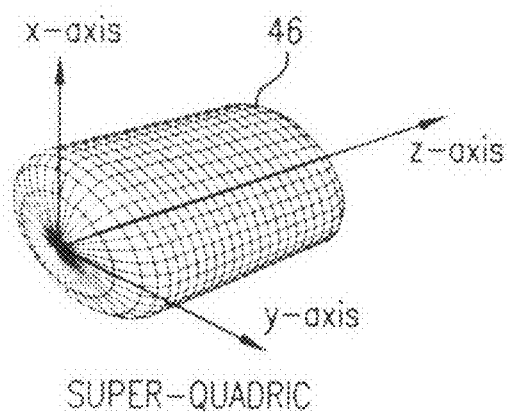
FIGS. 5A-5C represent parameters of the super-quadric segments of the human body model.
Figure 5B:
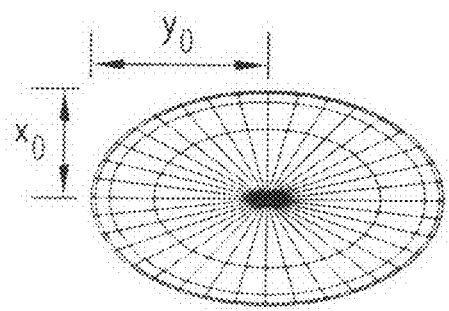
Figure 5C:
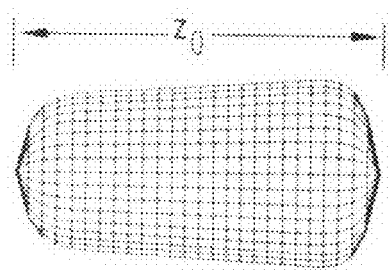

The meaning of the parameters of the tapered super-quadrics is illustrated in FIGS. 5A-5C. If the super-quadratic shown in FIG. 5A is sliced in a plane parallel to the xy plane, as shown in FIG. 5B, the cross section is an ellipse with parameters $\alpha x_0$ and $\alpha y_0$, where $\alpha$ is a scalar. The length of the segment is $z_0$ as shown in FIG. 5C. The scale parameter, s, denotes the amount of taper, and the exponential parameter, d, denotes the curvature of the radius profile along the z-axis. For e.g., d=2, s=0, is an ellipsoid, d=∞, s=0 is a right-elliptical cylinder and d=∞, s=−1 is a right-elliptical cone.

A joint 44 between two body segments 42 is described as a vector in the coordinate frame of the parent body segment, connecting the origin of the parent segment coordinate frame to the origin of the child segment. The pose of the child segment is described in terms of the rotational parameters between the child coordinate frame and the parent coordinate frame. The trunk, which forms the base of the kinematic chain, has 6 degree-of-freedom (DoF) motion, both translational and rotational. The body model 22 includes the locations of the joints of the different body segments.

Figure 6:
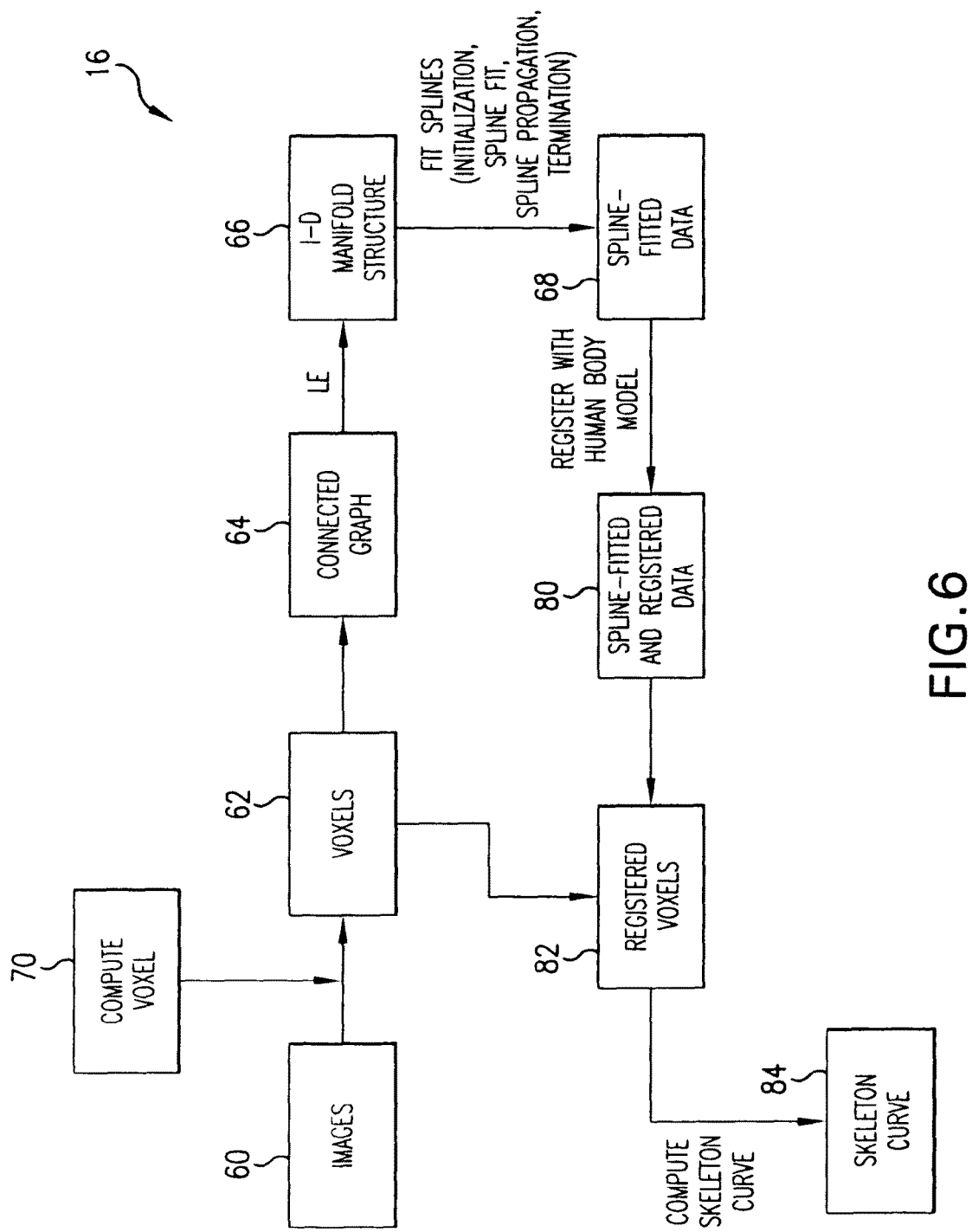
FIG. 6 is a flow-chart diagram of the sub-routine of the present process which segments voxels into articulated chains and computes skeleton curve of the subject body.

Referring to FIG. 6 representing the flow-chart of the algorithm of the process underlying the operation of the system 10, the process starts at block 60 "Images" where the images of the subject are acquired by a plurality of cameras 12. The video data are supplied to the processor unit 16 which builds a complete articulated human body model 22 using video obtained from multiple calibrated cameras 12.

The process further follows to block 62 "Voxel" to build 3-D voxel representation of the subject image. For this purpose, the processor unit 16 performs background subtraction on the images to obtain the silhouettes. Background subtraction algorithms depend on the capture environment and are adjusted to the conditions of the image acquisition. In this step, as presented in FIG. 7, the processor unit 16 analyzes each frame taken by each camera. As shown in blocks 70,...70$_n$, for each camera j=1...n, the silhouette is obtained by using background subtraction in each frame. Then, the processing unit determines if set of 2D points $x_i^{(j)}$ for camera j, lie within the foreground silhouette, and correspondingly populates an array $s^j$ in blocks 72$_1$-72$_n$.

Further, the 3-D voxel reconstruction is performed by adding the arrays for all cameras 1...n in block 74 "Add $s_j$". Further, the resulting array sum obtained in block 74 is thresholded in block 76 "Threshold" to obtain 3D voxels representation, $X_i$ in block 78 "3-D voxels".

Returning to FIG. 6, once the 3-D voxel representation is constructed in block 62, the logic flows to block 64 "Connected graph" where an adjacency graph is computed for the voxels based on their connectivity, as will be further described.

Figure 8D:
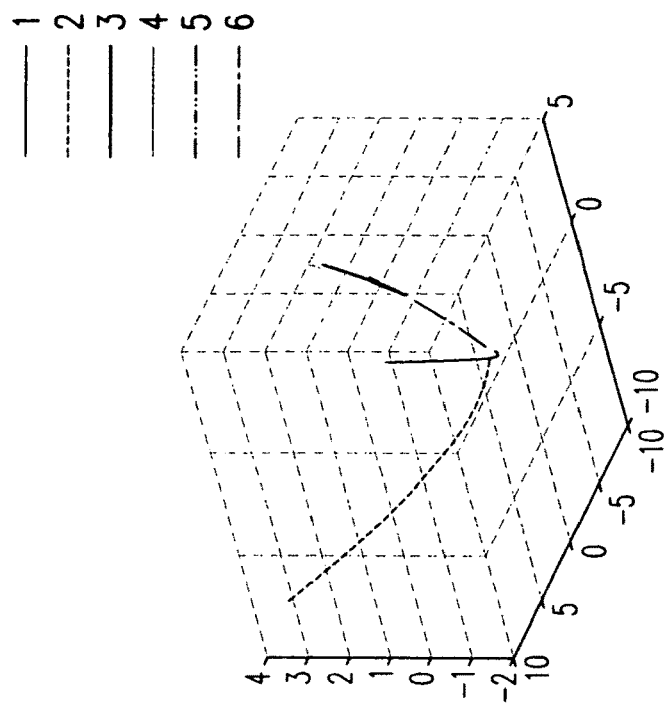
Figure 8C:
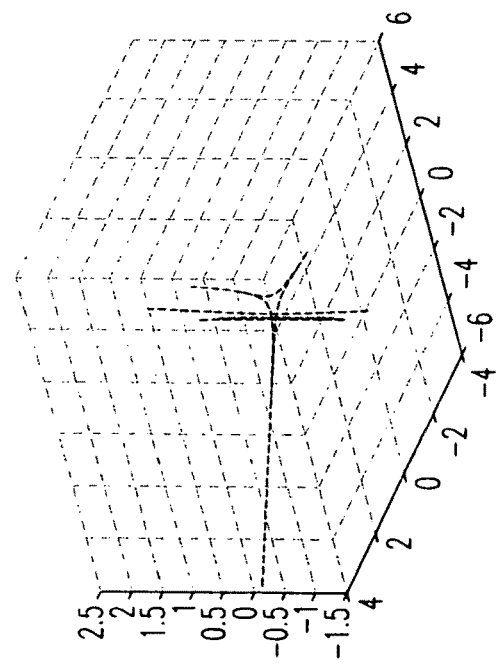

Further, the processor unit 16 applies the Laplacian Eigenspace (LE) transformation to the adjacency graph. The voxels are transformed to LE in block 66 "One-dimensional manifold structure" where they form 1-D manifolds, also referred to herein as 1-D curves. These 1-D manifolds (curves) are segmented in block 68 "Spline-fitted data" by fitting 1-D splines. FIG. 8A shows the six articulated chains, the head and four limbs, attached to the trunk as obtained in block 62 of FIG. 6. The purpose of the procedure in the blocks 66 and 68 of FIG. 6 is to extract the 1-D structure of the voxel data, as well as successfully segment them into different articulated chains. The articulated nature of these chains, however, makes it difficult to segment them in normal 3-D space. Therefore the present system adopts the method to extract the geometric structure of the underlying 1-D manifold. In the first part of the algorithm, the voxels are segmented into different articulated chains and the "position" of the voxel along the articulated chain is also obtained. The voxels are transformed into the Laplacian Eigenspace of six dimensions presented in FIGS. 8B-8C, where the voxels are segmented by fitting splines to the voxels in eigenspace, the results of which are shown in FIGS. 8D-8E, where each spline is associated with a corresponding articulated segment of FIG. 8F. For each voxel, a parameter is obtained describing its location on the spline representing that articulated segment. This voxel registration is an important step and is used at various stages in the algorithm. Once the six spline segments representing the six articulated chains are obtained in block 80 "Spline-fitted and registered data", where each segment may be visualized as an edge connecting two nodes. Thus, twelve nodes and six edges are obtained as shown in FIG. 9A. "Close" nodes are further connected, as shown in FIG. 9B. The algorithm further merges the nodes, as shown in FIG. 9C, and registers to the graph structure of the human body model (skeleton curve) shown in FIG. 9D. The segmented 1-D manifolds are registered to the graph of the human body model in block 82 of FIG. 6.

The skeletal representation (skeleton curve) is constructed in block 84 "Skeleton" of FIG. 6. It may happen that the system may not be able to successfully register the voxels to the articulated chains at all time instances in case of error in the voxel estimation or in the case of a difficult pose. Therefore, while the method may not be useful in performing pose estimation at every frame, it is able to acquire the model and simultaneously estimate the pose of the human subject in a few key frames where the registration is successful.

Figure 10:
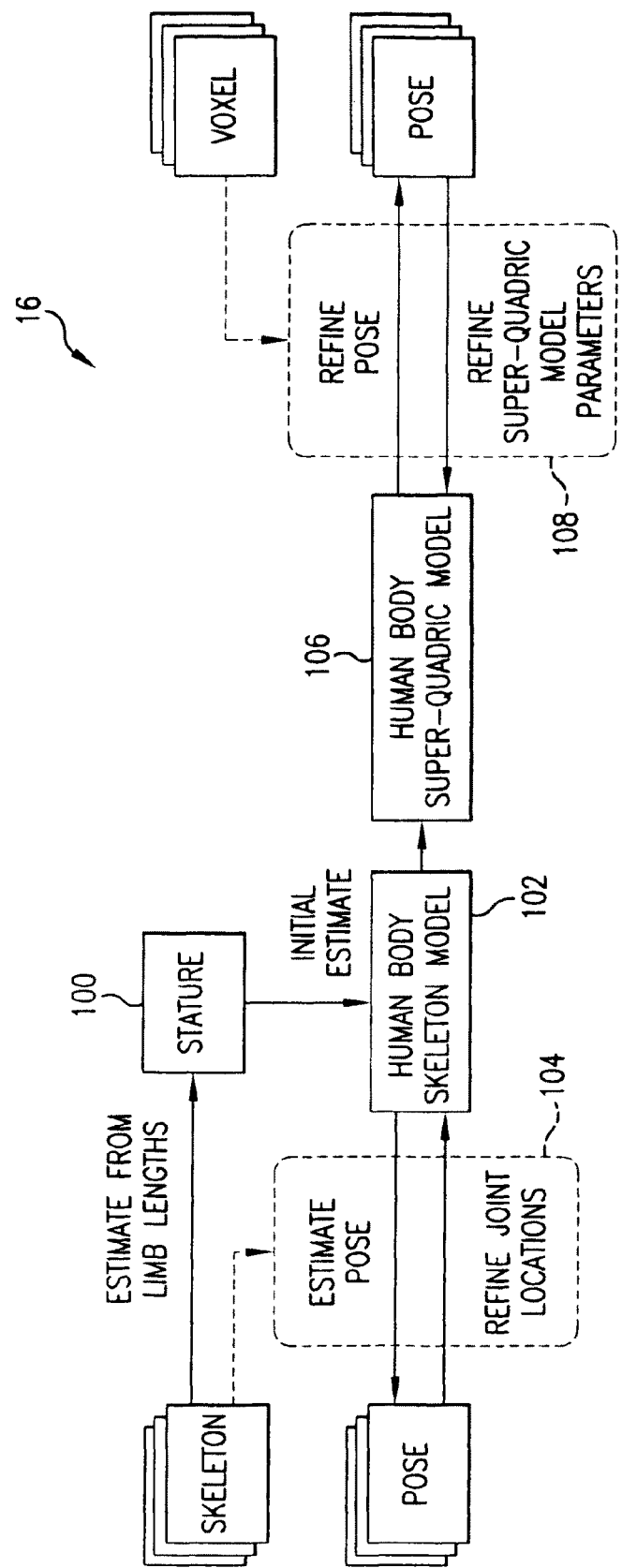
FIG. 10 is a flow-chart diagram of the subroutine for estimating the model and subject pose parameters.

The model acquisition algorithm of the present system continues further, as shown in FIG. 10, from the output of FIG. 6, so that the model parameters may be obtained for the subject progressing from the simple skeleton model (FIG. 9D computed in block 84 of FIG. 6) to the complete superquadric model.

FIG. 10 is a flow-chart presenting the steps in the subroutine for estimating the human body model given a set of frames (key frames) where the voxels have been successfully segmented and registered, and skeletons computed. In FIG. 10, an initial estimate of the human body "skeleton" obtained from the key frames allows to estimate the human body model parameters and the pose which are iteratively optimized to minimize the model fitting error with the computed skeleton. The human body model parameters include the joint locations and the shape (super-quadric) parameters of the different body segments.

In FIG. 10, the procedure starts in block 100 "Stature" to estimate the stature (height) of the person from limb lengths in the segmented skeletons computed in the procedure shown in FIG. 6. From the stature the logic makes an initial estimate of the human skeleton model and in block 102 "Human Body skeleton model", builds a basic body skeleton for different values of the stature and finds the model that best fits the key frame skeletons.

Figure 11:
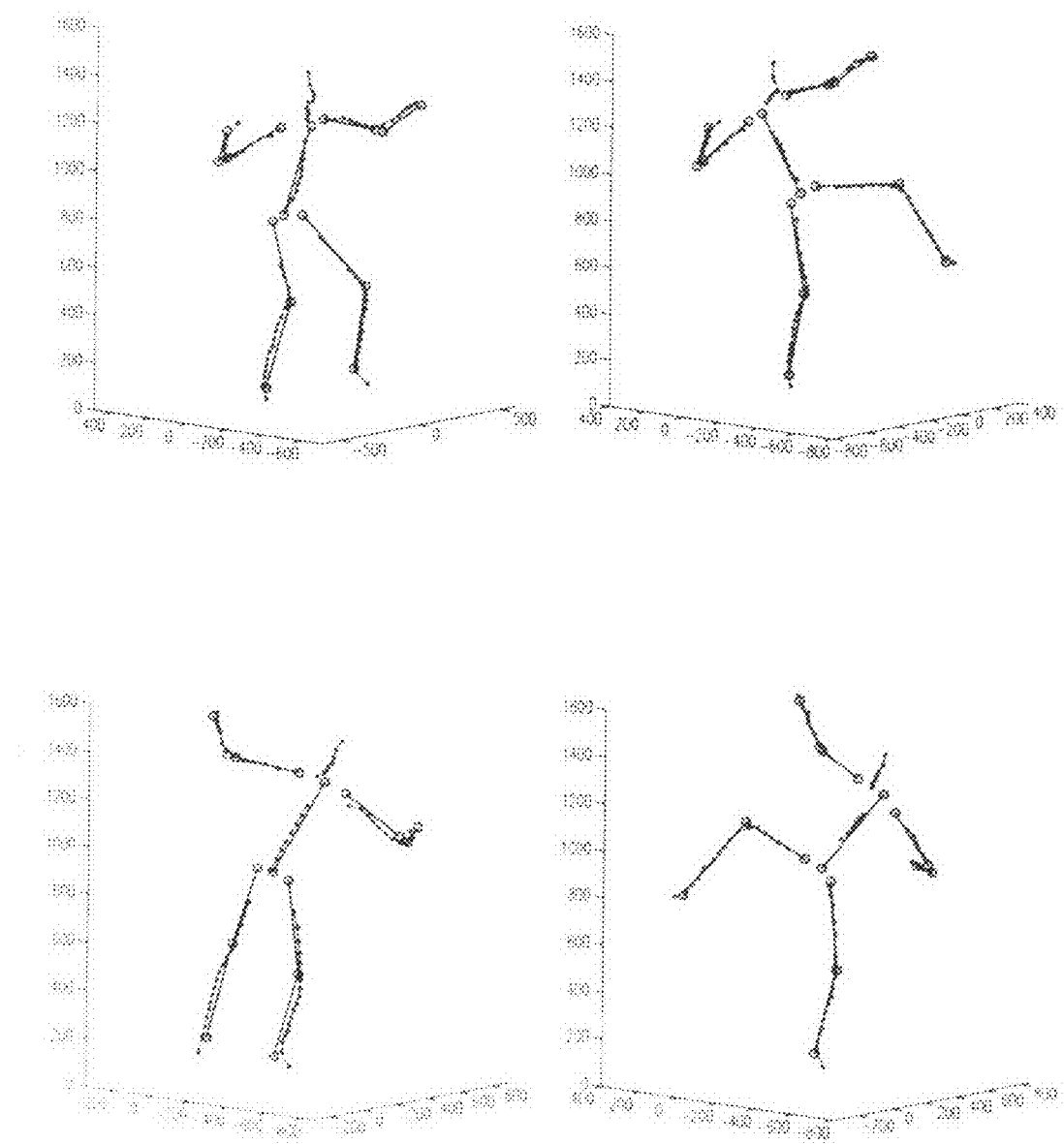
FIG. 11 is a graph representation of an optimized model superimposed on computed skeleton.

Further, the pose may be estimated in block 104 at each key frame that minimizes the skeleton-model fitting error. In block 104, the body model parameters (joint locations at this stage) that minimize the skeleton model fitting error are estimated, and iterate until the values converge numerically, as shown in FIG. 11.

Once the skeleton model and the pose have converged, the human body "super-quadric" model is estimated in block 106 using the skeleton model and pose as a starting point, e.g. the parameters of the super-quadric body segments are estimated based on the currently existing body model parameters.

The logic further follows to block 108 to estimate the pose at each key frame that minimize the voxel-model fitting error and to estimate the body model parameters (super-quadric parameters) that minimize the voxel-model fitting error. This process iterates until the values converge numerically, as shown in FIG. 12A. The model of FIG. 12B is constructed from initial estimate of the quadratic parameters is compared with the voxels (FIG. 12A), and super-imposed with voxels before pose refinement (FIG. 12C) and after (FIG. 12D). FIG. 12E illustrates synthetic voxel representation.

It is the objective to use the knowledge of the general structure of the human body in order to estimate the parameters of the human body model. In the present model acquisition procedure the parameters of the model as well as the pose are simultaneously estimated. This algorithm may be also used to estimate the pose at each frame, but, as noted earlier, the registration to the articulated chains at the voxel level may not succeed for all frames. However, the pose at regular intervals may be estimated and tracking methods described further may be used to estimate the pose in the intermediate frames.

The tracking technique may be used which combines multiple cues, such as pixel displacements, silhouettes and "motion residues" to track the pose. The objective is to estimate the pose at time t+1 given the pose at time t, using the images at time t and t+1. The pose at t+1 is estimated in two steps, the prediction step and the correction step as illustrated in FIG. 13. The motion information between time t and t+1 is used to predict the pose at time t+1 in the first step, while the spatial cues at time t+1 are used to correct the estimated pose.

Images at time t and t+1 are used to compute pixel motion at time t in block 130. This pixel displacement is used to predict the change in pose between time t and t+1 in block 132. The output of the step is Pose (t+1|t) in block 134. Since pixel motion is used in this step, the estimates tend to drift over a period of time. In order to correct the drift, the pose is corrected in block 136 at time t+1 using spatial measurements at time t+1 from block 138. The spatial measurements at time t+1 include motion residues as well as image silhouettes at time t+1. More in detail, the steps required to estimate the pose at time t+1 are listed below in the following paragraphs. Particularly, Pixels are registered to body segments and the 3D coordinates are obtained at time t using the known pose at t. Each body segment is converted into a triangular mesh and project it onto each image. Thus the 3-D coordinates of some the pixels are obtained in the image corresponding to the mesh vertices. The 3-D coordinates and of all the pixels belonging to that segment by interpolation may be computed.

Pixel displacement is estimated between time t and time t+1 for each all pixels in the mask for each body segment and each image.

Pose at time t+1 is predicted using pixel displacement of pixels belonging to all body segments and in all images.

Silhouette and "motion residue" are combined for each body segment into an "energy image" for each body segment and each image.

The predicted pose at time t+1 is corrected using the "energy image" obtained in previous step using optimization.

Figure 14:
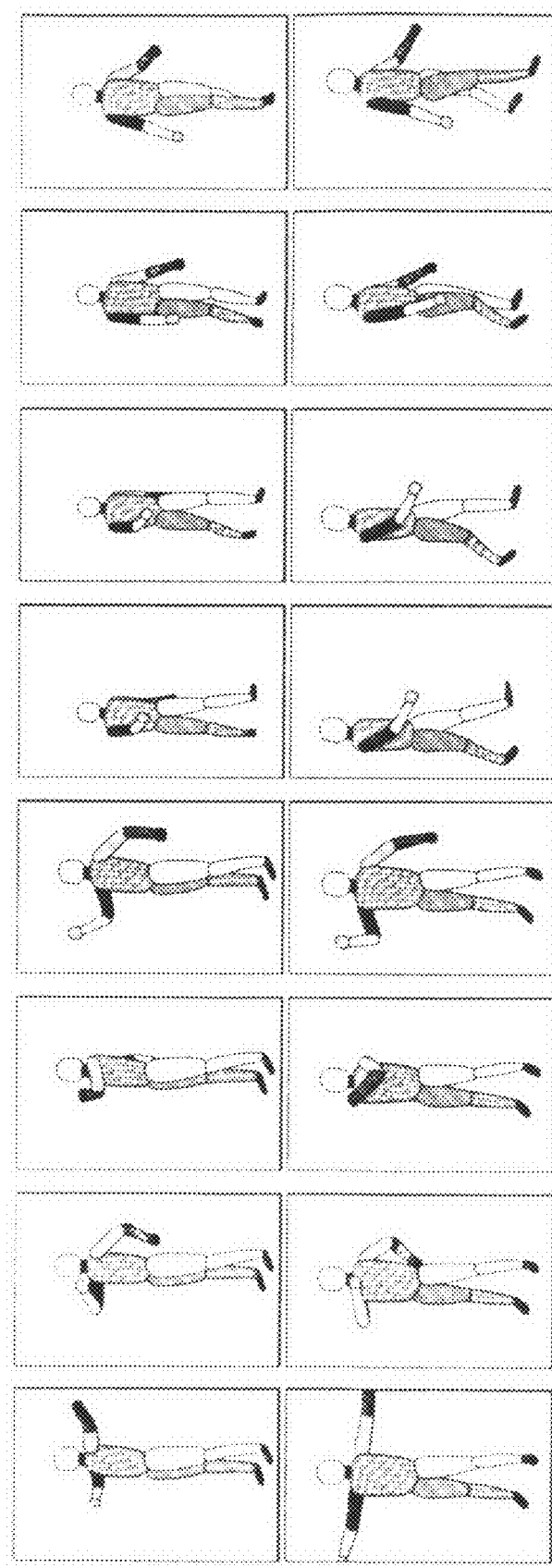
FIG. 14 presents tracking results using both motion and spatial cues.

FIG. 14 illustrates tracking results using both motion and spatial cues. The images are obtained from two cameras. The images at the left belong to the first sequences of the images, while the images on the right belong to the second sequence.

Transformation to the Laplacian Eigenspace

The process of the transformation to the Laplacian eigenspace which is performed in block 66 of FIG. 6 may be described using the example in FIGS. 15A-15D. The example has been chosen to highlight certain features of the transformation. The 2-D object in the image consists of several non-rigid chains of varying widths and lengths connected at a single joint. One of the chains (a) has self-contact and one of the chains (b) has a sharp "bend". The object is first sampled on a regular grid and the graph G(V, E) is obtained that describes the connectivity between neighboring nodes (shown in FIG. 15B). Let the number of nodes in the graph be m. The weight matrix, W, can be computed from the graph, G, so that $W_{ij}$, the (i, j)$^{th}$ component of W, is set to 1, if the node I is a neighbor of j. Although these nodes lie on a 2-D plane in this example, they could lie in any high dimensional space as long as we are able to compute G(V, E) and W.

Figure 15B:
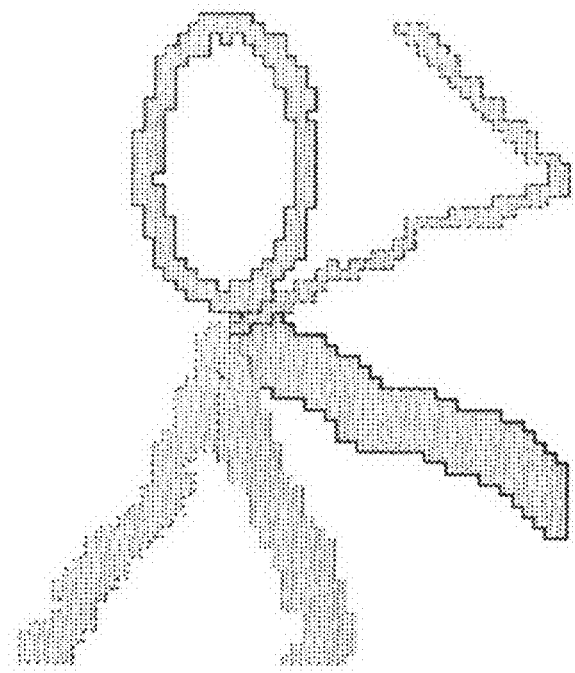
Figure 15A:
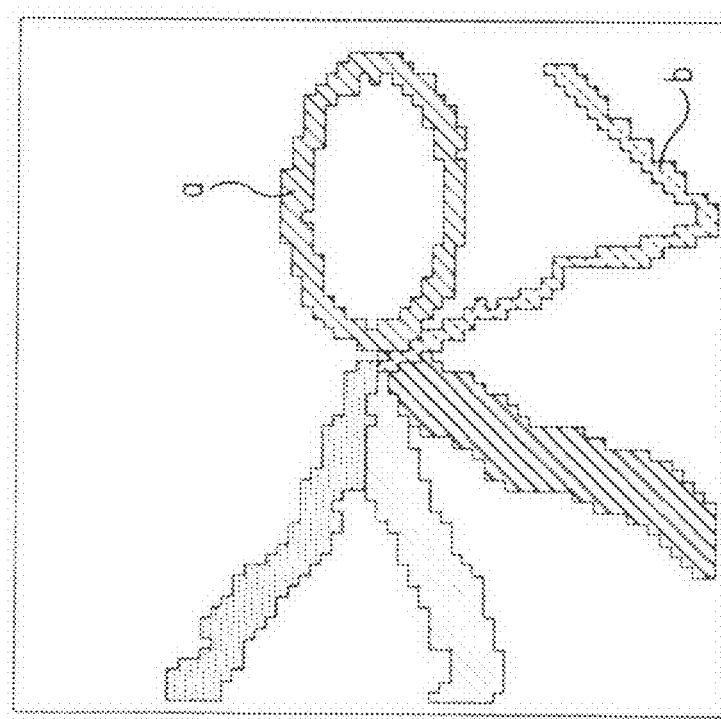

The i$^{th}$ node of the graph G is to be mapped to a d-vector $y_i$ such that adjacent nodes lie close to each other. This constraint is equivalent to minimizing $$\sum_{i,j} \|y_i - y_j\| W_{ij} = tr(Y^T L Y), \quad \text{(Eq. 2)}$$

where L=D−W, D is a diagonal matrix with entries given by $D_{ii} = \Sigma_j W_{ij}$ and $$Y = (y_1 y_2 \ldots y_m)^T = (x_1 x_2 \ldots x_d)$$

is a m×d matrix, the i$^{th}$ row of which provides the embedding, $y_i^T$, for the i$^{th}$ node. The constraint $Y^T Y = I$ is imposed to remove an arbitrary scaling factor. Thus the solution for Y is $(x_1 x_2 \ldots x_d)$, where $x_1, \ldots, x_d$ are the d eigenvectors with the smallest non-zero eigenvalues of the system Lx=λx. It is noted that the smallest eigenvalue is zero and the corresponding eigenvector is $x_0=1$. This eigenvector is ignored in the present analysis. If the graph is fully connected, all other eigenvalues are greater than zero. It is assumed that the graph is fully connected. If the graph is not fully connected the largest connected subgraph is considered. The nodes in the image space in FIG. 15B are mapped to points in 6-D Laplacian eigenspace as shown in FIG. 15C-15D. In addition to minimizing the expression in (Eq. 1), the Laplacian eigenvectors also possess certain properties that are described in the following section, and motivate our segmentation algorithm.

Properties of Laplacian Eigenvectors

Certain observations are made about the Laplacian eigenvectors based on the example in FIGS. 15A-15D. These observations are justified by exploring the properties of the Laplacian eigenvectors of special types of graphs such as the grid graph and extended star graph in further paragraphs. Each of the eigenvectors maps the nodes belonging to each chain to points along a smooth 1-D curve so that neighboring nodes are close to each other as shown in FIGS. 15C-15D. The nodes are mapped to a 1-D curve irrespective of the thickness of the chain to which they belong. Points on different chains are mapped to different curves in eigenspace such that each of the curves can be discriminated from the others. It is noted that the discriminative capability of the transformation improves with the dimensionality of the eigenspace and that the 1-D structure is retained. It is also observed that the position of each node along the 1-D curve also encodes the position of that node along the 1-D body part. The global nature of the transformation means that more weight is given to the large body segments and lesser weight to the smaller body segments which is also a desirable feature. The properties of two simple type of graphs, the extended star graph and the grid graph were explored in order to understand the suitability of the Laplacian eigenmaps for our purpose in the next two subsections.

1) Eigenvectors of extended star graphs: Extended star graphs are defined as graphs that are composed of $nP_m$-type graphs that are connected at one end to a common node as illustrated in FIG. 16A. There are $p = \Sigma_{j=0}^{n-1} m_j + 1$ nodes, that are labeled, $x_0, x_1, \ldots, x_p$. Let $x = (x_0 \, x_1 \ldots x_p)^T$ be an eigenvector of the Laplacian. $x_i$ also serves as a label for the $i^{th}$ node. The node with index $\Sigma_{l=0}^{j-1} m_l + i$, i.e., the $i^{th}$ node ($i=1, 2, \ldots, m_j$) in the $j^{th}$ segment ($j=0, 1, \ldots, n-1$) is also labeled $x_i^{(j)}$ for the sake of clarity in representation. $x_0^{(j)}$ ($j=0, 1, \ldots, n-1$) represents $x_0$. The graph is asymmetric in general, i.e., $m_i \neq m_j$. The graph is symmetric if $m_0 = \ldots = m_{n-1} = m$. The structure of the eigenvectors corresponding to the smallest non-zero eigenvalues is explored in each case.

The Laplacian eigenvector, x, needs to satisfy the following equations.

$$nx_0 - \sum_{j=0}^{n-1} x_1^{(j)} = \lambda x_0 \quad \text{(Eq. 3)}$$

$$2x_i^{(j)} - x_{i-1}^{(j)} - x_{i+1}^{(j)} = \lambda x_i^{(j)}, \quad \text{(Eq. 4)}$$
$$1 \leq i < m_j, 0 \leq j \leq n-1$$

$$x_{m_j}^{(j)} - x_{m_j-1}^{(j)} = \lambda x_{m_j}^{(j)}, \quad \text{(Eq. 5)}$$
$$0 \leq j \leq n-1$$

It is noted that Eq. 4 and Eq. 5 are similar to the equations for the path graph, $P_m$, and the ring graph, $R_m$ graphs respectively (supplemental material). The solution for the set of equations in Eq. 4 is of the form Eq. 6.

$$x_i^{(j)} = \beta^j \sin(\theta_j + \phi i) \text{ for } 0 \leq i \leq m_j. \quad \text{(Eq. 6)}$$

The eigenvalue, $\lambda$, is given by $2 - 2\cos\phi$. It is noted that Eq. 5 follows from Eq. 4 if $x_m^{(j)} = x_{m+1}^{(j)}$.

$$\sin(\theta_j + \varphi m_j) = \sin(\theta_j + \varphi(m_j + 1)) \quad \text{(Eq. 7)}$$
$$\theta_j = \frac{\pi}{2} - \frac{\varphi}{2}(2m_j + 1)$$

$$x_0^{(0)} = x_0^{(1)} = \ldots = x_0^{(n-1)} \quad \text{(Eq. 8)}$$
$$\beta^0 \sin(\theta_0) = \beta^1 \sin(\theta_1) = \ldots = \beta^{n-1} \sin(\theta_{n-1})$$

Substituting Eq. 6 in Eq. 3, it is obtained $$n\beta^0 \sin\theta_0 - \sum_{j=0}^{n-1} \beta^j \sin(\theta_j + \varphi) = (2 - 2\cos\varphi)\beta^0 \sin\theta_0. \quad \text{(Eq. 9)}$$

The symmetric and the asymmetric cases are considered below.

a) Symmetric case: $m_j = m \forall j$ and it follows from Eq. 7 that $\theta_j = \theta$. Substituting in Eq. 9, it results in $$n\beta^{(0)} \sin\theta - \sin(\theta + \varphi) \sum_{j=0}^{n-1} \beta^{(j)} = (2 - 2\cos\varphi)\beta^{(0)} \sin\theta. \quad \text{(Eq. 10)}$$

The solution to Eq. 10 depends on whether $\sin\theta = 0$ or $\sin\theta \neq 0$. If $\sin\theta = 0$, from Eq. 7 it follows: $\phi = k\pi/(2m+1)$ for $k = 1, 3, 5, \ldots$.

$$x_i^{(j)} = \beta^{(j)} \sin(k\pi i/(2m+1)). k=1, 3, 5, \ldots \quad \text{(Eq. 11)}$$

The eigenvalue is given by $2 - 2\cos(k\pi/(2m+1))$. Eq. 11 satisfies the conditions in Eq. 4 and Eq. 5. Substituting $x_0 = x_0^{(j)} = 0$ and $x_i^{(j)} = \beta_i^j \overline{x}_i$ in (2), it results in $\Sigma_{j=0}^{n-1} \beta_i^j = 0$. A set of eigenvectors is considered, $x_1$ given by $$x_1(0 \beta_1^0 \overline{x}^T \beta_1^1 \overline{x}^T \ldots \beta_1^j \overline{x}^T \ldots \beta_1^{N-1} \overline{x}^T)^T, \quad \text{(Eq. 12)}$$

where $\overline{x} = (\overline{x}_1 \overline{x}_2 \ldots \overline{x}_m)^T$, $\overline{x}_i = \sin(\pi k i/(2m+1))$, and $x_i^{(j)} = \beta_i^j \overline{x}_i$. In order to ensure that the eigenvectors form an orthonormal set, it is suggested $$(x_1 x_2 \ldots)^T (x_1 x_2 \ldots) = I. \quad \text{(Eq. 13)}$$

Let $\overline{x}^T \overline{x} = c$. Then substituting Eq. 12 in the above equation, we get $$c^2 (\beta_1 \beta_2 \ldots)^T (\beta_1 \beta_2 \ldots) = I, \text{ where } \beta_1 = (\beta_i^0 \ldots \beta_i^{n-1})^T. \quad \text{(Eq. 14)}$$

Since $\Sigma_{j=0}^{n-1} \beta_i^j = 0$, the $\beta_l$ must also satisfy $\beta_l^T 1 = 0$. Thus, we are interested in vectors that, along with 1, form an orthonormal basis for $\mathbb{R}^n$. These vectors form the columns of the orthonormal matrix $B = (1/\sqrt{n} \, c\beta_1 \, c\beta_2 \ldots)$, and it is obtained $BB^T = B^T B = I$. It is possible to obtain $n-1$ such vectors, $\beta_1, \ldots, \beta_{n-1}$ and thus we have $n-1$ eigenvectors by (11). Let $b_j = (\beta_1^j \beta_2^j \ldots \beta_{n-1}^j)^T$. Then the $j^{th}$ row of B is given by $(1/\sqrt{(n)} b_j^T)$. Let us consider the mapping of nodes to $\mathbb{R}^{n-1}$ using the $n-1$ eigenvectors $x_1, \ldots, x_{n-1}$. The $i^{th}$ node on the $j^{th}$ chain is mapped to $\overline{x}_i (\beta_1^j \beta_2^j \ldots \beta_{n-1}^j) = \overline{x}_i b_j$. Thus all points on the $j^{th}$ chain are mapped to the line $\alpha b_j$ in $\mathbb{R}^{n-1}$. The angle between any two lines can be computed as $\cos^{-1}(b_i^T b_j/(\|b_i\|\|b_j\|))$. Since $BB^T = I$, considering the $(i, j)^{th}$ element of $BB^T$, it results in:

$$(1/\sqrt{n} b_i^T)(b_j^{1/\sqrt{n}}) = 1/n + b_i^T b_j = \delta_{ij}. \quad \text{(Eq. 15)}$$

Thus, $$b_i^T b_j = -1/n, \|b_i\| = \|b_j\| = \sqrt{(n-1)/n},$$

and $$\frac{b_i^T b_j}{\|b_i\|\|b_j\|} = -\frac{1}{n-1}.$$

It can be seen that the nodes are mapped to n lines in $\mathbb{R}^{n-1}$, such that each line as a negative dot product with respect to all other lines. This structure enables to easily discriminate between nodes belonging to different chains.

If $\sin(\theta) \neq 0$ in (9), we can divide (9) by $\sin(\theta)$ to obtain the following, where $l = m+1/2$.

$$n - n\sin(\theta+\phi)/\sin(\theta) = 2 - 2\cos\phi$$

$$n - n\cos(\phi) - n\sin\phi\cot\theta = 2 - 2\cos\phi$$

$$(1-\cos\phi)(n-2)/n - \sin\phi\cot\theta = 0$$

$$(1-\cos\phi)(n-2)/n - \sin\phi\cot(\pi/2 - \phi l) = 0$$

$$(1-\cos\phi)(1-2/n) - \sin\phi\tan(\phi l) = 0 \quad \text{[from Eq.7]}$$

Let $f(\phi, l) = (1-2/n)(1-\cos\phi) - \sin\phi\tan(\phi l)$. It may be shown that $f(\phi, l)$ is monotonically decreasing in $[0, \pi]$ except or the discontinuities $\phi = \pi(2k+1)/(2m+1)$ for $k=0, 1, \ldots, m-1$. The smallest possible value of $\phi$ that is a solution for $$f\left(\varphi, m_j + \frac{1}{2}\right) = 0$$

lies in the interval $[\pi/(2m+1), 3\pi/(2m+1)]$ and corresponds to the smallest non-zero eigenvalue. It is therefore seen that $\phi = \pi/(2m+1)$ corresponds to the smallest non-zero eigenvalue. It therefore has been shown that the eigenvectors corresponding to the $n-1$ smallest non-zero eigenvalues of the graph map the points to lines in $\mathbb{R}^{n-1}$, the cosines of the angles between any two of which are equal to $-1/(n-1)$. The angles for $n=3, 4, 6$ are $120.0°$, $109.4°$, and $101.5°$ respectively.

b) Asymmetric case. In this case $m_i \neq m_j$ in general. If $\sin \theta_j = 0$ for some j, then from Eq. 8, we have $\sin \theta_j = 0 \forall j$. If $\sin \theta_j \neq 0$, then it follows from (Eq. 7) that $\beta^j = 1/\sin \theta_j$ and from Eq. 9, the following is obtained $$n - \sum_{j=0}^{n-1} \frac{\sin(\theta_j + \varphi)}{\sin(\theta_j)} - 2 - 2\cos\varphi = 0_1 \qquad \text{(Eq. 16)}$$

Which can be reformulated, using Eq. 7, as $$n - \sum_{j=0}^{n-1} (\cos\varphi + \sin\varphi\cot\theta_j) - 2 + 2\cos\varphi = \sum_{j=0}^{n-1} \begin{pmatrix} (1-2/n) \\ (1-\cos\varphi) - \\ \sin\varphi\tan(\varphi l_j) \end{pmatrix} \qquad \text{(Eq. 17)}$$

$$= \sum_{j=0}^{n-1} f(\varphi, l_j)$$

$$= 0,$$

where $l_j = m_j + 1/2$. As mentioned earlier, $$f\left(\varphi, m_j + \frac{1}{2}\right)$$

is monotonically decreasing in $[0,\pi]$ except at points of discontinuity that occur at $\pi(2k+1)/(2m_j+1)$ for $k=0, 1, \ldots, m_j-1$. The sum of monotonically decreasing functions is also monotonically decreasing. The eigenvalue, $2-2\cos\phi$, is a monotonically increasing function of $\phi$ in $[0,\pi]$. We are therefore interested in the smallest values of $\phi$ that satisfy Eq. 17. Let $m_0 > m_1 > \ldots > m_{n-1}$, and let us examine the interval $$\left[0_1 \frac{2\pi}{2\max_j(m_j)+1}\right].$$

We see that if $m_0 > m_1 > \ldots > m_{n-1} > m_0/2$, then there is exactly one solution for Eq. 17 in each of the n-1 intervals $$\left[\frac{\pi}{2m_{j-1}+1}, \frac{\pi}{2m_j+1}\right]$$

for $j=1, 2, \ldots, n-1$. Let the solution in the $j^{th}$ interval be $\phi_j$ and $\lambda_j = 2-2\cos\phi_j$.

Since $\phi_1 < \phi_2 < \ldots < \phi_{n-1}$, we also have $\lambda_1 < \lambda_2 < \ldots < \lambda_{n-1}$. Considering $\phi_1$, we see that if $\phi = \phi_j$, then $$-\pi 2 < \theta_0 < \ldots < \theta_{j-1} < 0 < \theta_j < \ldots < \theta_{n-1}$$

$$-1 < \sin\theta_0 < \ldots < \sin\theta_{j-1} < 0 < \sin\theta_j < \ldots < \sin\theta_{n-1}$$

It is seen that for the smallest eigenvalue $\beta^0 = 1/\sin\theta_0 < 0$, while $\beta^j = 1/\sin\theta_j > 0$ for $j=1, \ldots, n-1$. Thus, from Eq. 6, it is seen that the eigenvector corresponding to the smallest eigenvalue separates the longest chain from the rest. Similarly, the eigenvector corresponding to the second smallest eigenvalue separates the two longest chains from the rest and so on. Thus, it permits to discriminate between n chains using the eigenvectors corresponding to the second smallest eigenvalue separates the two longest chains from the rest and so on. Thus, it permits to discriminate between n chains using the eigenvectors corresponding to the n−1 smallest eigenvalues. FIG. 16C illustrates an example of an asymmetric extended three graph with n=4. The nodes are plotted using the first n−1 eigenvectors. In case there are multiple chains with the same length, i.e., $m_{j_1} = m_{j_2} = \ldots = m_{j_p} = m$, there exist eigenvalues $2-2\cos(k\pi/(2m+1))$ each with multiplicity p−1 in addition to the eigenvalues described above. The eigenvectors corresponding to the eigenvalue $2-2\cos(\pi/(2m+1))$ are of the form $$x_i^{(j)} = \begin{cases} \beta^j \sin(\pi i/(2m+1)) & \text{if } j = j_1, j_2, \ldots, j_p, \\ 0 & \text{otherwise,} \end{cases} \qquad \text{(Eq. 18)}$$

where the $\beta^{(j)}$ are determined as described in the symmetric case. Therefore, the p chains of length m are discriminated by the p−1 eigenvectors corresponding to the eigenvalue $2-2\cos(\pi/(2m+1))$ of multiplicity p−1. While we have not explicitly dealt with ring graphs, the eigenvectors of ring graphs have a very similar structure as that of path graphs (supplemental material), and it is straight-forward to establish similar results.

2) Eigenvectors of grid graphs: Let $G=(V, E)$ and $H=(W, F)$ be graphs. Then $G \times H$ is the graph with vertex set $V \times W$ and edge set, $((v_1, w), (v_2, w))$ and $((v_1, w_1), (v_1, w_2))$ where $(v_1, v_2) \in E$ and $(w_1, w_2) \in F$.

The following theorem is used in the present analysis.

Theorem 1: Let $G=(V, E)$ and $H=(W, F)$ be graphs with Laplacian eigenvalues $\lambda_0, \ldots, \lambda_m$ and $\mu_0, \ldots, \mu_n$ respectively. Then, for each $0 \leq i \leq m$ and $0 \leq j < n$, $G \times H$ has an eigenvector z of eigenvalue $\lambda_i + \mu_j$ such that $z(v, w) = x_i(v)\gamma_j(w)$.

Let G and H be path graphs of length m and n respectively, where $(k+1)n > m > kn$ and $k \in N$. Then $\lambda_i = 2-2\cos(i\pi/2m)$ and $\mu_j = 2-2\cos(j\pi/2n)$. $G \times H$ is a grid graph with grid dimensions m×n. Clearly, the larger the value of k, the more 1-D the object. It then results in $0 = \mu_0 = \lambda_0 < \lambda_1 < \ldots < \lambda_k < \mu_1 < \lambda_{k+1} < \ldots$. Thus, all points along the width of the object are mapped to the same point in a k-dimensional eigenspace and the nodes map to a smooth 1-D curve in eigenspace. It may be seen that the same results hold for 3-D grid graphs as well where m and n are the largest and the second largest dimensions.

As it was shown in previous paragraphs, if n chains are to be segmented, the nodes are to be mapped to an eigenspace of n−1 dimensions. If mapped to an eigenspace of higher dimensions, the nodes still retain their 1-D structure as long as the chains are sufficiently 1-D in nature. The number of eigenvectors that can be used depends on the ratio of the length of the chains to their width. The greater the ratio, the greater the number of eigenvectors that can be used with the chains preserving their 1-D structure in eigenspace.

Comparison with Other Manifold Techniques

The embedding of the data in example of FIG. 16A obtained from different manifold techniques were observed. A comparison of the embedding obtained using techniques such as Laplacian Eigenmaps, Isomaps, Multi-dimensional Scaling, Locally Linear Embedding, and diffusion maps shows that from the point of mapping to a 1-D curve, the Laplacian Eigenmap and the Diffusion map embeddings perform very well. Diffusion map embedding is a variation of the Laplacian Eigenmap and uses a Gaussian kernel of width σ to construct a weighted graph and normalizes the Laplacian operator. The Isomap tries to preserve the geodesic distance between the nodes and hence does not map the nodes onto a 1-D curve as efficiently as the Laplacian Eigenmap which does not try to preserve any type of distance measure. The LLE embedding learns the local linear structure at each node, so that each node can be efficiently expressed as a linear functions of its neighbors. The objective is to preserve the local structure and hence the distances. There is no structure whatsoever when we consider the higher dimensions in the case of Isomap. Thus, Isomap and LLE are unsuitable for the purposes of the present technique. In addition to the properties described in the previous section, the Laplacian eigenspace transformation has the following advantages. The neighborhoods are easily and efficiently computed as the points lie on a grid. There is no need to find the geodesic distance between all points as in Isomap or to express nodes as a linear function of its neighbors. The transformation is global in nature. It is not necessary to know the exact number of chains that we need to segment as the 1-D structure is retained in higher dimensions as well.

Segmentation Using Splines

Figure 17B:
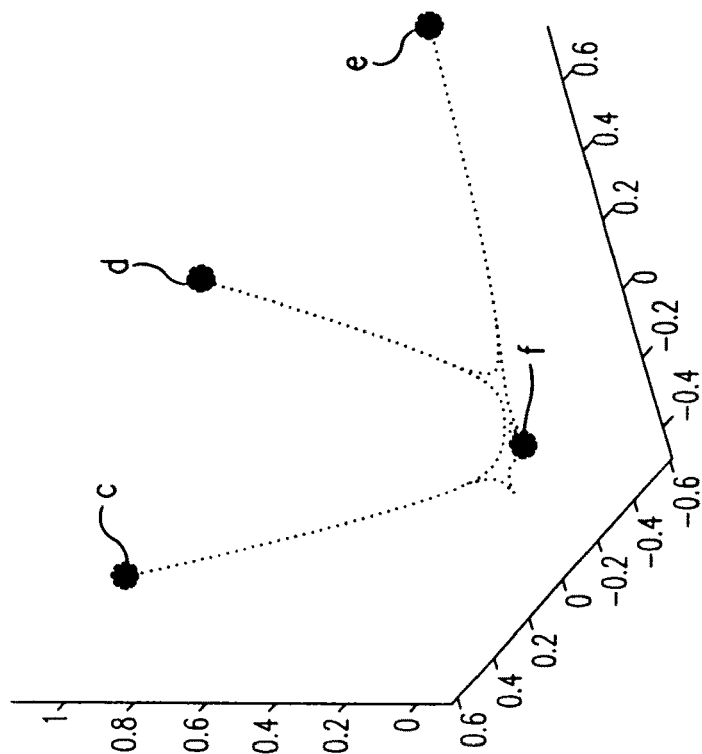
FIGS. 17A-17C represent voxel representation of a subject in a pose with a self-contact, both in 3D space (FIG. 17A) and in Laplacian eigenspace (FIGS. 17B-17C)
Figure 17A:
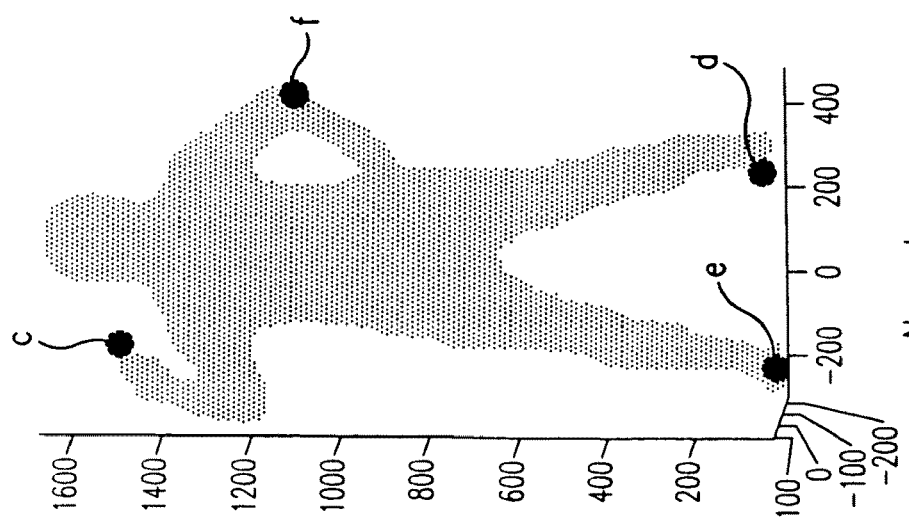
Figure 17C:
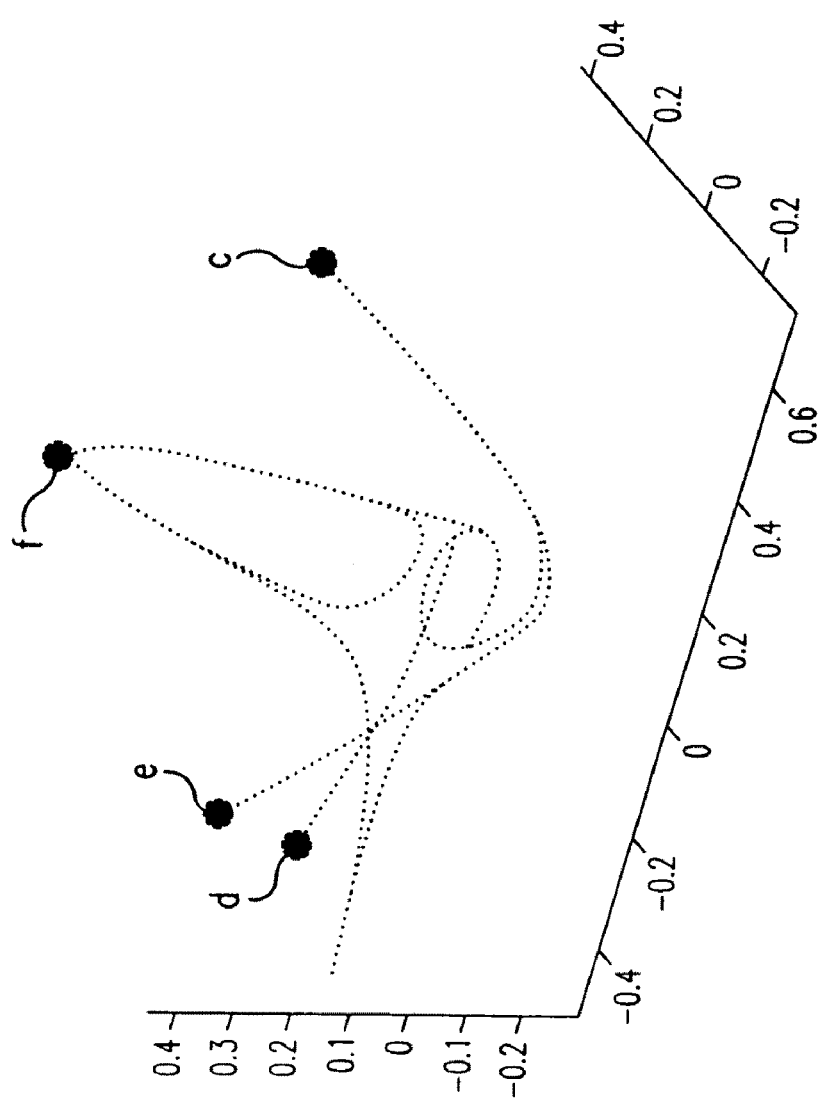

The human body is modeled as being composed of several articulated chains connected at joints. Each articulated chain forms a smooth 1-D curve in Laplacian Eigenspace, because they are 1-D in nature, i.e., the length is greater than their thickness. In order to estimate the pose, the voxels are first segmented into these different chains by exploiting their 1-D structure in space and the mutual connectivity between the different chains. Since the transformation is based on a graph structure which comprises the neighborhood relations between voxels in normal 3-D space, it is not affected by the articulation at joints. However, at points where three or more such segments meet, for e.g., at the next joint (head, two arms and trunk), the nodes lose their 1-D structure and diverge in different directions. This structure of the voxels is exploited in eigenspace in order to perform segmentation by fitting 1-D splines to each articulated chain. This process also permits to obtain the position of the nodes along their respective 1-D curves or articulated chains. All operations described below are performed in the eigenspace. The segmentation algorithm which is conducted in block 66 of FIG. 6, is described in detail herein and uses an example of real data sequence. FIGS. 17A-17C illustrate the voxel representation of a subject in a pose where there is self-contact, both in normal space (FIG. 17A) and the Laplacian eigenspace (FIGS. 17B-17C).

A. Initialization

The articulated chains or segments may be classified into two types according to whether they are connected at one end (Type 1) or both ends (Type 2) to other segments. In the example in FIG. 17A, the two legs, head, and one of the arms are of Type 1, i.e., one end of the chain is free, and the left arm and the trunk are of Type 2, i.e., both ends are attached to other chains. For Type 1 segments, it is noted that the node at the free end is farthest from other segments. However, for Type 2 segments, the node that is farthest from other segments lies in the middle of the segment. In order to initialize the spline, it is suggested to begin with the node that is farthest from all existing segments. To begin with, in the absence of existing splines, the processing starts with the node (c) that is farthest from the origin. The starting node for the second, third and fourth splines are denoted by the "d", "e" and "f", respectively.

Figure 18B:
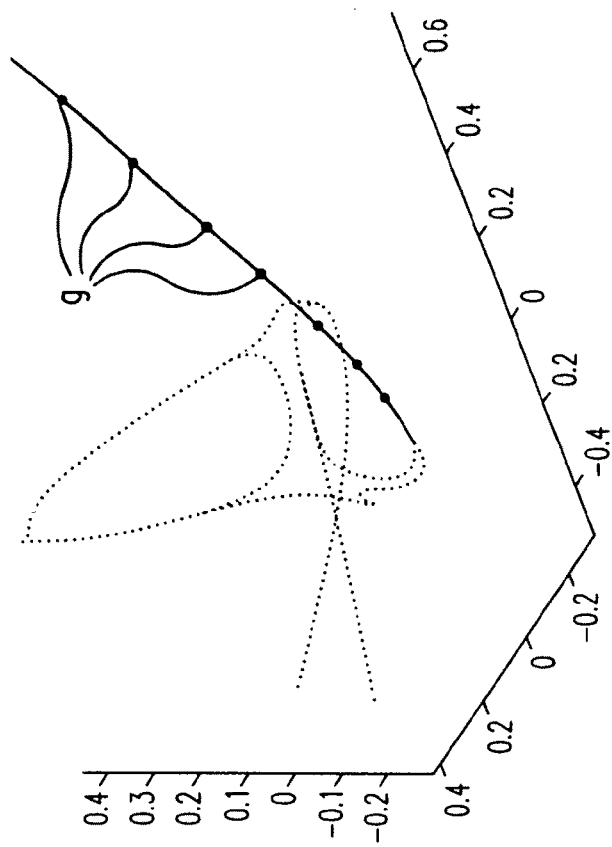
FIGS. 18A-18C represent fitting lines for nodes of the articulated chains connected at one end (Type 1)
Figure 18A:
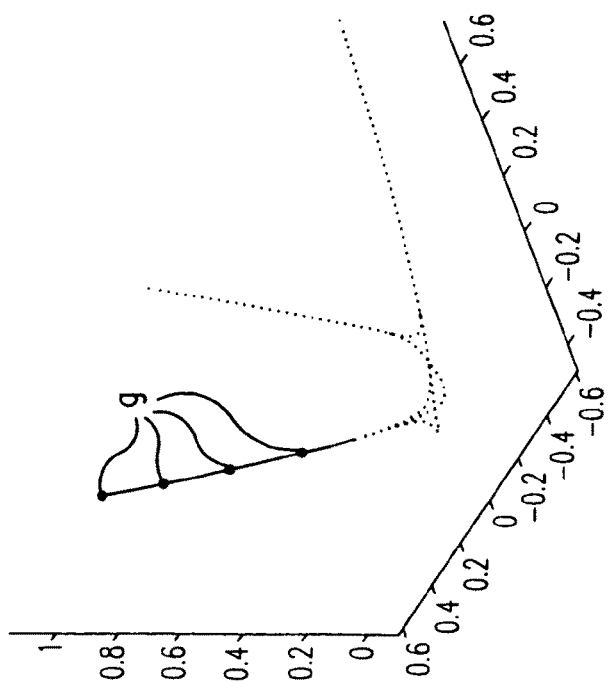
Figure 18C:
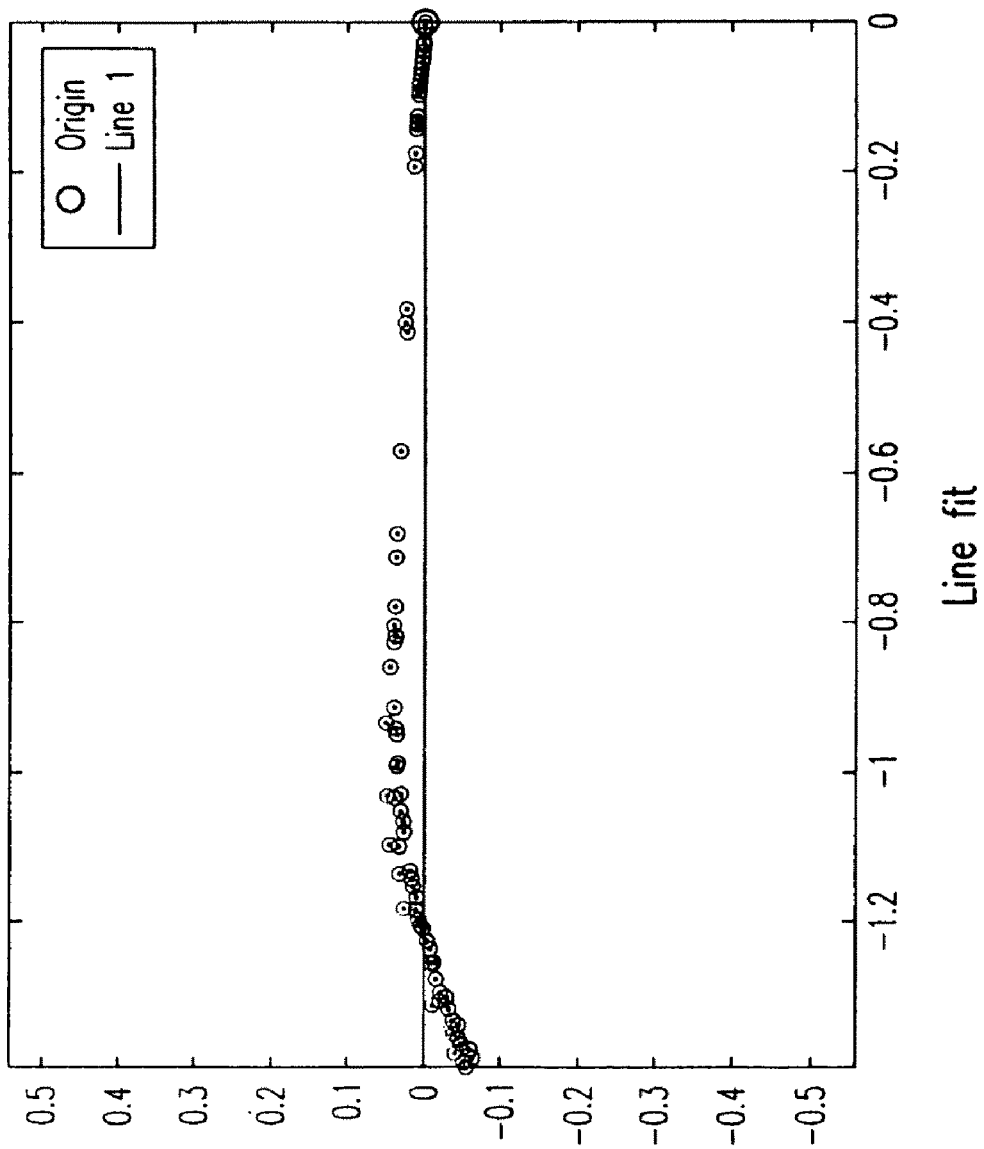
Figure 19B:
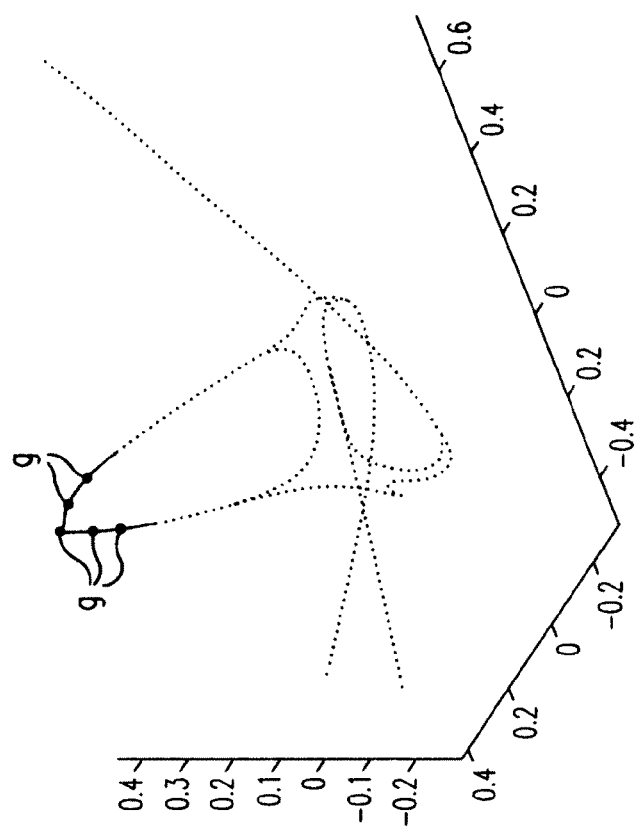
FIGS. 19A-19C represent fitting lines for nodes of the articulated chains connected at two ends (Type 2)
Figure 19A:
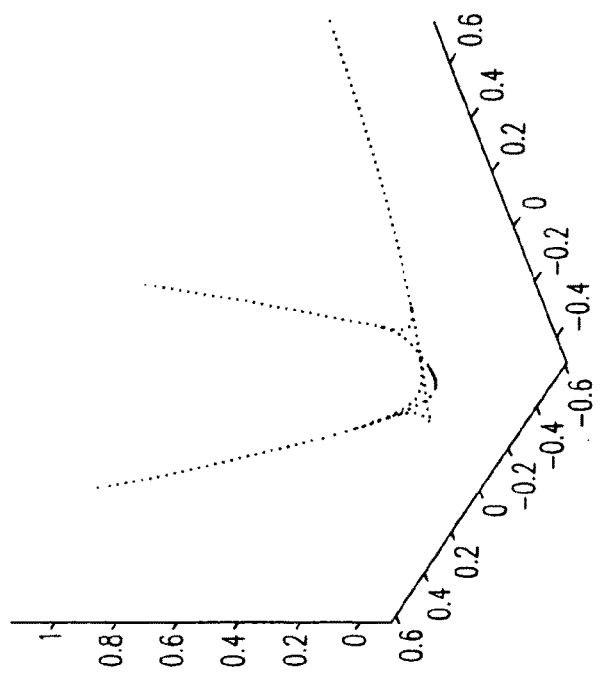
Figure 19C:
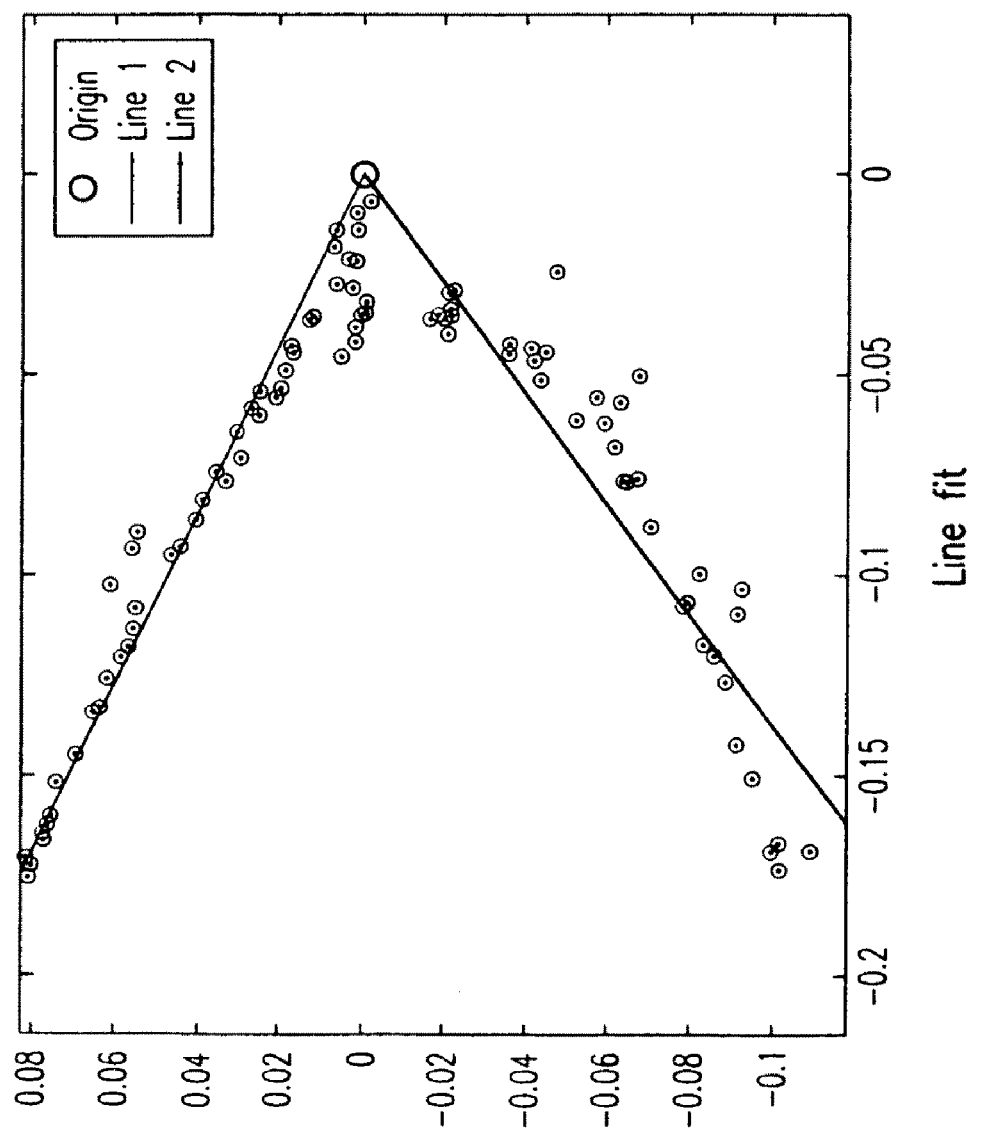

A set of nodes (g) that are closest to the initial node is obtained as can be seen in FIGS. 18A-18B and FIGS. 19A-19B for Type 1 and Type 2 cases, respectively. It is then possible to determine if the starting point lies at the beginning of the curve or the free end of the curve by determining the number of lines in space that can be fit to the cluster of points. The process therefore begins with the initial node, $y_0$, that has the largest dimension in eigenspace. In the case of Type 2 segments that node happens to be in the middle of the 1-D curve. $N_0$ closest nodes $(y_1, \ldots, y_{N_0})$ are found Euclidean distance to the "pivot" node, $y_0$ and principal component analysis (PCA) on $y_i$-$y_0$ to find the two biggest principal components $u^{(a)}$ and $u^{(b)}$. The $N_0$ closest nodes are marked by dots "g" in FIGS. 18A-18B while the first two principal components of the $N_0$ nodes are plotted in FIG. 18C. The principal directions (lines) are found which are linear functions of the two principal components. In the Type 1 case FIG. 18C, there is only one direction and a single spline is grown from that point. In the Type 2 case FIG. 19C, there are two principal directions (because the procedure starts in the middle) and separate splines are grown in each direction independently.

B. Spline Fitting

Figure 20B:
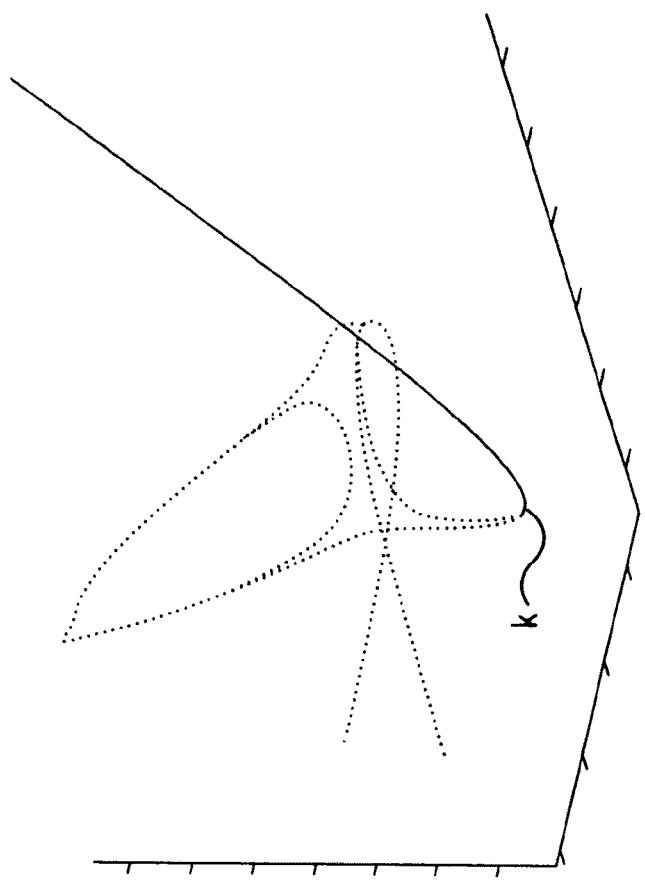
FIGS. 20A-20B illustrate spline growing procedure.
Figure 20A:
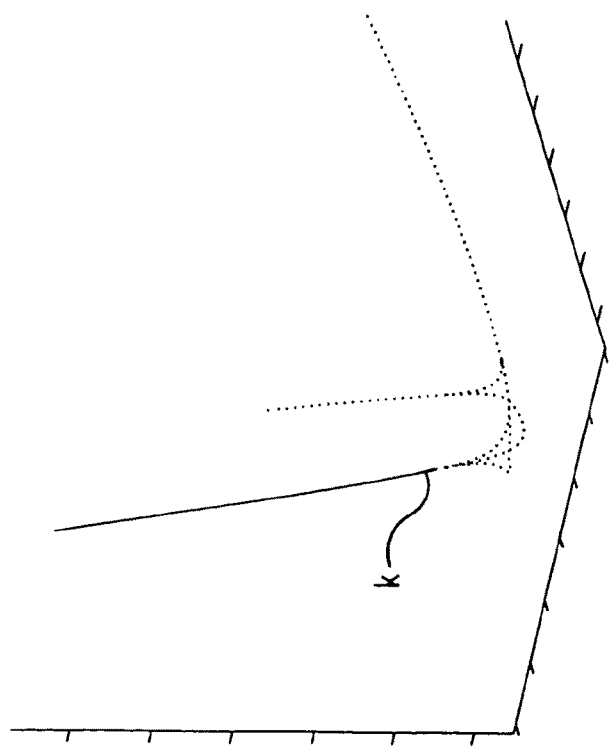
Figure 21:
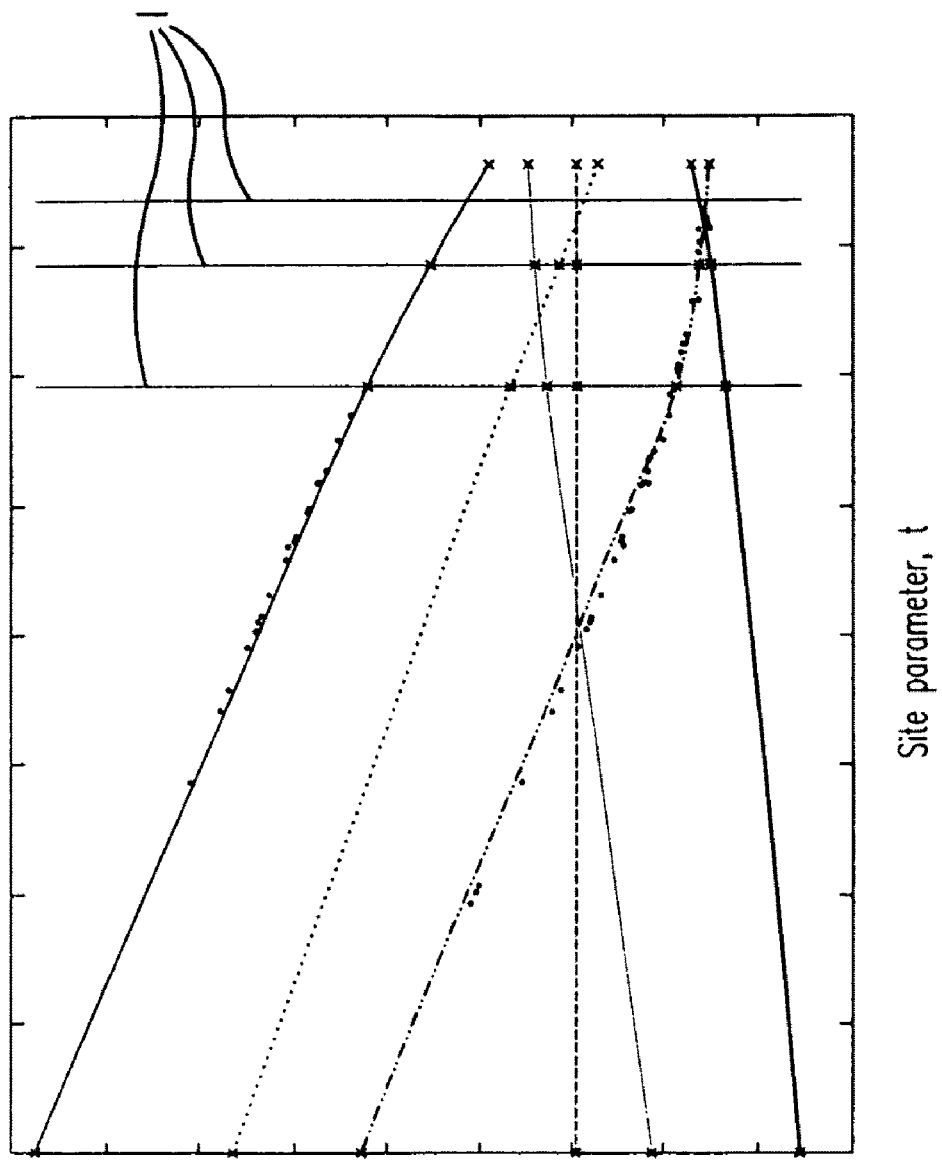
FIG. 21 represents a procedure of fitting a 6-D spline.

The spline fitting procedure is performed in block 68 of FIG. 6 and is illustrated using FIGS. 20A-20B. A cluster is created by adding nodes that are closest to the "pivot" node. The cluster of points and the principal directions are plotted in eigenspace (the first three dimensions are shown in FIG. 20A and the next three dimensions are shown in FIG. 20B). The nodes are projected onto the principal axis to obtain the site value, t. Thus, for each node, y, in the cluster its site value $t_i$ is obtained. The nodes can then be described as a 6-D function of the site parameter, t and are plotted in FIG. 21, wherein x-axis represents the site parameter t and the y-axis represents the location of a node in different dimensions. Each dimension, in FIG. 21 is distinctly identified. A 6-D spline can be computed to fit the data points. In the case of Type 2 splines, two splines are grown originating at the initial node separately. The spline computed is the least-squares approximation to the data, by cubic splines with two continuous derivatives. The spline may be computed using the MATLAB spline toolbox function spap2( ). The spline, $f^{EIG}$, seeks to minimize the error given by $\Sigma_i \|f^{EIG}(t_i)-y_i\|^2$.

C. Spline Propagation

The spline is propagated by adding nodes that are closest to the growing end of the spline (for e.g., the nodes k in FIGS. 20A-20B). The principal axis used to compute the site value is recomputed locally using nodes at the growing end (e.g. using the additional nodes). The curvature of the spline may vary substantially as the spline grows and if the direction of the spline at the growing end differs from the principal direction by a value greater than a threshold, a new principal direction is computed. The vertical lines "l" in FIG. 21 denote the boundaries of two such principal directions. The principal direction is computed for adjacent clusters of points so that the angle between the principal directions is smaller than a pre-defined threshold. The new principal axis, $\tilde{u}_{k+1}$, is constructed so that $\tilde{u}_{k+1}^T u_k > \cos(\theta_m)$, where $\theta_m = \theta_M e_k / (e_k + 10 e_{k+1})$ where $e_j$ is the error if $u_j$ is chosen as the principal axis. When the curvature of the spline increases, then $e_{k+1} \ll e_k$ and $\theta_m \approx \theta_M = 15°$. However, when the nodes diverge (for e.g., at a junction) and lose their 1-D structure, then $e_{k+1} \approx e_k$ and $\theta_m \approx \theta_M / 6 = 2.5°$.

D. Termination

The growth is terminated, e.g. a node is considered an outlier when the error of new nodes, (spline fit error) exceeds a fixed threshold, $CL\sqrt{d}$, where C=0.005, L is the length of the average spline in eigenspace (set to 1 as we have normalized the eigenspace such that $y_i \in [0,1]^6$), and d is the dimension of the space. The error increases rapidly at a junction because the nodes diverge in practically orthogonal directions. In other words, a node is an outlier if it does not lie close to the computed 1D spline in LE, and the growing of the spline continues as long as the nodes fit the 1-D model. When the spline reaches a junction where more than two segments meet, the 1-D structure does not hold and the spline fitting error increases sharply. The growth of the spline is terminated, when the number of voxels that exceed the threshold increases beyond a certain point.

Figures 22A, 22B:
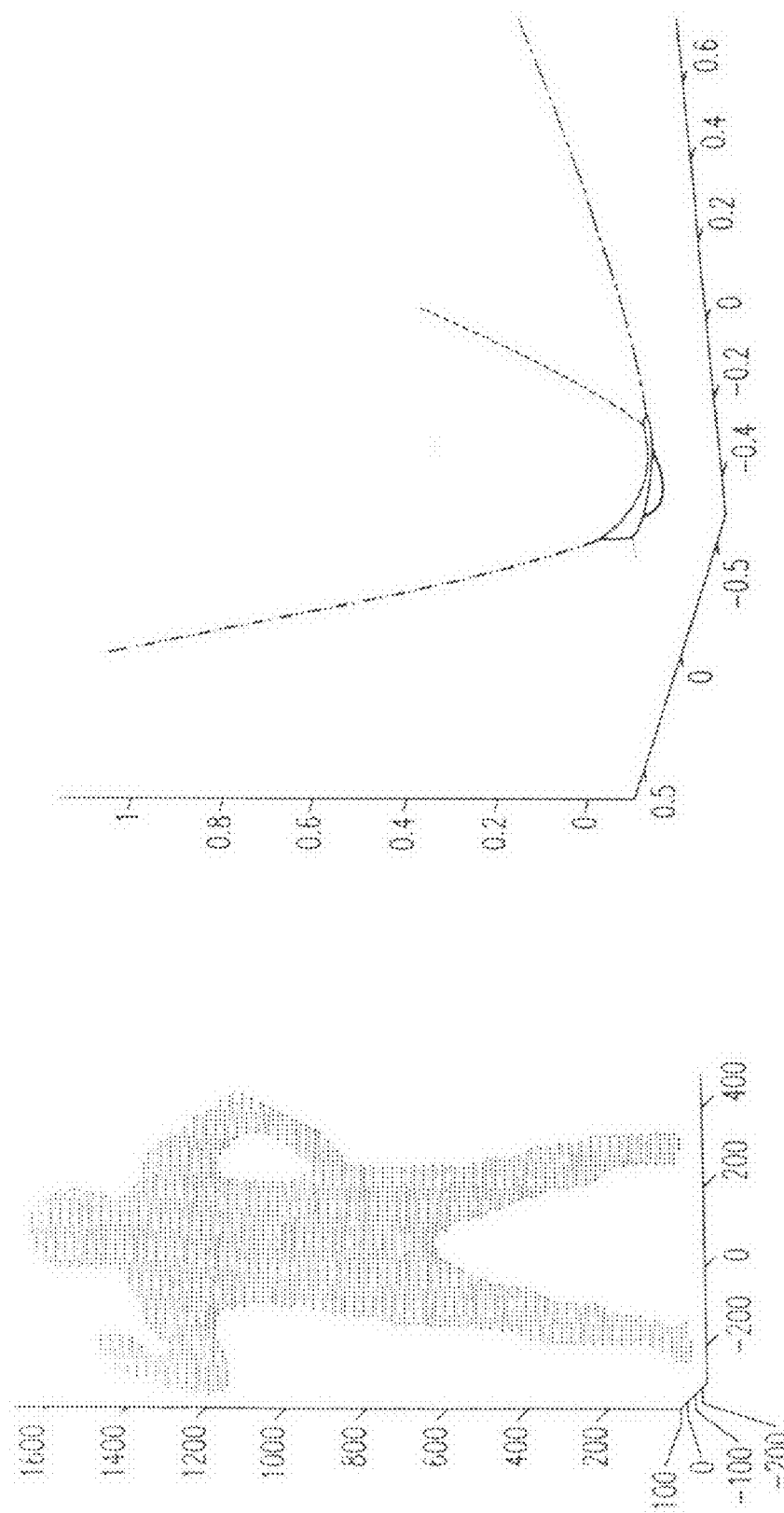
Figures 4, 5, 6, 22C:
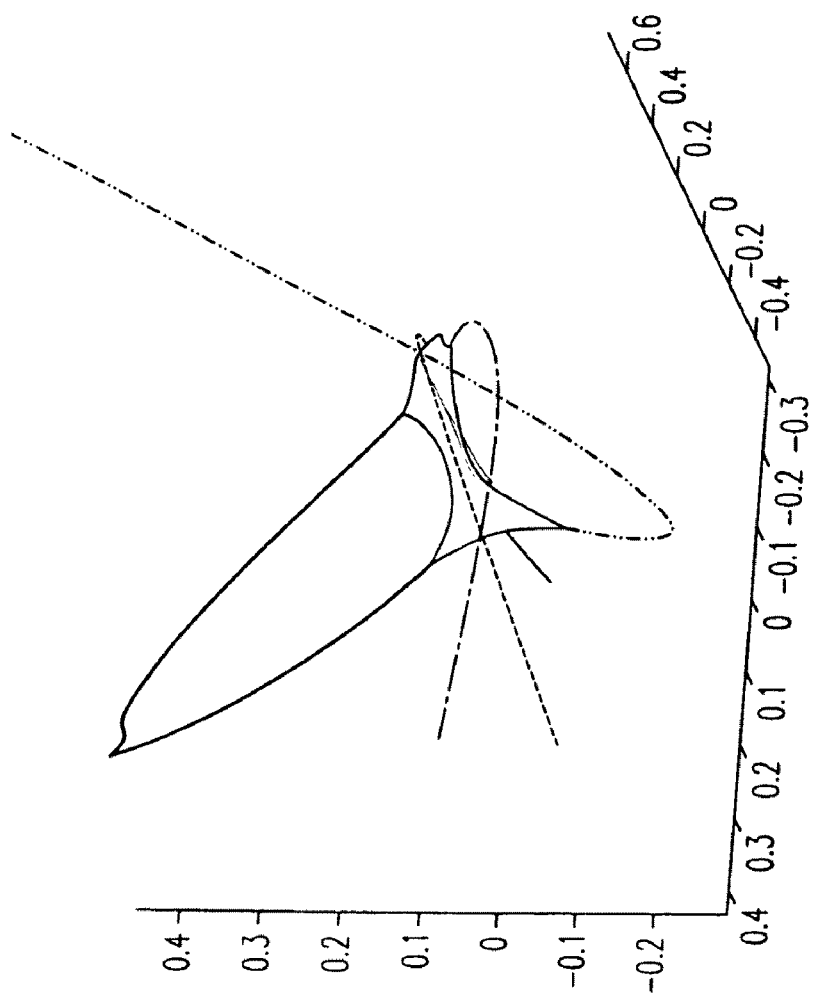

The spline-fitting process is stopped when the fraction of unassigned nodes drops below a threshold, or when a cluster of nodes with a strong 1-D structure cannot be found. FIGS. 22B-22D illustrate the successful segmentation of the voxels (presented in normal space in FIG. 22A) into different articulated chains although there is no contact between the arms and the body.

E. Constructing the Body Graph

As noted earlier, each node ($u_i$ in normal 3-D space and $y_i$ in eigenspace) belonging to a spline segment has a site value $t_i$. This value denotes the position of the node along the 1-D curve and can be used to compute the skeleton curve shown in FIG. 22E. This skeleton curve is computed in block 84 of FIG. 6 in the following fashion:

3-D smoothing spline is computed with the set of points ($t_i$, $u_i$) in normal space. The spline $f^{LIMB}$, seeks to minimize the error given by $\Sigma_i \|f^{LIMB}(t_i) - v_i\|^2$. The curve skeleton thus may be computed for each of the segments obtained as described in previous paragraphs. Two kinds of splines are considered, those of Type 1 and Type 2. Type 1 spline segments are represented as a single segment. The Type 2 segments contain two splines which are merged together into a single spline. A set of splines thus is created and a graph may be constructed to describe the connections between the ends of the spline segments in eigenspace FIG. 22F. Each spline is denoted by an edge with two nodes. The distance is computed between various pairs of nodes and an edge is placed between two nodes if the distance between those two nodes is less than a given threshold. One can also assign a probability to the connection between different pair of nodes. It is noted that some of these "joints" are true joints but some of them are pseudo joints caused by contact between body parts, for e.g., between the hip and the left palm in FIGS. 22A-22G. A method for identifying the correct joints is described in further paragraphs.

Probabilistic Registration

The objective of the registration sub-routine performed in blocks 80 and 82 of FIG. 6 is to identify the segmented body parts and possibly resolve the ambiguities such as those in FIG. 22F so that the joint connections may be obtained shown in FIG. 22G. Six directed segments are obtained represented by $s_i$ with two nodes each $n_i^0$ and $n_i^1$ after segmentation. One wishes to register them to the six segments $b_i$ in FIG. 2A. Denote possible registrations as a permutation $(j_1, j_2, \ldots, j_6)$ of $(1, 2, \ldots, 6)$ which indicates that $s_{j_i} = b_i$. The probability of the registration as given in Eq. 19, is the product Eq. 20 of the probability of each segment match being correct ($Pr[b_i = s_{j_i}]$) and the probability of the connection between the appropriate nodes, $P_{conn}$.

$$Pr[(j_1, \ldots, j_6)] = Pr[b_1 = s_{j_1}, \ldots, b_6 = s_{j_6}] \quad \text{(Eq. 19)}$$

$$= P_{conn}\left(\prod_{i=1}^{6} Pr[b_i = s_{j_i}]\right) \quad \text{(Eq. 20)}$$

The length and the "thickness" for each segment is obtained using the computed spline functions, $f^{LIMB}$. The length of the segment is the length of the spline. The "thickness" of the segment is the mean of the error of the spline reconstruction, $\|f^{LIMB}(t_i) - v_i\|^2$. Let $l_k$ and $t_k$ be the length and "thickness" of $k^{th}$ segment. They are normalized by the maximum lengths respectively, i.e., $l_k = l_k/\max\{l_k\}$ and $t_k = t_k/\max\{t_k\}$, and are sorted so that $\{l_1^S, \ldots, l_6^S\} = \text{sort}(\{l_1, \ldots, l_6\})$ and $\{t_1^S, \ldots, t_6^S\} = \text{sort}(\{t_1, \ldots, t_6\})$. The probability $P_{i,k} = Pr[b_i = s_k]$ is computed using the following formulas. Note that $b_1, b_2$, are the trunk and head, $b_3, b_4$, the arms, and $b_5, b_6$, the legs.

$$P_{i,k} = \begin{cases} e^{-5|t_k - t_T|} & i = 1 \\ e^{-5|t_k - l_H|} & i = 2 \\ e^{-2|t_k - l_A| - 2|t_k - t_A|} & i = 3, 4 \\ e^{-2|t_k - l_l| - 2|t_k - t_l|} & i = 5, 6 \end{cases} \quad \text{(Eq. 21)}$$

where $$t_T = t_6^S, \quad \text{(Eq. 22)}$$

$$l_H = l_1^S,$$

$$l_A = (l_2^S + l_3^S)/2,$$

$$t_A = (t_1^S + t_2^S)/2,$$

$$t_A = (t_5^S + t_6^S)/2$$

and $$t_A = (t_3^S + t_4^S)/2.$$

The distance between various pairs of nodes (belonging to different segments) is computed and an edge is placed between two nodes if the distance between those two nodes is less than a threshold that can be computed as a function of distances computed between all pairs. One can also assign a probability to the connection between different pair of nodes, or the joint, again as a function of the distance between the nodes.

$$Pr[n_i^k \text{ conn. to } n_j^l] = \quad \text{(Eq. 23)}$$

$$\begin{cases} e^{-dist.(n_i^k, n_j^l)/d_{threshold}} & dist.(n_i^k, n_j^l) < d_{threshold} \\ 0 & \text{otherwise.} \end{cases}$$

In fact for most poses (where there is no "loop-back"), the only segment that has non-zero probability of connections at both nodes is the trunk and therefore the number of permutations is greatly reduced. For the example in FIG. 22F, segments the m, n, and f have equal probability of being identified as the trunk, based on the connections alone. The properties of the individual segments help discriminate between the trunk and the arms. The segments are labeled according to the registration with the highest probability. If the probability of the best registration is too low, the frame is discarded as unsuitable for use in model estimation.

Human Body Model Estimation

The objective of this sub-routine performed in accordance with the flow chart diagram presented in FIG. 10, is to estimate the human body model and pose from the segmented and registered voxels obtained in the routines presented in the previous paragraphs. The skeleton representation (FIG. 22E) may be obtained from the segmented data as previously described.

Figure 23C:
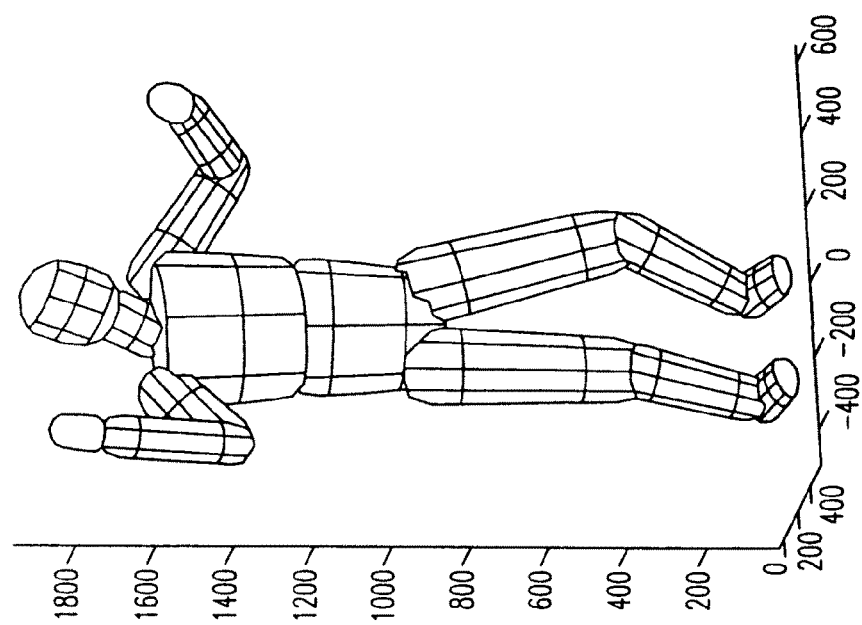
FIGS. 23A-23C represent skeleton curve (FIG. 23A), skeleton model (FIG. 23B), and volumetric super-quadratic model (FIG. 23C)

The two sets of parameters of interest are the pose parameters (joint angles) and the body structure point location and super-quadratic parameters). The skeleton curve (FIG. 22F) can be computed as described previously. The position of the voxel along the articulated chain is used repeatedly at various stages of the algorithm and is very important. There are several models that may be used to represent human bodies. For example, the present system may use a super-quadric model illustrated in FIGS. 4 and 5A-5C. Herein, the hierarchical algorithm is described which is developed to estimate the human body model parameters and pose beginning with a simple skeletal model (joint locations and limb length) shown in FIG. 23A, and then proceed to progressively refine model parameters and increase model complexity and finally to obtain the super-quadric model parameters, shown in FIG. 23C.

The human body model cannot be reliably estimated from a single frame (or pose). Therefore a skeletal representation of the subject is computed in the present system from a set of key frames where registration is successful. These key frames are spread apart temporally in order that a set of distinct poses are obtained.

Techniques are used herein that leverage the knowledge of the human body structure and a top down approach is used as illustrated in FIGS. 3E-3F. The two sets of parameters of interest are the pose parameters (joint angles) and the body structure (joint locations). The stature (or height) of the subject is a key parameter that is strongly related to a number of human body model parameters, such as the lengths of long bones in the body. Anthropometric studies have been performed on certain demographic groups to study the relationship between stature and the long bones in the body. These studies indicate that the lengths of the large body segments may be estimated for an average human subject (model skeleton) from the given stature. In the present system, this relation between the statue of the subject and lengths of the long bones is computed and exploited. Thus, a skeleton for an average subject may be constructed as a function of the stature by scaling the limb lengths and the joint locations by the ratio of the stature of the subject to the stature of the average human.

A. Distance Between Skeleton Curve and Skeleton Model

Figure 23B:
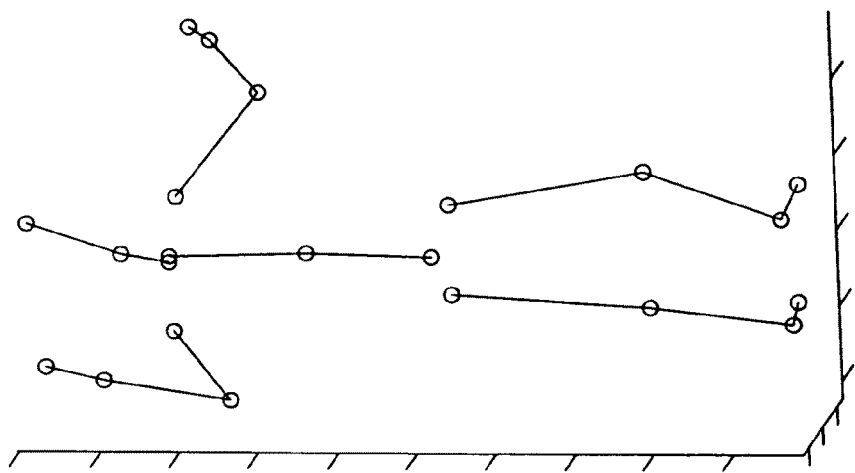
Figure 23A:
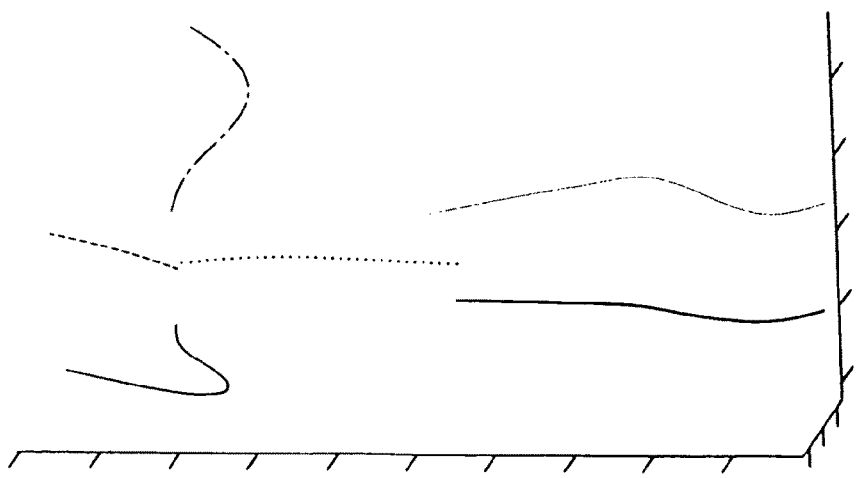

The skeleton model and the super-quadric model are illustrated in FIGS. 23B and 23E, respectively. In order to estimate how well a skeleton model fits a skeleton curve, some kind of "distance" between the skeleton curve (FIG. 23A) and skeleton model (FIG. 23B) is to be computed. Since the skeleton curves are all registered, the distance between each skeleton curve and its corresponding skeleton model may be computed independently. The computation of this "distance" is described in the following paragraph.

Figure 24A:
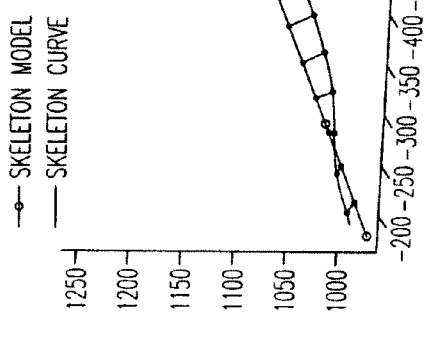
Figure 24B:
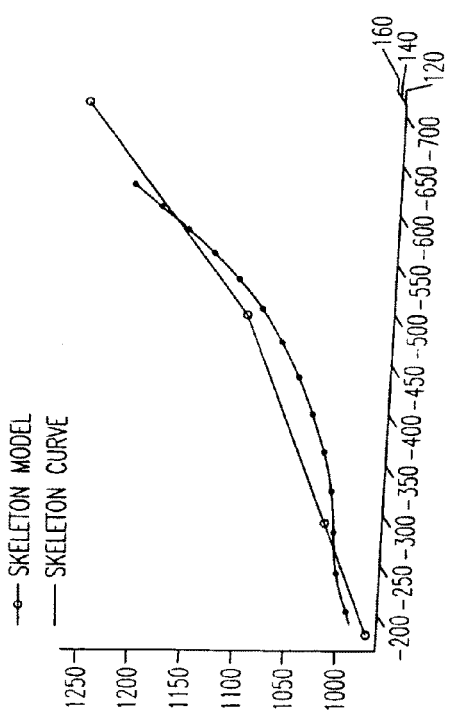
Figure 24C:
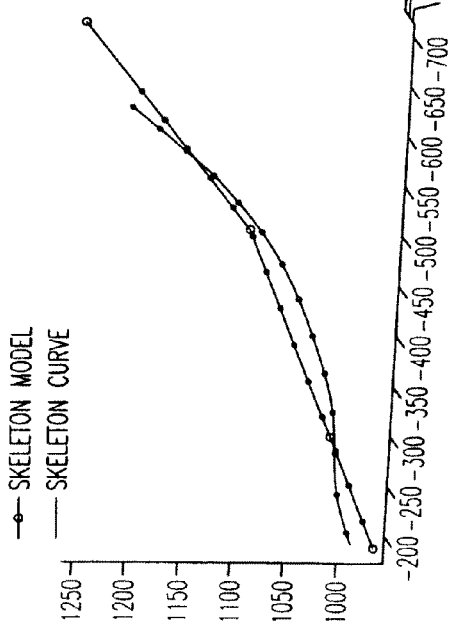

Consider a set of ordered points $x_1, x_2, \ldots, x_n$, on a skeleton curve corresponding, for e.g., to the arm as shown in FIGS. 24A-24C presenting the computation of the distance between the skeleton curve and skeleton model. The corresponding skeleton model for the arm consists of three line segments, $L_1$, $L_2$, and $L_3$. The distance, $e_i^j$, is computed between $x_i$ and the closest point on line segment $L_j$. Each point to a line segment is assigned. Since the set of points on the skeleton curve is ordered, the constraint is imposed that the assignment is performed in a monotonic manner, i.e., points $x_1, \ldots, x_{n_1}$ are assigned to $L_1$, points $x_{n_1+1}, \ldots, x_{n_2}$ are assigned to $L_2$ and points $x_{n_2+1}, \ldots, x_{n_3}$ are assigned to $L_3$. For a given value of $n_1$, $n_2$ is chosen so that the distance between points $x_{n_1}$ and $x_{n_2}$ is approximately equal to the length of the line segment $L_2$. For the above assignment, the distance between the skeleton curve is given by the vector $(e_1^1 \ldots e_{n_1}^1 e_{n_1+1}^2 \ldots e_{n_2}^2 e_{n_2+1}^3 \ldots e_n^3)^t$. $n_1$ and $n_2$ are chosen so as to minimize the sum of the elements in the vector.

B. Estimate Skeleton Body Model Parameters from Stature

Given the skeleton model, M, the pose, $\Phi$, is computed in two steps: first, the pose of the trunk is determined and second, the pose of the remaining articulated chains is computed. The pose parameter, $\Phi$, is given by the pose of the trunk ($\phi_T$) and the pose of the different chains w.r.t. the trunk. The z-axis of the trunk is aligned with the skeleton curve of the trunk. The y-axis of the trunk is in the direction of the line joining the right pelvic joint to the left pelvic joint. The x-axis points in the forward direction. This direction is estimated using the direction of the feet and is orthogonal to the computed yz plane. Once the trunk pose has been estimated, the joint locations at the hips, shoulders and neck are fixed. It is then possible to independently estimate the pose of each of the articulated chains. The objective is to compute the pose of the skeleton model, so that the distance between the points on the skeleton curve and the skeleton model is minimized.

Figure 25:
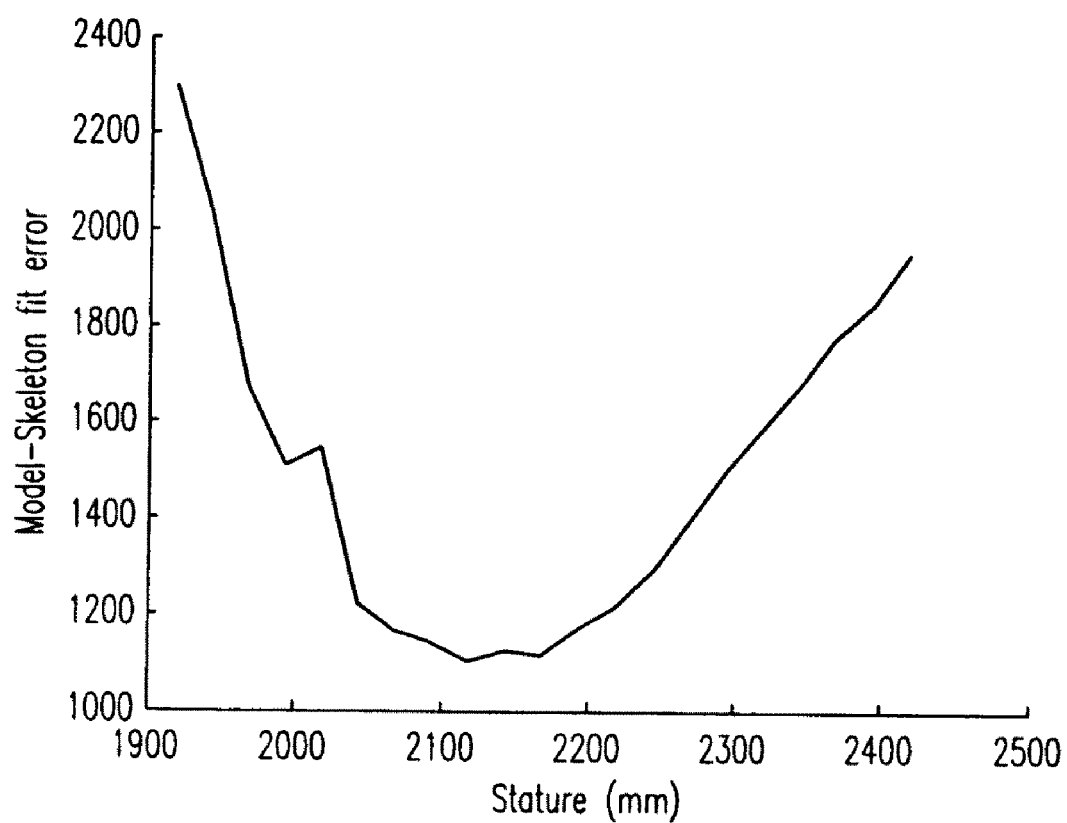
FIG. 25 is a diagram representing fit error vs. stature.
Figure 28C:
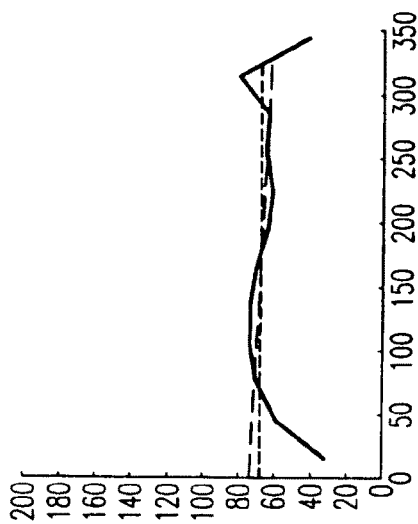
FIG. 28A-28F represent radial profiles of different body segments.
Figure 28B:
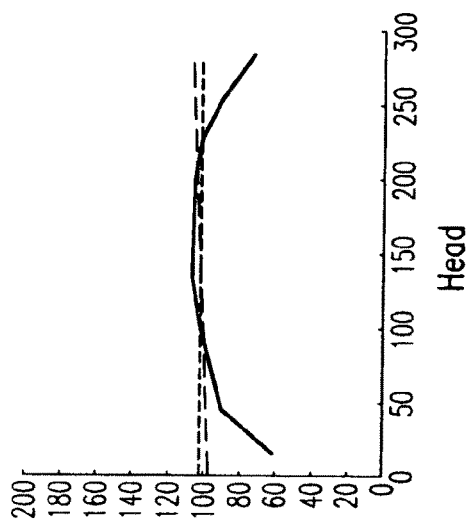
Figure 28A:
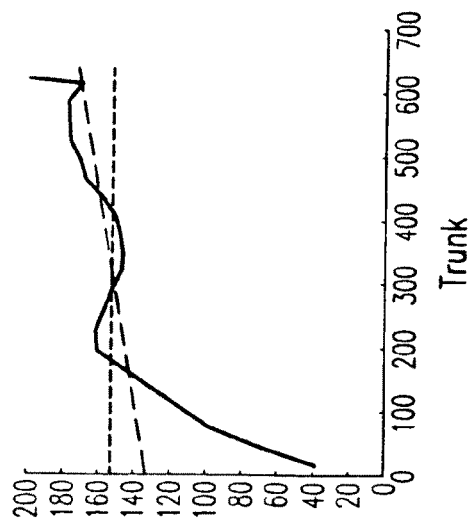
Figure 28F:
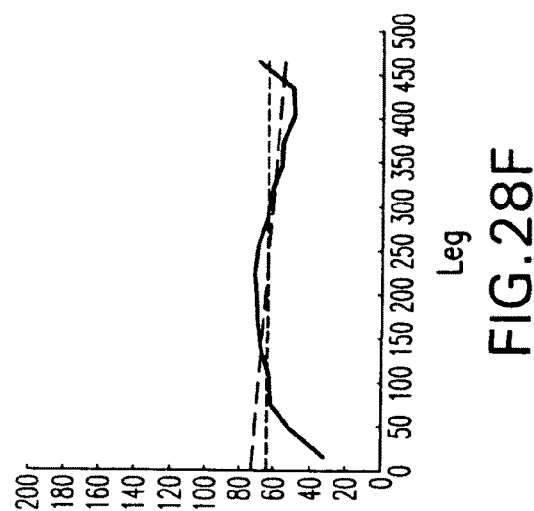
Figure 28E:
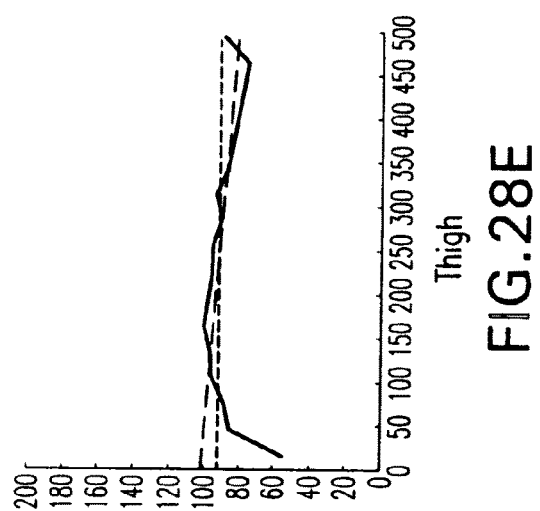
Figure 28D:
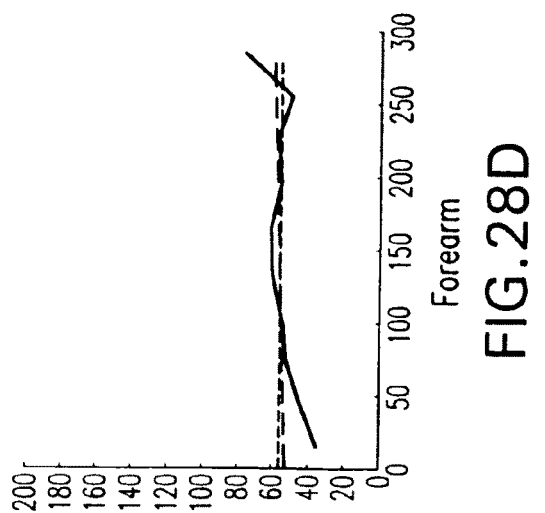

The skeleton model may be computed from the stature parameter alone. In the first iteration of the algorithm, the stature of the subject is optimized to minimize the skeleton fit error. The initial estimate of the stature of the subject can be obtained from the lengths of various limb segments using the relationship between the long bones and the stature. The skeleton fit error vs. the stature for a synthetic sequence is presented in FIG. 25. The initial stature estimated was 2168 mm while the correct stature is 2100 mm. It should be emphasized that the computation of the stature is in the context of its relationship to the body structure of the subject, assuming that the subject resembles a normal human. The initial skeleton segments have been super-imposed on the computed skeleton curves in FIG. 26. The optimization results in an optimal value of the stature, using which we can compute the initial pose estimate $\Phi^0$ and the initial skeletal model estimate $M_{skel}^0$.

C. Optimization of Joint Locations

In this second step, $\Phi$ is optimized keeping $M_{skel}$ fixed and then $M_{skel}$ is optimized while keeping $\Phi$ fixed. The optimization is performed so that the model and pose parameters lie in a bounded region centered around $M_{skel}^0$ and $\Phi_T^0$ respectively. The difference from the previous section is that the skeleton model parameters are individually varied rather than through the stature parameter. The skeleton model super-imposed on the curve skeleton after joint locations are optimized is presented in FIG. 27.

D. Estimation of Super Quadric Parameters

The super-quadric parameters for the trunk, head, arm, forearm, thigh, and leg can be estimated from voxels as these body segments are large enough to be estimated using the resolution and quality of the voxels that we possess. At this stage, it is already known which body segment on the skeleton model is closest to each point on the skeleton curve; e.g. on any articulated chain, the position of each voxel along the chain is known. Using this knowledge and the estimated joint locations, each articulated chain can be segmented into its component rigid segments. Using the estimated joint angles, the orientation of the coordinate frame attached to the component segment can also be computed. For a given body segment, the pose is normalized using the body coordinate frame, so that the body segment is positioned at the origin and aligned with the z-axis of the super-quadratic shown in FIGS. 4A and 5A-5C given by Eq. 24.

$$\left(\frac{x}{x_0}\right)^2 + \left(\frac{y}{y_0}\right)^2 = \left(1 + s\frac{z}{z_0}\right)\left(1 - \left(1 - 2\frac{z}{z_0}\right)^d\right), \quad \text{(Eq. 24)}$$

$$0 \le z \le z_0.$$

The area of the cross-section of the voxels, $A_z$, (plane parallel to the xy-plane) is computed at different points along the z-axis. It is assumed that the cross-section is elliptical and find the parameters $(x_0, y_0)$ Eq. 24, from the area using the relation $A=\pi x_0 y_0$. A circle of equal area would have radius $r=\sqrt{x_0 y_0}$. The radius of the equivalent circle is computed, at different points along the z-axis, as $r_z=\sqrt{A_z/\pi}$, which is referred to as the radial profile. The radial profile is computed in all the key frames for each body segment. The median radial profiles for some of the body segments are presented in FIGS. 28B-28E. The length, radius and the scale parameter of the body segment is computed from the median radial profile. If the objective is to determine the parameters $x_0$ and $y_0$ of the super-quadric, the xy-histogram, $I(x, y)$, is obtained a function whose value at $(x_i, y_i)$ is given by the number of voxels that have x and y coordinates given by $x_i$ and $y_i$ respectively. The values of $x_0$ and $y_0$ are found that maximize the function $\Sigma_{(x,y) \in S_{x_0,y_0}} I(x, y)$, where $$S_{x_0,y_0} = \left\{(x, y) : \left(\frac{x}{x_0}\right)^2 + \left(\frac{y}{y_0}\right)^2 < 1\right\}, \quad \text{(Eq. 25)}$$

and satisfy the constraint, $x_0 y_0 = r^2$.

The pose is refined using the super-quadric body segments and the voxels directly. The objective is to obtain the pose that maximizes the overlap between the super-quadric model and the voxels. The pose is refined by bounded optimization of the pose parameter to minimize the "distance" between the voxels and the super-quadric model. This "distance" measures the distance of each voxel from the center of the body segment closest to it. The distance vector, $e = [e_1, e_2, \ldots, e_N]^T$, where $e_i = \min(e_i^{(1)}, e_i^{(2)}, \ldots, e_i^{(J)})$ and $e_i^{(j)}$ is the distance of the $i^{th}$ voxel with respect to the $j^{th}$ body segment and given as $$e_i^{(j)} = \begin{cases} \exp(r_i^j - q_i^j), & \text{if } 0 \le z_i^j \le z_0^j \\ \exp(r_i^j + p_i^j), & \text{otherwise,} \end{cases} \quad \text{(Eq. 26)}$$

$$p_i^j = \min(|z_0^j - z_i^j|, |z_i^j|), \quad \text{(Eq. 27)}$$

where $$r_i^j = \sqrt{\left(\frac{x_i^j}{x_0^j}\right)^2 + \left(\frac{y_i^j}{y_0^j}\right)^2} \quad \text{(Eq. 28)}$$

and $$q_i^j = \sqrt{\left(1 + s^j \frac{z_i^j}{z_0^j}\right)\left(1 - \left(1 - 2\frac{z_i^j}{z_0^j}\right)^{d^j}\right)}. \quad \text{(Eq. 29)}$$

$(x_i^j, y_i^j, z_i^j)$ are the voxel coordinates in the coordinate system of the $j^{th}$ body segment and $(x_0^j, y_0^j, z_0^j, s^j, d^j)$ are the super-quadric parameters of the $j^{th}$ body segment. Although the distance function appears complicated it is merely a measure of how close the voxel is to the central axis of the super-quadric. The refined pose is the pose that minimizes $\|e\|$.

Experimental Results

The results of the experiments are presented herein on synthetic data sets obtained from animation models, as well as real data sets obtained both from 3-D laser scans and multiple cameras. The novel algorithm presented herein is illustrated on poses with self-contact to prove the ability of the algorithm to segment body poses in complex poses correctly. Also the results of the model estimation algorithm are presented on different sources such as 3-D laser scan data as well as voxel reconstructions computed from multi-camera video sequences, and different subjects. These different sources result in voxel data with varying degrees of accuracy.

A. Segmentation on Real Data Sets

Figure 29C:
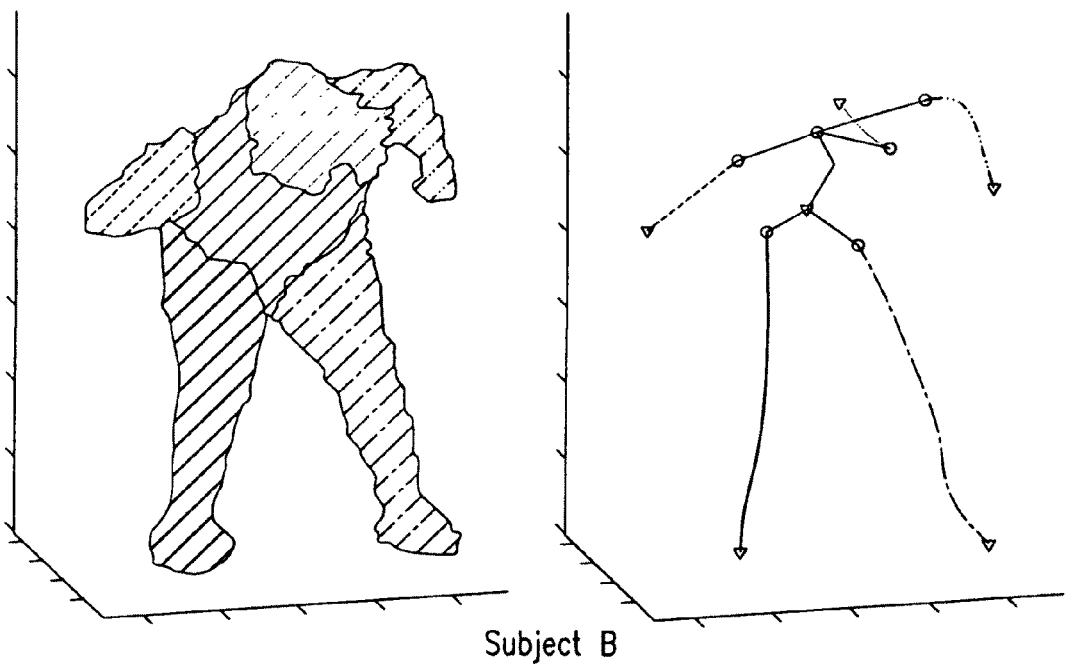
Figure 29D:
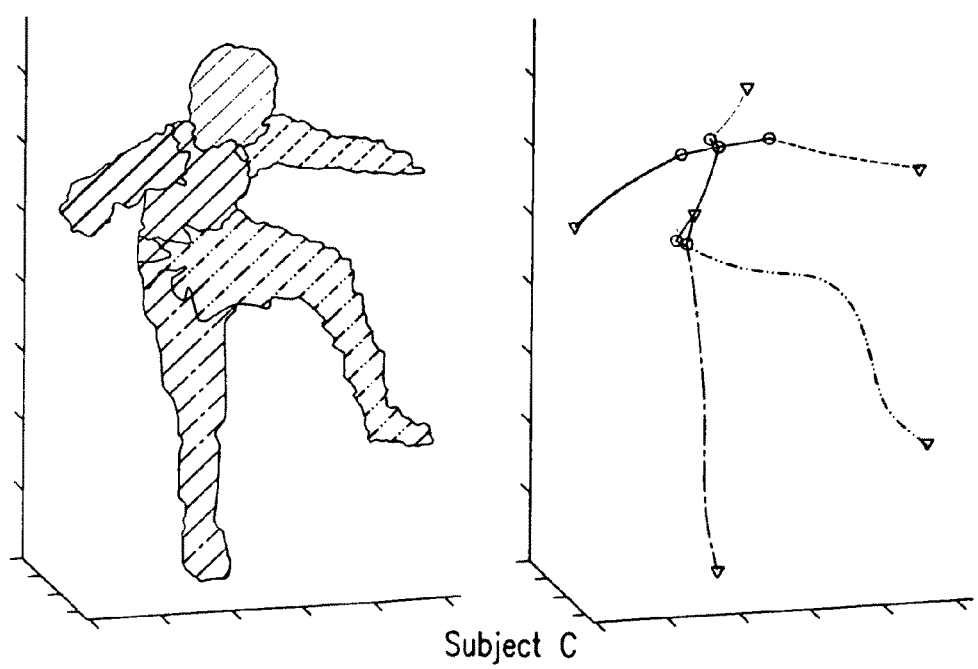

The results of the algorithm on different subjects in both simple and difficult poses are presented in FIG. 29A-29D. The voxels in this case were computed using images from 12 cameras. Grey-scaled images were captured from twelve calibrated cameras. Simple background subtraction was performed to obtain binary foreground silhouettes for each image. Space carving was performed using the binary silhouettes and the calibration data to obtain a voxel representation where each voxel block is of size 30 mm×30 mm×30 mm. The space carving algorithm consists of projecting points on a 3-D grid on to each camera image plane using calibration parameters. Then, it was determined for each grid point if it lies inside the silhouette for a majority of the images. It is noted that the algorithm succeeds in segmenting the voxels into parts based on the 1-D structure and the connected between the different segments. Segmentation and registration were successfully performed in the case of self contact as illustrated in FIGS. 29A-29B. It was also noted that this low-level segmentation lends itself to a high level probabilistic registration process. This probabilistic registration allows to reject improbable registration based on the estimated connections between the segments as well as lets us use prior knowledge of the properties of the different segments as well as the graph describing their connectivity.

B. Video Data Sets

The results were also provided on voxel data obtained from video sequences. The manner in which voxels were obtained is described in previous paragraphs (segmentation on real data sets). Given that the quality of the voxels construction is lesser due to space carving and background subtraction artifacts, N=20 frames were used in the human body model estimation algorithms.

C. Synthetic Data Set

Figure 30:
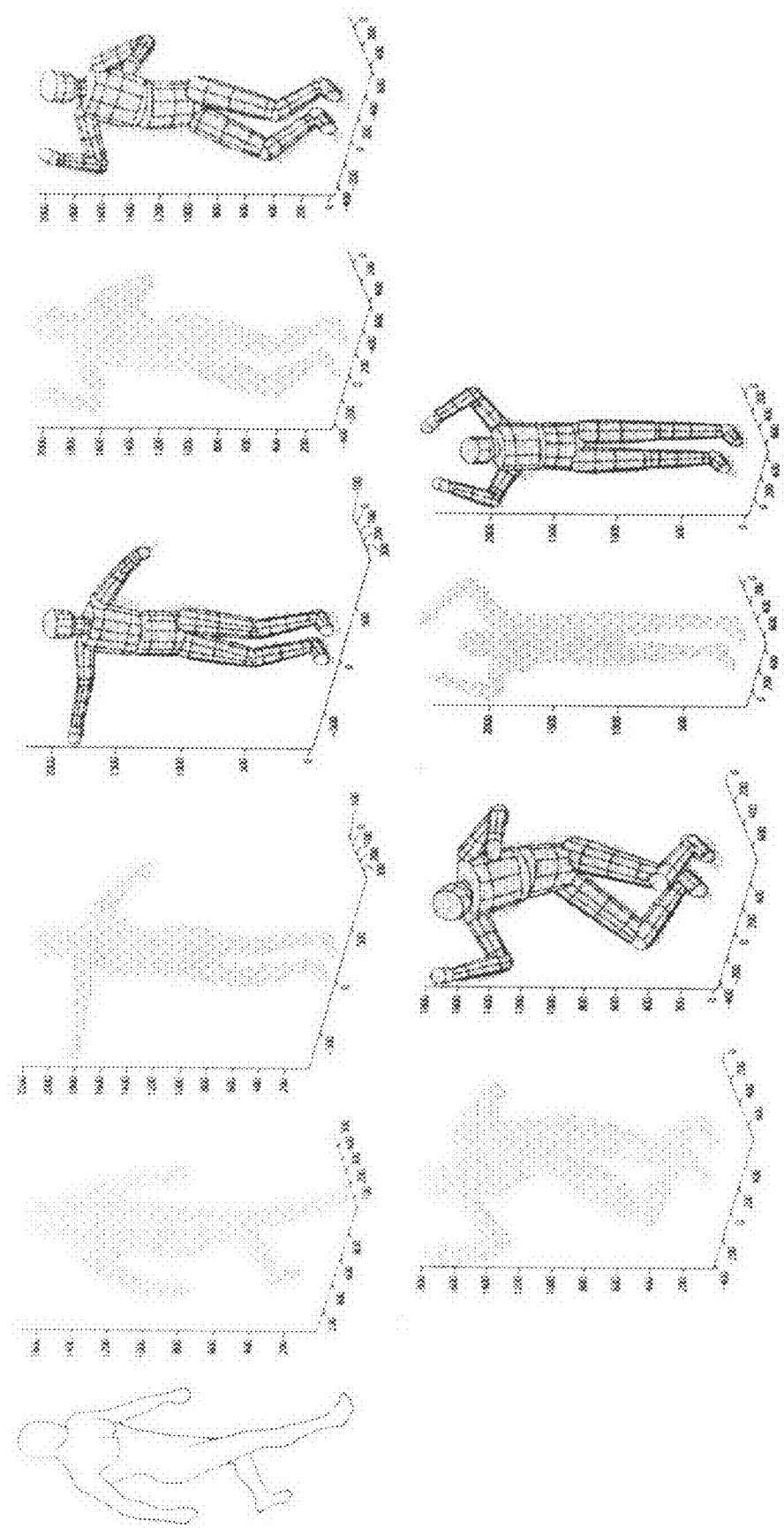
FIG. 30 represents results of human body estimation from synthetic sequence.

We provide results on human body model estimation using a synthetic sequence that has been generated from a known model and known motion sequence described by the standard BVH format. The human body parameters as well as the pose parameters are known and the estimated human body model and the motion parameters with the ground truth values can be compared. The results of the human body model estimation are illustrated in FIG. 30. The sequence had 120 frames, and N=10 equally spaced frames were used in the human body model estimation. The body segments were correctly segmented and registered in 118 of the 120 frames. The voxel resolution used was 30 mm. The pose was computed for all the frames using the model computed in the N key frames. The errors in the joint angles at the important joints are compared in Table I. The error is in degrees and computed using $\cos^{-1}\langle n_G, n_E \rangle$, where $n_G$ and $n_E$ are the actual and estimated unit vectors describing the direction of the segment at the joint.

TABLE I

| Optim. | Statistic | Trunk | L Should. | L Elbow | R Should. | R Elbow | L Hip | L Knee | R Hip | R Knee |
|---|---|---|---|---|---|---|---|---|---|---|
| Skeleton | Mean | 2.59 | 13.31 | 6.51 | 11.93 | 4.28 | 4.08 | 4.79 | 5.87 | 6.74 |
|  | Median | 2.39 | 14.29 | 5.21 | 11.78 | 3.80 | 4.11 | 4.17 | 5.95 | 3.54 |

TABLE I-continued

| Optim. | Statistic | Trunk | L Should. | L Elbow | R Should. | R Elbow | L Hip | L Knee | R Hip | R Knee |
|---|---|---|---|---|---|---|---|---|---|---|
| Super-quad. | Mean | 2.73 | 9.71 | 5.90 | 12.84 | 4.21 | 4.29 | 4.52 | 5.24 | 5.14 |
| | Median | 2.60 | 10.17 | 5.21 | 12.05 | 3.56 | 4.14 | 4.25 | 5.27 | 2.97 |

D. 3-D Scan Data Sets

The synthetic sequence described in the previous section had limited motion at several joints. The human body model estimation algorithm was tested on different subjects using laser scan data which provide 3-D meshes. Voxels can be computed from 3-D meshes by determining if points on a regular 3-D grid lie inside the mesh structure. The subject in each case strikes different poses that exercise different joint angles. The subjects are of different heights and build. The voxel was computed from the 3-D mesh obtained from the laser scanner. A set of five different poses was used to estimate the human body pose. Each pose is quite different from the other and the 3-D scans are relatively accurate and we were thus able to estimate the human body model parameters from fewer number of poses. The results of the human body model for different subjects are presented in FIGS. 31A-31E. This experiment illustrates that human body model estimation can be performed using a limited number of frames, provided the poses are varied.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A method for markerless motion capture, comprises the steps of:
    acquiring video sequences of a subject by a plurality of cameras positioned in a surrounding relationship with the subject;
    coupling the acquired video sequences to a data processing unit to be processed therein;
    in said data processing unit, for each frame of a set of frames of said acquired video sequences,
        (a) constructing a three-dimensional (3-D) volumetric data (voxel) representation of the subject's image, said 3-D voxel representation forming a kinematic structure including a plurality of articulated chains connected at respective joints and composed of said 3-D voxels,
        (b) transforming said 3-D voxels of said kinematic structure to a Laplacian Eigenspace, each of said 3-D voxels being mapped to a respective one of a plurality of smooth 1-dimensional (1-D) curves in the Laplacian Eigenspace according to a position of said each 3-D voxel in said 3-D voxel representation,
        (c) segmenting said 1-D smooth curves by 1-D spline fitting in the Laplacian Eigenspace,
        (d) registering said segmented 1-D smooth curves to a graphical subject model,
        (e) computing a skeleton curve of the subject from said segmented 1-D smooth curves,
        (f) estimating a stature of the subject from said skeleton curves computed from said set of frames of said acquired video sequences,
        (g) constructing an initial skeleton model having skeleton parameters corresponding to the stature of the subject,
        (h) computing pose parameters of said initial skeleton model, and
        (i) constructing an initial subject model based on said initial skeleton model parameters and said pose parameters thereof, and displaying said initial subject model at a display unit.

2. The method of claim 1, wherein said subject model is a super-quadric subject model.

3. The method of claim 2, further comprising the step of tracking said initial subject model performed after said step (i) to compute the pose of the subject at time (t+1) based on the pose parameters at time t.

4. The method of claim 1, wherein said step (a) comprises the steps of:
    for each camera (j) of said plurality of cameras,
    subtracting background data from said subject image to obtain the subject silhouette,
    determining a set of 2-dimensional (2-D) points $x_i^{(j)}$ for the camera (j) falling within said silhouette,
    populate array $s^j$ with said points $x_i^{(j)}$,
    adding said arrays $s^j$ for said plurality of cameras to obtain a combined array, and
    thresholding said combined array to obtain 3-D voxel representation of said subject image.

5. The method of claim 4, further comprising the steps of:
    after said step (a), constructing an adjacency matrix based on the connectivity between said 3-D voxels of said subject image, and computing a connected graph of said kinematic structure based on said adjacency matrix.

6. The method of claim 1, wherein said step (b) further comprises the steps of:
    mapping said each 3-D voxel of said kinematic structure to said respective 1-D curve in the Laplacian Eigenspace in accordance with a position of said each 3-D voxel along a respective one of said plurality of articulated chains.

7. The method of claim 1, wherein said step (c) further comprises the steps of:
    segmenting said 3-D voxels into respective articulated chains by associating each said 3-D voxel with a respective one of said 1-D smooth curves in the Laplacian Eigenspace (LE) by analyzing mutual orientation of said 1-D smooth curves in the LE.

8. The method of claim 1, wherein said step (c) further comprises the steps of:
    classifying said articulated chains into two distinct types depending on the number of connected ends thereof,
    initiating a spline fit by identifying an initial mode $y_0$ on a respective articulated chain,
    forming a set of nodes $N_0$ closest to said initial body $y_0$,
    determining at least one principal axis for said articulated chains, a number of said at least one principal axes being a subject to the type of said articulated chains, growing said 1-D spline in the direction of each of said at least one principal axis, spline fitting by projecting node $y_i$ on the respective principal axis, and computing a 1-D spline.

9. The method of claim 8, wherein said step (c) further comprises the step of:

computing said 1-D spline by calculating a spline fit error at node $y_i$ of said 1-D smooth curve in the LE to said $y_0$ to obtain proximity value of said node $y_i$ to said $y_0$, and minimizing said spline fit error.

10. The method of claim 9, further comprises the steps of:

in said step (c), propagating the computed said 1-D spline by adding nodes closest to a growing end of said computed 1-D spline, defining outlier nodes for which the spline fit error exceeds a predetermined threshold, and terminating the spline growing when the number of the outlier odes exceeds a predetermined value.

11. The method of claim 10, wherein in said step (e), a body graph is computed describing connections between the ends of said 1-D splines after said skeleton curve computation.

12. The method of claim 1, wherein in said step (d), said segmented 1-D smooth curves are registered by probabilistic registration.

13. The method of claim 1, wherein said subject is a human.

14. A system for markerless motion capture, comprising:

a plurality of cameras disposed in surrounding relationship with a subject, a data processing unit coupled to said plurality of cameras to receive video sequences therefrom, said data processor unit processing said video sequences and building a subject model, said subject model being presented on a display unit, wherein said data processor unit includes:
  (a) a voxel constructing unit constructing a 3-dimensional (3-D) volumetric data (voxel) representation of the subject image from said video sequences acquired by said plurality of cameras, said 3-D voxel representation including a kinematic structure composed of a plurality of articulated chains connected at respective joints,
  (b) a Laplacian Eigenspace (LE) transformation unit mapping the 3-D voxel representation to the LE to form a plurality of smooth 1-dimensional (1-D) curves in the LE,
  (c) segmenting unit for segmenting the 1-D curves in the LE,
  (d) model unit constructing a graphical model of the subject,
  (e) registration unit registering said segmented 1-D curves to the graphical model,
  (f) skeleton curve computing unit computing skeleton curve of the subject from said segmented 1-D curves, and
  (g) estimation unit estimating parameters of said subject model and the subject pose parameters.

15. The system of claim 14, further comprising a pose tracking unit coupled to said estimation unit to compute the pose of the subject at a time (t+1) based on the pose parameters at a time t.

16. The system of claim 14, wherein said model unit further constructs said subject model as a super-quadric subject model.

17. The system of claim 14, wherein said voxel constructing unit for each camera (j) of said plurality of cameras, subtracts background data from said subject image to obtain the subject silhouette, determines a set of 2-dimensional (2-D) points $x_i^{(j)}$ for the camera (j) falling within said silhouette, populates an array $s^j$ with said points $x_i^{(j)}$, adds said arrays $s^j$ for said plurality of cameras to obtain a combined array of said subject image, and thresholds said combined array to obtain said 3-D voxel representations.

18. The system of claim 14, wherein said LE transformation unit maps each voxel of said kinematic structure to said respective smooth 1-D curves in the LE in accordance with the position of said each voxel along a respective one of said plurality of articulated chains.

19. The system of claim 14, wherein said segmenting unit classifies said plurality of articulated chains into two distinct types depending on the number of connected ends thereof, initiates a spline fit by identifying an initial node $y_o$ on a respective articulated chain, forms a set of nodes $N_0$ closest to said initial node $y_0$, determines respective principal axes for said plurality of articulated chains, grows each of said 1-D spline in the direction of the respective principal axis, spline fits by projecting node $y_i$ on the respective principal axis, computes a 1-D spline by minimizing spline fit error at node $y_i$ of said 1-D smooth curve in the LE to said $y_0$, propagates the computed 1-D spline by adding nodes closest to a growing end of said computed 1-D spline, defines outlier nodes for which the spline fit error exceeds a predetermined threshold, and terminates the spline growing when the number of the outlier nodes exceeds a predetermined value.

20. The system of claim 14, wherein said estimation unit estimates a stature of the subject from the skeleton curves computed from a set of frames of the acquired video sequences, constructs an initial skeleton model having skeleton parameters corresponding to the stature of the subject, computes pose parameters of said initial skeleton model, constructs an initial subject model based on said initial skeleton model parameters and said pose parameters thereof, and reiteratively refines the subject model.

* * * * *